(12) United States Patent
Violet et al.

(10) Patent No.: US 8,489,984 B1
(45) Date of Patent: *Jul. 16, 2013

(54) CROSS PLATFORM LAYOUT

(75) Inventors: Scott R. Violet, Sunnyvale, CA (US); Tomas Pavek, Prague (CZ); Jan Stola, Prague (CZ)

(73) Assignee: Oracle America, Inc., Redwood Shores, CA (US)

( * ) Notice: Subject to any disclaimer, the term of this patent is extended or adjusted under 35 U.S.C. 154(b) by 1687 days.

This patent is subject to a terminal disclaimer.

(21) Appl. No.: 11/414,722

(22) Filed: Apr. 27, 2006

(51) Int. Cl.
*G06F 17/00* (2006.01)

(52) U.S. Cl.
USPC ........... 715/243; 715/209; 715/251; 715/746; 715/762

(58) Field of Classification Search
USPC .......................... 715/243, 209, 251, 746, 762
See application file for complete search history.

(56) References Cited

U.S. PATENT DOCUMENTS

| | | | | |
|---|---|---|---|---|
| 5,721,848 | A * | 2/1998 | Joseph | 715/764 |
| 6,654,947 | B1 * | 11/2003 | North et al. | 717/101 |
| 6,738,079 | B1 * | 5/2004 | Kellerman et al. | 715/763 |
| 6,785,866 | B1 * | 8/2004 | Lewis et al. | 715/209 |
| 7,234,111 | B2 * | 6/2007 | Chu et al. | 715/251 |
| 7,392,483 | B2 * | 6/2008 | Wong et al. | 715/746 |
| 7,441,200 | B2 * | 10/2008 | Savage | 715/762 |
| 2003/0058277 | A1 * | 3/2003 | Bowman-Amuah | 345/765 |
| 2003/0066058 | A1 * | 4/2003 | Van De Vanter | 717/143 |
| 2003/0067485 | A1 * | 4/2003 | Wong et al. | 345/747 |
| 2004/0160415 | A1 * | 8/2004 | Rosenberg et al. | 345/156 |
| 2005/0094205 | A1 | 5/2005 | Lo | |
| 2006/0041443 | A1 | 2/2006 | Horvath, Jr. | |
| 2007/0208996 | A1 * | 9/2007 | Berkner et al. | 715/521 |

OTHER PUBLICATIONS

Removing whitespace from a string; Aug. 22, 2005; DevX Discussions; pp. 1-2.*
PERL—Conversion Functions; Sep. 2, 2000; Carnegie Mellon University; pp. 1-3.*
Pavek et al., U.S. Appl. No. 11/413,761, filed Apr. 27, 2006, entitled "GUI Builder Tool for Designing Cross Platform Layout".
No Author Given, "The Java Tutorial: A Visual Index to the Swing Components", pp. 1-3 [online] Retrieved from the Internet: <URL:http://www.java.sun.com/docs/books/tutorial/uiswing/components/components_headerhtml>, Jan. 26, 2006.
No Author Given, "Font Information Routines", Hewlett-Packard Development Company, L.P., pp. 1-5 [online]. Retrieved from the Internet: <URL:http://www.techsolutions.hp.com/en/B2355-90097/ch03s05.html>, Sep. 27, 2006.

* cited by examiner

*Primary Examiner* — Doug Hutton, Jr.
*Assistant Examiner* — Andrew Dyer
(74) *Attorney, Agent, or Firm* — Fliesler Meyer LLP

(57) ABSTRACT

An input of a layout of one or more components in a container component is received and a new cross platform layout of the one or more components in the container component is generated. The cross platform layout includes at least one automatically sized autopad and/or container autopad that defines spacing to properly position the one or more components within the container component. The size of the autopad and/or container autopad is determined upon execution of the cross platform layout on a software platform using a visual guideline for that software platform. In some embodiments, some or all of the components are automatically positioned in the cross platform layout such that a contents of each of the components, such as text, is laid out within the container component along the same baseline.

18 Claims, 27 Drawing Sheets

CROSS PLATFORM LAYOUT

BACKGROUND OF THE INVENTION

1. Field of the Invention

The present invention relates to the development of graphical user interfaces on a computer system.

2. Description of Related Art

The ability to layout user interface components, such as JAVA® Swing components, in a container component using a visual builder so that the layout is consistent with an underlying software platform is difficult. The preferred spacing between components within the container component and between components and the boundary of the container component is not expressed in a meaningful way so developers can interact with a visual tool in an expected manner.

SUMMARY OF THE INVENTION

In accordance with one embodiment, a method includes receiving an input of a layout of one or more components in a container component, and generating a new cross platform layout of the one or more components in the container component, wherein the new cross platform layout includes at least one automatically sized autopad defining spacing to properly position the one or more components within the container component, and further wherein a size of the autopad is determined upon execution of the new cross platform layout on a computer system using a visual guideline of software platform utilized by that computer system. In some embodiments, the new cross platform layout includes at least one automatically sized container autopad, wherein the size of the container autopad is determined upon execution of the new cross platform layout on a computer system using a visual guideline of a software platform utilized by that computer system.

Embodiments in accordance with the invention are best understood by reference to the following detailed description when read in conjunction with the accompanying drawings.

The detailed description is to be referred to with the drawings.

DETAILED DESCRIPTION

Different software platforms typically utilize different visual guidelines that result in display of a graphical user interface having a particular appearance and functionality, commonly referred to by those of skill in the art as a "look and feel" of each different software platform. For example, a visual guideline utilized by one software platform can specify that a component in a graphical user interface be spaced 12 pixels apart from another component, while a visual guideline utilized by a different software platform can specify that a component in a graphical user interface be spaced 20 pixels apart from another component.

Herein, in one embodiment, a software platform is software required to execute one or more embodiments of the invention on a particular computer hardware architecture. In one embodiment, a software platform includes at least an operating system.

Developers of graphical user interfaces typically use various layout implementations, such as visual builders, that assist in programming the layout of components in a graphical user interface such that the resulting interface has a particular "look and feel" for a specific software platform. Current layout implementations allow a user to program a layout specific to a particular underlying software platform, but the programmed layout doesn't abide by the constraints of underlying software platforms that are different from the originally programmed layout. More particularly, current programmed layouts are not cross platform layouts as the current programmed layouts do not abide by the visual guidelines of underlying software platforms that are different from the particular underlying software platform for which the programmed layout was developed.

Embodiments in accordance with the invention permit a user to generate a cross platform layout of graphical user interface components so that when the cross platform layout is executed on differing underlying software platforms, the cross platform layout is generated in accordance with the visual guidelines utilized by each of the differing underlying software platforms. More particularly, embodiments in accordance with the invention permit a developer to generate a cross platform layout of graphical user interface components, so that the components are positioned in accordance with the "look and feel" of an underlying software platform on which the cross platform layout is executed. A layout developer does not have to know the underlying software platform on which the cross platform layout will be executed to develop the cross platform layout.

Herein headings are provided in the description for convenience of reference and are not intended to limit the information provided to a specific heading.

Figure 1:
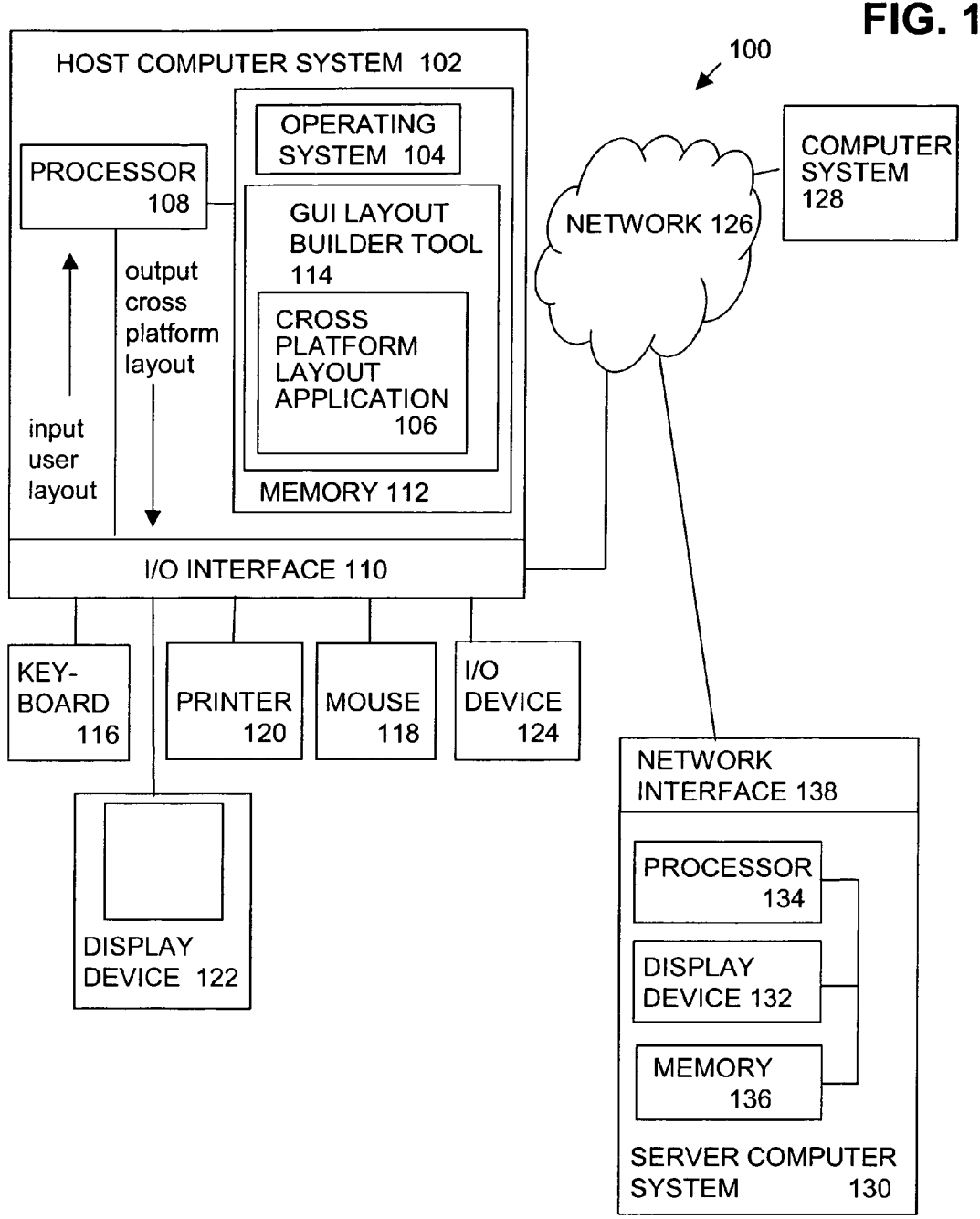
FIG. 1 illustrates a client-server system that includes a GUI layout builder tool and a cross platform layout application executing on a host computer system in accordance with one embodiment of the invention.

FIG. 1 illustrates a client-server system 100 that includes a GUI layout builder tool 114 and a cross platform layout application 106 executing on a host computer system 102 in accordance with one embodiment of the invention. Host computer system 102, can be a stand-alone computer system, such as a personal computer or workstation, as illustrated in FIG. 1. Host computer system 102 (e.g., a first computer system) can also be part of a client-server configuration that is also illustrated in FIG. 1 in which host computer system 102 interacts with a server computer system 130 (e.g., a second computer system) via a network 126. Network 126 can be any network or network system that is of interest to a user, for example, the Internet.

GUI layout builder tool 114 and cross platform layout application 106 are described herein as executed on host computer system 102, however, in light of this disclosure, those of skill in the art can understand that the description is applicable to a client-server system as well. Host computer system 102 typically includes a central processing unit (CPU) 108, hereinafter processor 108, an input/output (I/O) interface 110, an operating system 104, and a memory 112.

Host computer system 102 can further include standard devices, such as a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, memory 112 includes a main memory, as well as any supplemental memories, and includes executable areas, data storage areas, and any memory areas needed by host computer system 102.

In one embodiment, GUI layout builder tool 114 including cross platform layout application 106 are loaded into host computer system 102 via I/O device 124, such as from a CD, DVD or floppy disk containing cross platform layout application 106. In other embodiments, such as client-server embodiments, GUI layout builder tool 114 including cross platform layout application 106 can be downloaded into host computer system 102 from server computer system 130 via network 126.

In one embodiment, cross platform layout application 106 is implemented as part of GUI layout builder tool 114. In other embodiments cross platform layout application 106 is separately implemented and used with a layout manager in a visual builder.

In some embodiments, computer system 130 can further include: a network interface 138 for communicating with network 126; a memory 136; a processor 134; and a display device 132. In various embodiments, network interface 138 and I/O interface 110 include analog modems, digital modems, or a network interface card.

In FIG. 1, host computer system 102 is also coupled to a computer system 128 by network 126. In one embodiment, computer system 128 is similar to host computer system 102, for example, includes a central processing unit, an input/output (I/O) interface and a memory. Computer system 128 can further include standard devices like a keyboard, a mouse, a printer, a display device, and an I/O device(s). In some embodiments, computer system 128 is a computing system different from host computer system 102.

Thus for example, if operating system 104 of host computer system 102 is a UNIX operating system, and computer system 128 utilizes a Windows operating system, the underlying software platforms are different. The various hardware components of computer system 128 are not illustrated to avoid detracting from the principles of the invention.

In the present embodiment, GUI layout builder tool 114 and cross platform layout application 106 are stored in memory 112 of host computer system 102 and executed on host computer system 102. The particular type and configuration of host computer system 102, server computer system 130, and computer system 128 are not essential to this embodiment of the invention.

Figure 2:
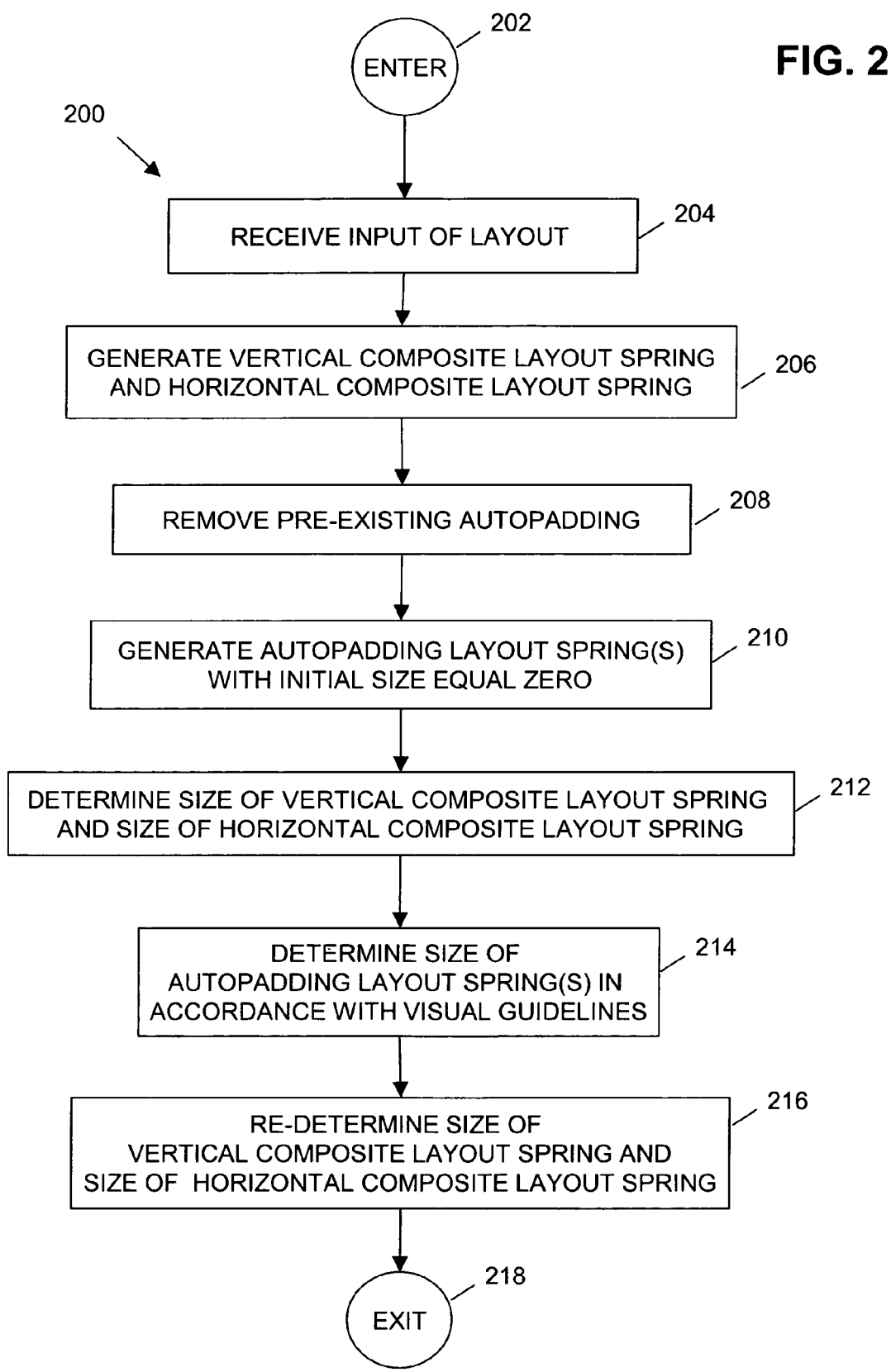
FIG. 2 is a flow diagram of a method for automatically generating autopadding in a cross platform layout of components in accordance with one embodiment of the invention.

FIG. 2 is a flow diagram of a method 200 for automatically generating autopadding in a cross platform layout of components in accordance with one embodiment of the invention. In one embodiment, a new cross platform layout including autopadding is generated from an initial input layout, such that when the new cross platform layout is executed on different software platforms, the components are automatically positioned in a graphical user interface in accordance with the visual guidelines of a software platform utilized by a computer system on which the cross platform layout is executed.

Herein the embodiments are described as implemented in the JAVA® programming language (JAVA is a registered trademark of Oracle America, Inc., Redwood City, Calif.). Further, the present embodiment is described herein with reference to JAVA® Swing components. Herein, a JAVA® Swing component has a minimum, preferred, and maximum size, which can be the same or different values. The JAVA® language, JAVA® Swing components, and user interface components, including graphical user interface components, are well known to those of skill in the art and are not further described in detail herein to avoid detracting from the principles of the invention.

In one embodiment, a component is an object used in a graphical user interface layout. Examples of components, such as JAVA® Swing components, include, but are not limited to: high level container components, such as an applet, a dialog, and a frame; general purpose container components, such as a panel, a scroll pane, a split pane, a tabbed pane, and a tool bar; special purpose container components, such as an internal frame, a layered pane, and a root pane; basic control components, such as a button, a text field, a combo box, a list, a menu, a slider, and a spinner; information display components, such as a label, a progress bar, and a tool tip; and, interactive display components, such as a color chooser, a file chooser, a table, a text, and a tree. Components can include other components. For example, a frame component can contain a panel component that further contains two button components, and a text field component. Herein when a component includes other components the component is referred to as a container component.

In one embodiment, a pad or padding defines a spacing input as part of an initial layout, such as in an initial input of a layout by a user. Differently, in one embodiment, an autopad or autopadding defines a new spacing automatically generated by cross platform layout application 106 and/or GUI layout builder tool 114 in accordance with the embodiments of the invention as explained more completely herein.

Referring now to FIGS. 1 and 2 together, in one embodiment, execution of cross platform layout application 106 by processor 108 results in the operations of method 200 as described below. In the present embodiment, cross platform layout application 106 is implemented as part of a layout manager in a visual builder tool, such as GUI layout builder tool 114. In one embodiment, method 200 is entered at an ENTER operation 202, and from ENTER operation 202, processing transitions to a RECEIVE INPUT OF INITIAL LAYOUT operation 204.

In RECEIVE INPUT OF LAYOUT operation 204, an input of an initial layout is received. For example, in one embodiment, a user inputs an initial programmatic layout of one or more components in a container component.

In another embodiment, the initial layout is provided by a user using GUI builder tool 114. In one embodiment, a user interactively inputs one or more components into a design area resulting in an input of an initial layout to method 200. GUI builder tool 114 is further explained more completely herein.

In one embodiment, one or more components are defined in the initial layout as belonging to a sequential group or a parallel group in a container component. The following is an example of a user programmatic input of an initial layout of JAVA® Swing components A, B, C, and D in a container component:

```
JLabel A=new JLabel("A Label");
JLabel B=new JLabel("Another JLabel");
GroupLayout layout=new GroupLayout(container); container.setLayout(layout);
GroupLayout.SequentialGroup
    hGroup=layout.createSequentialGroup( )
hGroup.add(
    layout.createParallelGroup( ).
        add(A).
        add(layout.createSequentialGroup( )
            add(C).
            add(D))).
        add(B);
layout.setHorizontalGroup(hGroup);
GroupLayout.ParallelGroup
    vGroup=layout.createParallelGroup( );
vGroup.add(
    layout.createSequentialGroup( ).
    add(A).
    add(layout.createParallelGroup (GroupLayout.BASELINE).
    add(C).
    add(D))).
    add(B);
layout.setVerticalGroup(vGroup);
layout.setAutocreatePadding(true);
layout.setAutocreateContainerPadding(true);
```

In the above example, the input:

```
GroupLayout.SequentialGroup
    hGroup=layout.createSequentialGroup( );
hGroup.add(
    layout.createParallelGroup( ).
        add(A).
        add(layout.createSequentialGroup( )
            add(C).
            add(D))).
        add(B);
layout.setHorizontalGroup(hGroup);
``` defines a sequential group along a horizontal direction in which the sequential group includes a parallel group and a component B. Further, the parallel group includes a component A and a sequential group, the sequential group including a component C and a component D.

In the example, the input:

```
GroupLayout.ParallelGroup
    vGroup=layout.createParallelGroup( );
vGroup.add(
    layout.createSequentialGroup( ).
    add(A).
    add(layout.createParallelGroup (GroupLayout.BASELINE).
    add(C).
    add(D))).
``` add(B);
defines a parallel group along a vertical direction in which the parallel group includes a sequential group and component B, and in which the sequential group includes component A and a parallel group, the parallel group including component C and component D.

In the example, the input:
layout.setAutocreatePadding(true);
defines that autopadding is to be automatically generated and inserted in the layout in accordance with one embodiment of the invention as more completely explained herein. In the above example, the initial layout does not include any pre-existing autopadding.

In the example, the input:
layout.setAutocreateContainerPadding(true);
defines that container autopadding is to be automatically generated and inserted in the layout. In one embodiment, container autopadding is a type of autopadding that is defined between the components and the container component boundary. Container autopadding is explained more completely herein.

Additionally, in the example, the input:
add(layout.createParallelGroup
(GroupLayout.BASELINE).
add(C).
add(D))).
defines that the parallel group including component C and component D have the same baseline, i.e., are to be positioned so that the contents of components of the parallel group are laid out along a same axis extending in a same direction in accordance with one embodiment of the invention as further described herein.

For purposes of description, the above programmatic input is used in the description of method 200 and generation of a cross platform layout including autopadding.

Figure 3:
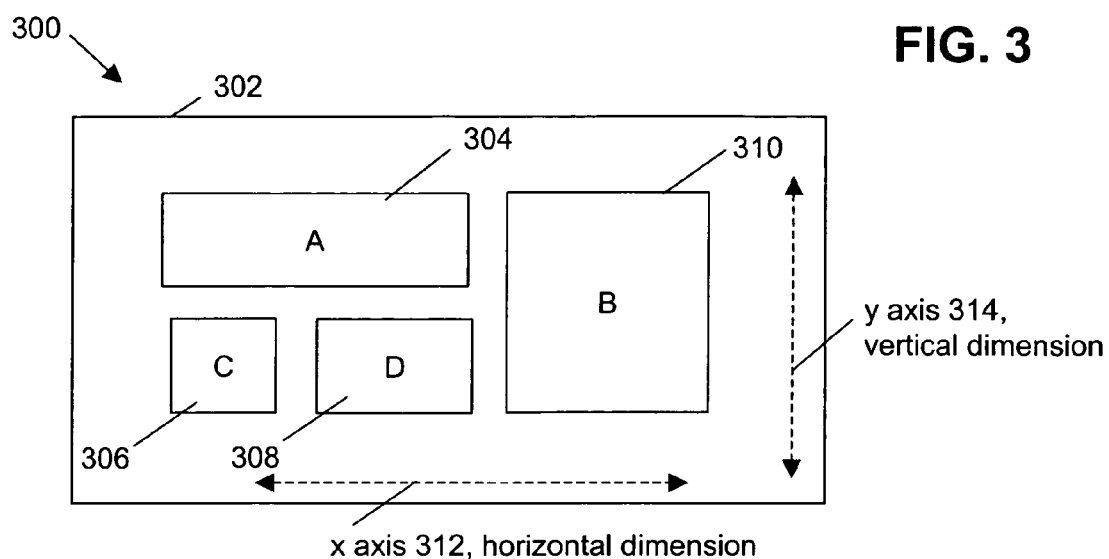
FIG. 3 illustrates a cross platform layout of components in a graphical user interface generated in accordance with one embodiment of the invention.

FIG. 3 illustrates a cross platform layout 300 of components in a graphical user interface generated in accordance with one embodiment of the invention. The present illustration depicts a display of cross platform layout 300 including autopadding, where the autopadding properly positions the components within the container component in accordance with a visual guideline(s) of a software platform utilized by a computer system on which cross platform layout 300 is executed. The sizing of the spacing between the components and the between the components and the container component resulting from the autopadding of cross platform layout 300 is for example only, and is not intended to limit the invention to the particular example shown. Further, the component sizes illustrated in FIG. 3 are for example only.

As earlier described, cross platform layout 300 can be initially input as a programmatic input, such as earlier described, or as an interactive input through GUI layout builder tool 114 further described herein. In the programmatic input, cross platform layout 300 is initially defined along an x axis 312, a first axis, in a horizontal direction, shown in dashed lines, and along a y axis 314, a second axis, in a vertical direction, also shown in dashed lines. Those of skill in the art understand the above axes can be switched, and one of skill in the art could make any needed modifications in view of this disclosure.

In the present example, the initial programmatic input includes a container component 302, a component A 304, a component B 310, a component C 306, and a component D 308, where component A 304, component B 310, component C 306, and component D 308 are within container component 302. In one embodiment, x axis 312 is defined left to right, and y axis 314 is defined top to bottom.

Sequential Group

In one embodiment, a sequential group is a group of components in which each component is aligned sequentially relative to the other components of the group along a given axis extending in a given direction. In one embodiment, a sequential group is represented by the location of the sequential group on the given axis, and by the width of the constituent components of the sequential group, e.g., the distance along the given axis utilized by the constituent components of the sequential group. Examples of sequential groups defined along a horizontal x axis are described more completely herein with reference to FIG. 4. Examples of sequential groups defined along a vertical y axis are described more completely herein with reference to FIG. 6.

Figure 4:
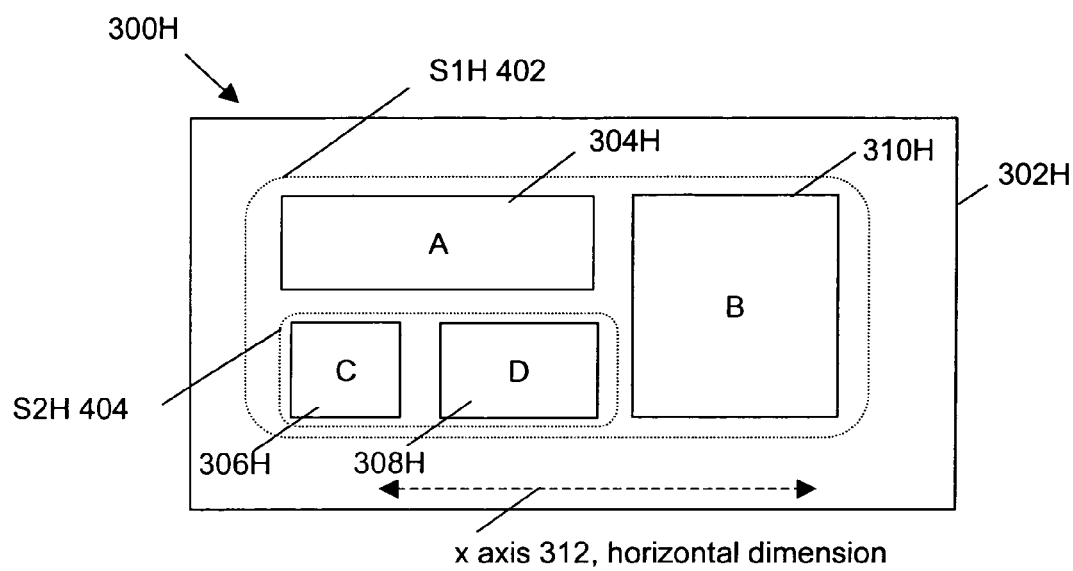
FIG. 4 illustrates examples of sequential groups defined along a horizontal x axis in accordance with one embodiment of the invention.

FIG. 4 illustrates examples of sequential groups defined along a horizontal x axis 312 in accordance with one embodiment of the invention. Referring now to FIG. 4, layout 300H has a sequential group S1H 402 composed of a parallel group, i.e., parallel group P1H 502 (FIG. 5), and component B 310H, which represents component B 310 along horizontal x axis 312. The parallel group, i.e., parallel group P1H 502 (FIG. 5), includes component A 304H, which represents component A along horizontal x axis 312, and sequential group S2H 404. Sequential group S2H 404 is composed of component C 306H, which represents component C 306 along horizontal x axis 312, and component D 308H, which represents component D 308 along horizontal x axis 312.

Figure 6:
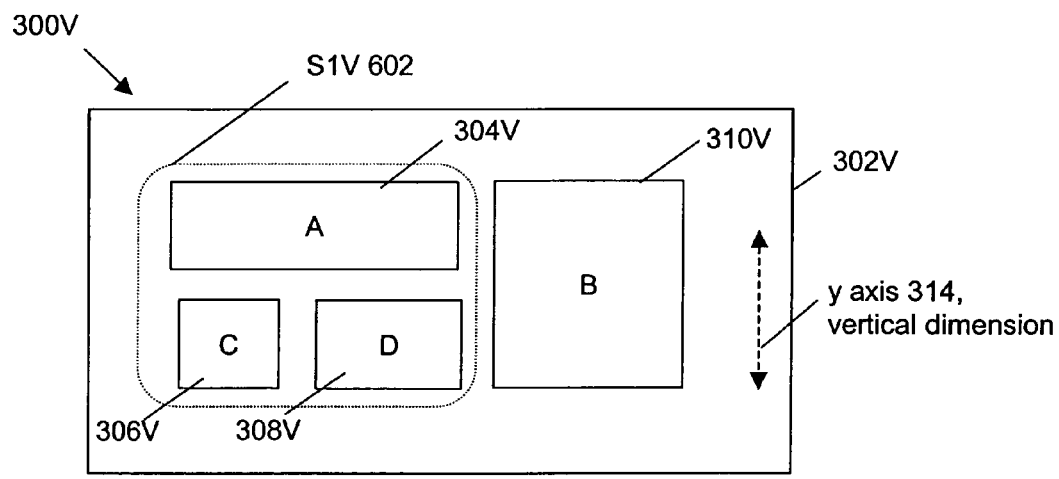
FIG. 6 illustrates an example of a sequential group defined along a vertical y axis in accordance with one embodiment of the invention.
Figure 7:
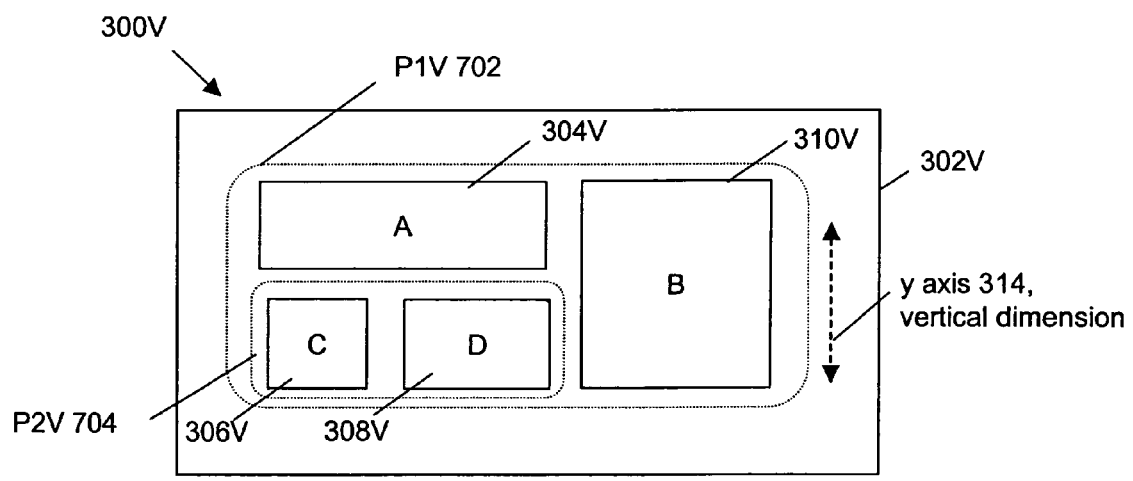
FIG. 7 illustrates examples of parallel groups defined along a vertical y axis in accordance with one embodiment of the invention.

FIG. 6 illustrates an example of a sequential group defined along a vertical y axis 314 in accordance with one embodiment of the invention. Referring now to FIG. 6, layout 300V has a sequential group S1V 602 composed of component A 304V, which represents component A 304 along vertical y axis 314, and a parallel group, i.e., parallel group P2V 704 (FIG. 7). The parallel group, i.e., parallel group P2V 704 (FIG. 7), includes component C 306V, which represents component C 306 along vertical y axis 314, and component D 308V, which represents component D 308 along vertical y axis 314.

Parallel Group

Differently, in one embodiment, a parallel group is a group of components in which the components are aligned in parallel to each other along a given axis extending in a given direction. In one embodiment, a parallel group is represented by the location of the parallel group on the given axis, and by the height of the constituent components along the given axis, e.g., the distance along the given axis utilized by the constituent components of the parallel group. Examples of parallel groups defined along a horizontal x axis are explained more completely herein with reference to FIG. 5. Examples of parallel groups defined along a vertical y axis are explained more completely herein with reference to FIG. 7.

Figure 5:
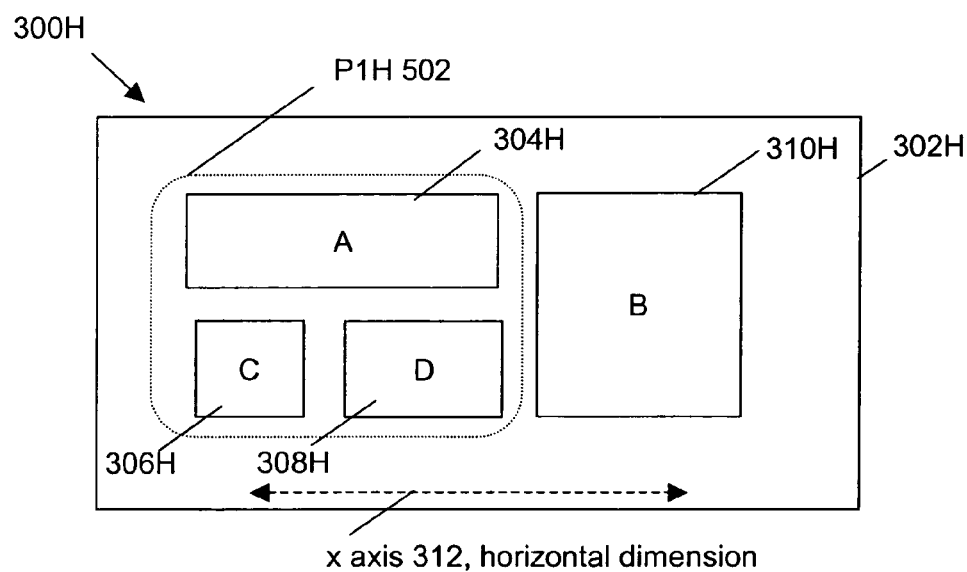
FIG. 5 illustrates examples of a parallel group defined along a horizontal x axis in accordance with one embodiment of the invention.

FIG. 5 illustrates examples of a parallel group defined along a horizontal x axis 312 in accordance with one embodiment of the invention. Referring now to FIG. 5, layout 300H has a parallel group P1H 502 composed of component A 304H and a sequential group, i.e., sequential group S2H 404 (FIG. 4). The sequential group, i.e., sequential group S2H 404 (FIG. 4), includes component C 306H and component D 308H.

FIG. 7 illustrates examples of parallel groups defined along a vertical y axis 314 in accordance with one embodiment of the invention. Referring now to FIG. 7, layout 300V has a parallel group P1V 702, which includes component B 310V, which represents component B 310 along vertical y axis 314, and a sequential group, i.e., sequential group S1V 602 (FIG. 6). The sequential group, i.e., sequential group S1V 602 (FIG.

6), includes component A 304V and parallel group P2V 704. Parallel group P2V 704 includes component C 306V and component D 308V.

Referring back again to FIG. 2, in the present embodiment, the input of the initial layout includes at least a specified container component size, which is a default size if not specifically defined in the programmatic input, the identification of one or more components for inclusion in the container component, and specifies generation of autopadding and/or container autopadding. For purposes of discussion, the example layout shown in FIG. 3 is referred to in describing the present embodiment. This example is for illustrative purposes only and is not intended to limit the invention to the particular example described herein. From RECEIVE INPUT OF LAYOUT operation 204, processing transitions to a GENERATE VERTICAL COMPOSITE LAYOUT SPRING AND HORIZONTAL COMPOSITE LAYOUT SPRING operation 206.

In GENERATE VERTICAL COMPOSITE LAYOUT SPRING AND HORIZONTAL COMPOSITE LAYOUT SPRING operation 206, a vertical composite layout spring and a horizontal composite layout spring representing the layout are generated. In the present embodiment, the layout of the components is represented by two overall layout springs: a vertical composite layout spring and a horizontal composite layout spring. In one embodiment, the y axis, i.e., the first axis, and the x axis, i.e., a second axis, are treated independently.

In one embodiment, the vertical composite spring is composed of vertical layout springs representing the vertical sizes of each constituent component, group, autopadding, and/or container autopadding along y axis 314, i.e., the vertical axis. The horizontal composite layout spring is composed of horizontal layout springs representing the horizontal sizes of each constituent component, group, autopadding, and/or container autopadding along the x axis 312, i.e., the horizontal axis. If padding is specified in the input, in one embodiment, the padding is represented as a padding layout spring along the appropriate axis.

In one embodiment, input layout is evaluated along the horizontal axis and the vertical axis, and separate hierarchical layout spring structures are generated representing input layout. More particularly, in one embodiment, the input layout is evaluated along the horizontal axis, i.e., x axis 312, and a hierarchical structure of layout springs representing the components of the layout in the horizontal dimension is generated, herein termed the horizontal layout spring hierarchy. In one embodiment, the highest level spring in the horizontal layout spring hierarchy, i.e., the root layout spring in the horizontal layout spring hierarchy, represents the horizontal composite layout spring.

Additionally, the layout is evaluated along the vertical axis, i.e., y axis 314, and a hierarchical structure of layout springs representing the components of the layout in the vertical dimension is generated, herein termed the vertical layout spring hierarchy. In one embodiment, the highest level spring in the vertical layout spring hierarchy, i.e., the root layout spring in the vertical layout spring hierarchy, represents the vertical composite layout spring.

In one embodiment, a size occupied by a component, group, autopad, or container autopad along x axis 312 is represented in the horizontal layout spring hierarchy by an associated horizontal layout spring. A size occupied by a component, group, autopad, or container autopad along y axis 314 is represented in the vertical layout spring hierarchy by an associated vertical layout spring.

As described above, in one embodiment, a component in a layout is represented with both a vertical layout spring and a horizontal layout spring. Differently, an autopadding layout spring and a container autopadding layout spring are directional and represent a spacing along a single axis. Thus, an autopadding layout spring is either a horizontal autopadding layout spring or a vertical autopadding layout spring, and expands or reduces in a specified direction along the associated axis. Similarly, a container autopadding layout spring is either a horizontal container autopadding layout spring or a vertical container autopadding layout spring, and expands or reduces in a specified direction along the associated axis.

When components belong to a group, i.e., a parallel group or sequential group, the size of the group is represented by a group layout spring built up from the sizes of the constituent layout springs of the group. A group layout spring is also referred to as a parent layout spring with reference to constituent layout springs. Similarly a constituent layout spring of a group layout spring is also referred to as a child layout spring with reference to the encompassing group layout spring.

A sequential group spring is represented in a horizontal layout spring hierarchy by an associated horizontal sequential group layout spring, and represented in a vertical layout spring hierarchy by an associated vertical sequential group layout spring. A parallel group layout spring is represented in a horizontal layout spring hierarchy by an associated horizontal parallel group layout spring, and represented in a vertical layout spring hierarchy by an associated vertical parallel group layout spring.

Along a given axis, a size of a sequential group layout spring is determined by adding together each of the sizes of the constituent layout spring sizes including any autopadding layout spring sizes and any container autopadding layout spring sizes separating the components of the sequential group. Along a given axis, a size of a parallel group layout spring is determined as the maximum size of the constituent layout spring sizes including any autopadding layout spring sizes and any container autopadding layout spring sizes separating the components of the parallel group. In some embodiments, components in a parallel group can be aligned together if the components of the parallel group do not fill the available space within the container component.

In the present embodiment, a component layout spring, an autopadding layout spring, and a container autopadding layout spring, each has a minimum, preferred, and maximum size, which can be the same or a different size. Herein the term "preferred" refers to a specified size, such as a size specified by a developer, or a size specified in a default setting of visual guidelines.

In one embodiment, the size relations between the minimum, preferred, and maximum sizes are: $0<=$minimum size$<=$preferred size$<=$maximum size. In one embodiment, the minimum size is the smallest size a layout spring can assume in the layout along a given axis, the preferred size is a size larger than or equal to the minimum size and smaller than or equal to the maximum size that a layout spring can assume in the layout, and the maximum size is the largest size a layout spring can assume in the layout.

Figure 8A:
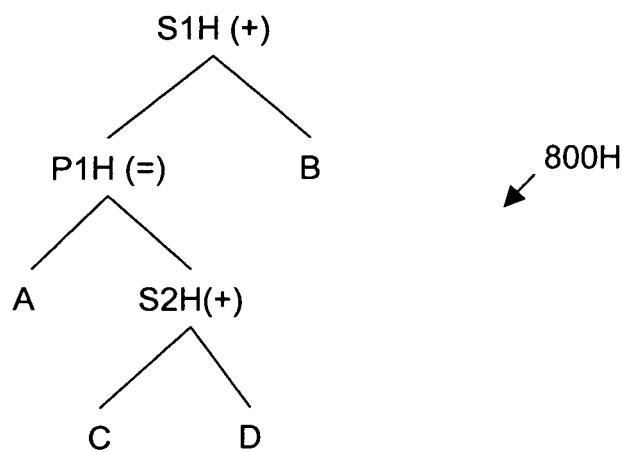
FIG. 8A illustrates a horizontal layout spring hierarchy of the layout along a horizontal axis in accordance with one embodiment of the invention.
Figure 8B:
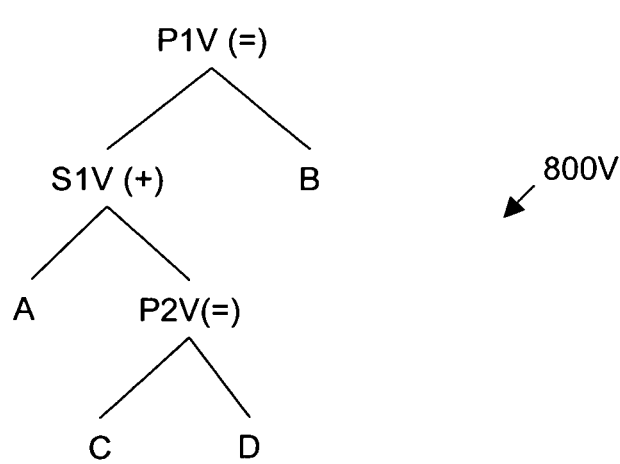
FIG. 8B illustrates a vertical layout spring hierarchy of the layout of along a vertical axis in accordance with one embodiment of the invention.

The hierarchical layout spring structures of the layout are explained more completely with reference to FIGS. 8A and 8B. In FIGS. 8A and 8B, a plus sign "+" is used to represent a sequential group node, and an equal sign "=" is used to represent a parallel group node.

FIG. 8A illustrates a horizontal layout spring hierarchy 800H of the layout along the horizontal axis 312 in accordance with one embodiment of the invention. Referring now to FIGS. 4, 5, and 8A together, in one embodiment, the layout is evaluated along horizontal x axis 312, and a sequential group layout spring S1H representing sequential group S1H 402 (FIG. 4) forms the highest node in horizontal hierarchical layout spring structure 800H. Thus, in one embodiment, sequential group layout spring S1H, sometimes referred to as group layout spring S1H, is the root layout spring of horizontal layout spring hierarchy 800H and represents the horizontal composite layout spring of the layout.

Sequential group layout spring S1H contains a parallel group layout spring P1H representing parallel group layout spring P1H 502 (FIG. 5), and a layout spring B representing a horizontal size of component B 310H (FIG. 4). Parallel group layout spring P1H contains a layout spring A representing the horizontal size of component AH 304H (FIG. 4), and a sequential group layout spring S2H representing sequential group S2H 404 (FIG. 4). Sequential group layout spring S2H contains a layout spring C representing the horizontal size of component C 306H (FIG. 4), and a layout spring D representing the horizontal size of component D 308H (FIG. 4).

FIG. 8B illustrates a vertical layout spring hierarchy 800V of the layout along the vertical axis 314 in accordance with one embodiment of the invention. Referring now to FIGS. 6, 7, and 8B together, in one embodiment, the layout is evaluated along vertical y axis 314 (FIG. 6), and a parallel group layout spring P1V representing parallel group P1V 702 (FIG. 7) forms the highest node in vertical hierarchical layout spring structure 800V. Thus, in one embodiment parallel group layout spring P1V is the root layout spring of vertical layout spring hierarchy 800V and represents the vertical composite layout spring of the layout.

Parallel group layout spring P1V contains the sequential group layout spring S1V representing sequential group S1V 602 (FIG. 6), and a layout spring B representing the vertical size of component B 310V (FIG. 7). Sequential group spring S1V contains a layout spring A representing the vertical size of component A 304V (FIG. 6), and a parallel group layout spring P2V, representing parallel group P2V 704 (FIG. 7). Parallel group layout spring P2V includes layout spring C representing the vertical size of component C 306V (FIG. 7), and a layout spring D representing the vertical size of component D 308V (FIG. 7). Referring back again to FIG. 2, from GENERATE VERTICAL COMPOSITE LAYOUT SPRING AND HORIZONTAL COMPOSITE LAYOUT SPRING operation 206, processing transitions to a REMOVE PRE-EXISTING AUTOPADDING operation 208.

In REMOVE PRE-EXISTING AUTOPADDING operation 208, any pre-existing autopadding present, including container autopadding, in the input of the layout is removed from the horizontal layout spring hierarchy and from the vertical layout spring hierarchy. In one embodiment, horizontal layout spring hierarchy 800H and vertical layout spring hierarchy 800V are each traversed, and any autopadding layout springs are removed. In one embodiment, each of the layout springs in horizontal layout spring hierarchy 800H and in vertical layout spring hierarchy 800V are traversed in preorder and any autopadding padding layout springs are removed.

Conventionally, preorder traversal of a hierarchical structure, such as a treed hierarchical structure, is a depth-first traversal method in which the root layout spring is visited first and a preorder traversal of each of the subtrees of the root layout spring is performed one by one in the order given. Although preorder traversal is described in the present embodiment, other traversal methods can be used.

Hierarchical structures and preorder traversal of hierarchical structures are well known to those of skill in the art and not further described in detail to avoid detracting from the principles of the invention. In the present example, no autopadding, as well as no container autopadding, was present in the initial input of the layout, and thus there are no autopadding padding layout springs to remove. From REMOVE PRE-EXISTING AUTOPADDING operation 208, processing transitions to a GENERATE AUTOPADDING LAYOUT SPRING(S) WITH INITIAL SIZE EQUAL ZERO operation 210.

In GENERATE AUTOPADDING LAYOUT SPRING(S) WITH INITIAL SIZE EQUAL ZERO operation 210, one or more autopadding layout springs are generated, and the initial size of each autopadding spring that is generated is set to zero. In the present embodiment, each autopad is represented by an autopadding layout spring that is directional along a single axis, the vertical y axis 314 or the horizontal x axis 312. In one embodiment, horizontal layout spring hierarchy 800H and the vertical layout spring hierarchy 800V are each traversed and autopadding layout springs, if any, are generated in accordance with a set of autopadding generation guidelines as explained more completely herein.

Referring again to FIG. 8A, in one embodiment, each layout spring in horizontal layout spring hierarchy 800H is traversed, e.g., visited, in preorder and autopadding layout spring are generated and inserted into groups in accordance with the autopadding generation guidelines described herein. In one embodiment, the preorder traversal of the layout springs of FIG. 8A is S1H, P1H, A, S2H, C, D, and B.

Autopadding Generation Guidelines

I. Visit Layout Spring

When a layout spring is visited, the layout spring is passed in, e.g., associated with, an autopadding layout spring, also termed a current autopadding layout spring. Initially, the current autopadding layout spring for the layout spring is set to null.

The layout spring is also passed in, e.g., associated with, a trailing component list that on completion of the evaluation of the layout spring, also termed exiting the layout spring, is populated with any trailing component springs determined in the evaluation of the layout spring. Initially, the trailing component list for the layout spring is empty.

The current autopadding layout spring has an associated target list, and an associated source list. A target list is a list of layout spring(s) that are to the right of, e.g., trailing, a current autopadding layout spring. A source list is a list of layout spring(s) that are to the left of, e.g., leading, a current autopadding layout spring.

In the present embodiment, the highest order layout spring in a layout spring hierarchy is a group spring, i.e., the composite layout spring. For example, in FIG. 8A, the composite layout spring is sequential group layout spring S1H. Thus, generally viewed, the evaluation of the composite layout spring in a layout spring hierarchy is an evaluation of all the children layout springs composing the composite layout spring. Consequently, a child layout spring of a composite layout spring is either a child of a sequential group layout spring or a child of a parallel group layout spring. Guidelines for evaluation of a child layout spring of a sequential group layout spring, and for evaluations of a child layout spring of a parallel group layout spring are described below.

Guidelines for Visiting a Layout Spring that is a Child of a Sequential Group Layout Spring In one embodiment, when a layout spring is a child of a sequential group layout spring, the following guidelines are applied:

S_1. If the layout spring is a component layout spring:

a. if there is a non-null current autopadding spring, add the component layout spring as a target to the current autopadding spring;

b. if the component layout spring is the last spring in the sequential group layout spring, add the component layout spring to the trailing component list of the sequential group layout spring;

c. if the component layout spring is not the last layout spring in the sequential group layout spring, create a new autopadding layout spring and add the component layout spring as a source of the new autopadding layout spring; and insert the newly created autopadding layout spring in the layout spring hierarchy after the component layout spring as the current autopadding layout spring.

S_2. If the layout spring is a group layout spring:

a. create a new trailing component list to represent the trailing component layout springs for the group layout spring;

b. visit each layout spring in the group layout spring in accordance with the autopadding generation guidelines supplying the newly created trailing component list;

c. if the group layout spring is the last layout spring in the sequential group layout spring, add the contents of the new trailing component list, created in S_2.a. and populated in S_2.b., to the trailing component list supplied to this sequential group layout spring;

d. if the group layout spring is not the last layout spring in the sequential group layout spring, and if the new trailing component list, created in S_2.a. and populated in S_2.b., is non-empty, create a new autopadding layout spring. Add the layout springs listed in the new trailing component list as sources of the newly created autopadding layout spring. This newly created autopadding layout spring becomes the current autopadding spring.

e. if the group layout spring is not the last layout spring in the sequential group layout spring, and if the new trailing component list is empty, set the current autopadding layout spring to null.

S_3. Otherwise, if the layout spring is not a group layout spring, and is not a component layout spring, set the current autopadding layout spring to null.

Guidelines for Visiting a Layout Spring that is a Child of a Parallel Group Layout Spring In one embodiment, when a layout spring is a child of a parallel group layout spring, the following guidelines are applied:

P_1. If the layout spring is a component layout spring:

a. if the current autopadding is non-null, add the component layout spring as a target of the autopadding layout spring; and b. add the component layout spring to the trailing component list supplied to this parallel group layout spring.

P_2. If the layout spring is a group layout spring, visit the group layout spring in accordance with the autopadding generation guidelines.

Trailing Component List and Trailing Component Layout Springs

As described above, each of the layout springs is visited in accordance with the autopadding generation guidelines, and a trailing component list is created, and populated with entries representing the appropriate layout springs, if any, termed trailing component layout springs.

Trailing Component List for a Sequential Group Layout Spring

In one embodiment, a trailing component list for a sequential group layout spring has an entry for the last layout spring of the group layout spring that represents a component layout spring. When the last layout spring of a sequential group layout spring is a group layout spring, rather than a component layout spring, the trailing component list of the sequential group layout spring has an entry for the trailing component layout spring of the child group layout spring. When the last layout spring of a component group layout spring is not a component layout spring, and is not a group layout spring, the trailing component list is empty.

Trailing Component List for a Parallel Group Layout Spring

In one embodiment, the trailing component list for a parallel group layout spring includes entries for all child component layout springs and any trailing component list of child group layout springs.

Figure 9A:
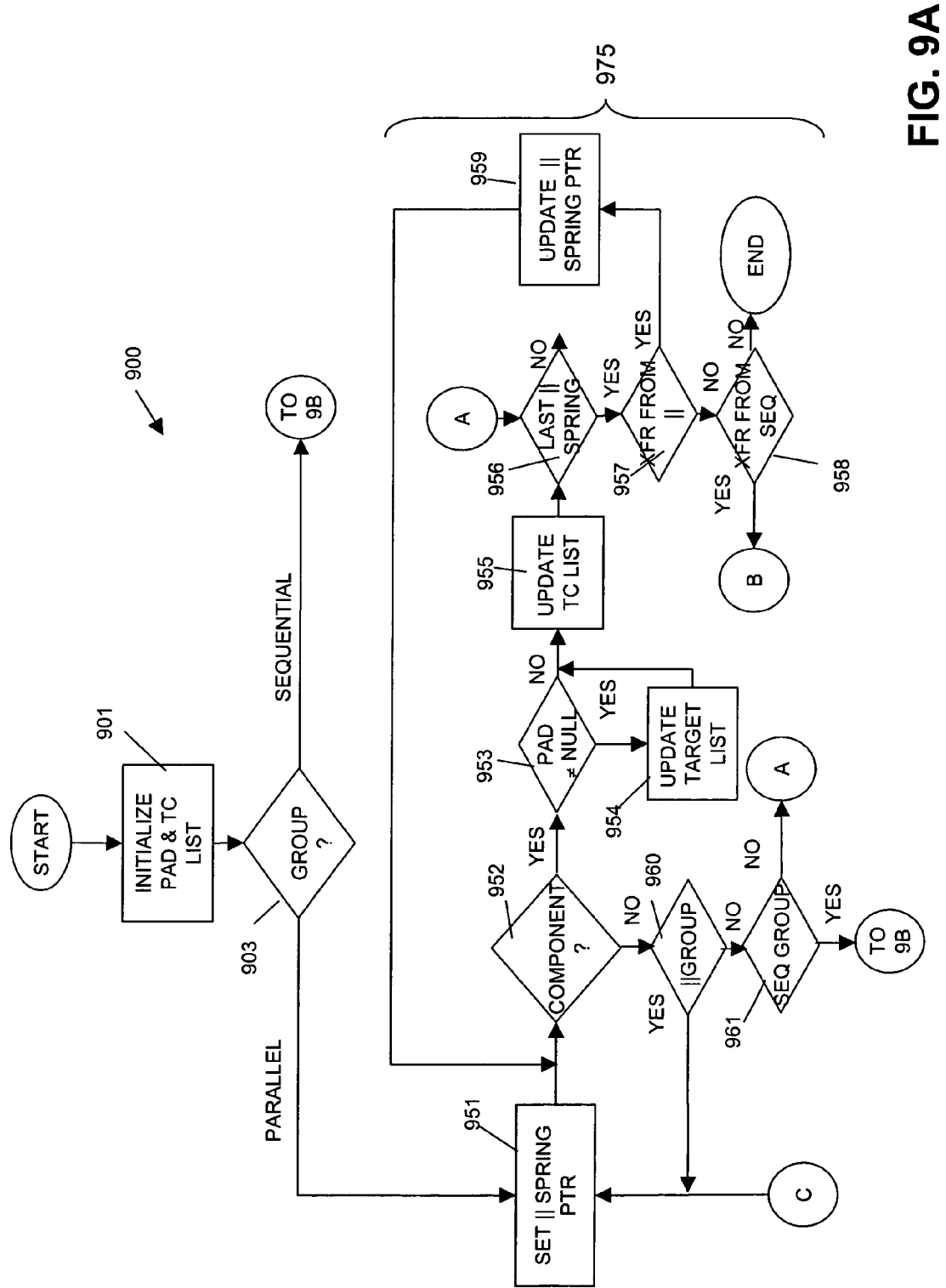
FIGS. 9A and 9B illustrate a process flow diagram for one embodiment of autopadding generation guidelines.
Figure 9B:
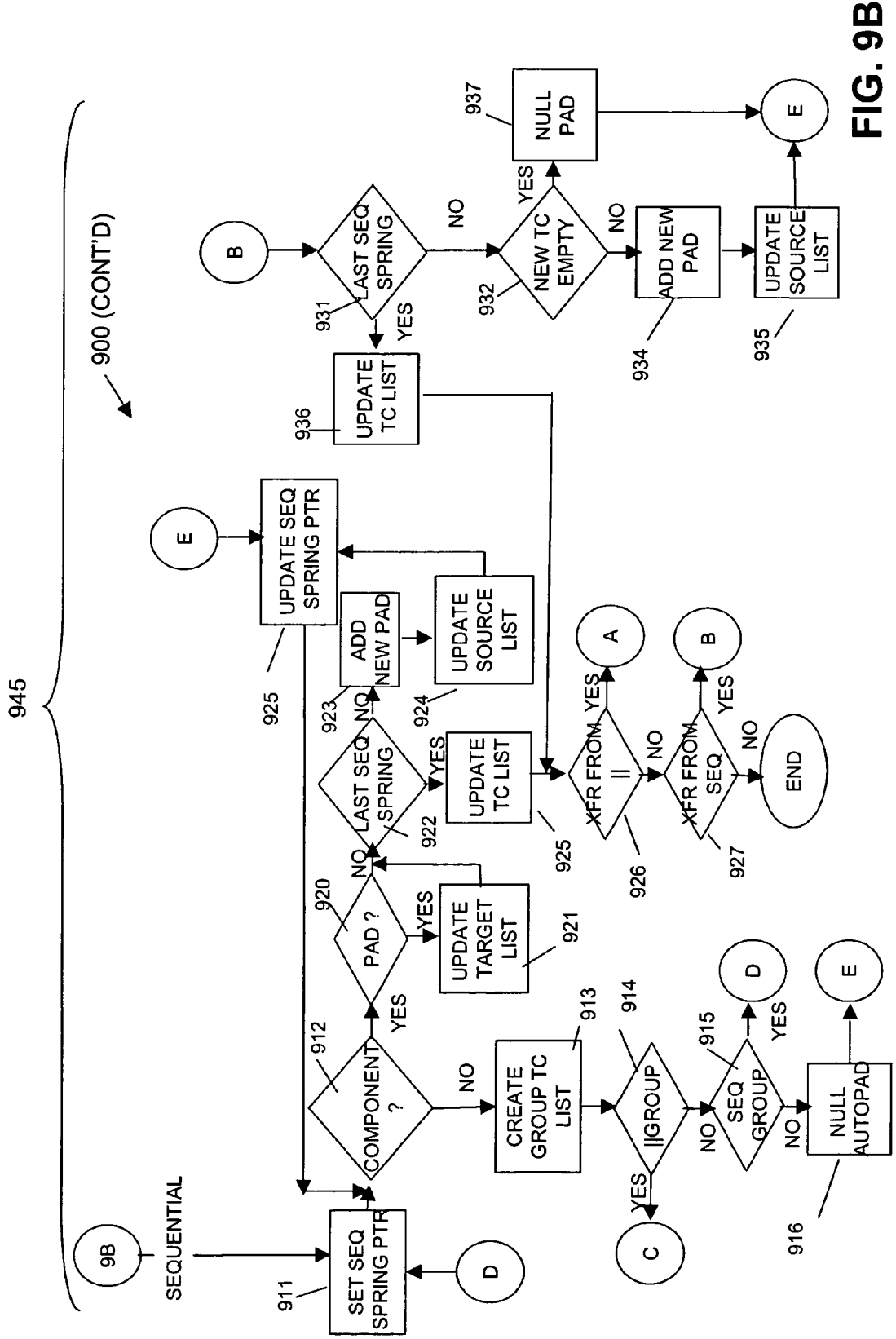

FIGS. 9A and 9B illustrate a process flow diagram 900 for one embodiment of the above autopadding generation guidelines. This process flow diagram is used for ease of explaining the application of the autopadding generation guidelines to the examples of FIGS. 8A and 8B and is not intended to limit the invention to this particular sequence of operations or to the use of pointers as described below. The sequence of operations are arranged to facilitate the description herein. In an actual application, one of skill in the art would not necessarily provide a different routine for each instance of the updated the target list operation, the trailing component list operation, or other operations that are repeated. Typically, a single routine would be used and called each time a particular operation is needed. Further, some of the operations would not be performed in all instances. Similarly, a sequence of check operations could be replaced with a more compact sequence of instructions or instruction. Accordingly, process flow diagram 900 is illustrative only and is not intended to limit the invention to the specific embodiment described more completely below.

An example of generating autopadding layout springs along a horizontal axis is further described with reference to FIGS. 8A, 9, and 10. An example of generating autopadding layout springs along a vertical axis is further described with reference to FIGS. 8B, 9, and 11.

Figure 10:
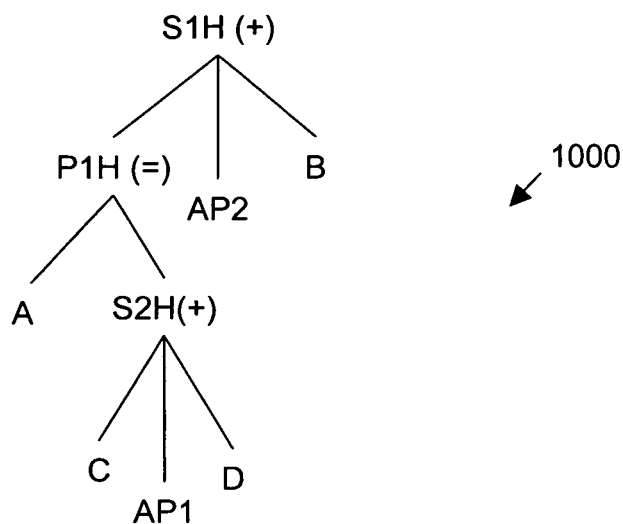
FIG. 10 illustrates a horizontal layout spring hierarchy including autopadding generated in accordance with one embodiment of the invention.

FIG. 10 illustrates a horizontal layout spring hierarchy 1000 including autopadding generated in accordance with one embodiment of the invention. In particular, horizontal layout spring hierarchy 1000 illustrates horizontal layout spring hierarchy 800H including autopadding layout springs generated and inserted in accordance with the autopadding generation guidelines.

In one embodiment, in accordance with the autopadding generation guidelines, the highest order layout spring in layout 800H, sequential group layout spring S1H, is visited. Sequential group layout spring S1H is supplied an empty trailing component list and an autopadding layout spring set to null in initialization operation 901. Processing transfers from initialization operation 901 to group check operation 903.

Group check operation 903 determines whether the current group layout spring, e.g., S1H, is a sequential group layout spring or a parallel group layout spring and transfers processing to the appropriate group autopadding generation process. In this example, as the current group layout spring, e.g., S1H, is a sequential group layout spring, group check operation 903 transfers processing to sequential group autopadding generation process 945 (FIG. 9B) that implements the above embodiment of the autopadding generation guidelines. Specifically, group check operation 903 transfers processing to set sequential spring pointer operation 911 and passes the empty trailing component list and the autopadding layout spring set to null to the sequential group autopadding generation process.

In this example, set sequential pointer operation 911 initializes a first pointer that is used in tracking the preorder traversal of sequential group layout spring hierarchy 800H (FIG. 8A). The use of a pointer is illustrative only and is not intended to limit the invention to this particular embodiment. In view of this disclosure, one of skill in the art can implement a process for monitoring the preorder traversal of sequential group layout spring hierarchy 800H using an appropriate process.

Set sequential spring pointer operation 911, initializes the first pointer to access a first child layout spring, parallel group layout spring P1H, and sets the current pointer to the first pointer. Operation 911 transfers processing to component check operation 912 (see Autopadding Generation Guideline S_1.a.).

Component check operation 912 determines whether the current layout spring, e.g., parallel group layout spring P1H, is a component layout spring. Since parallel group layout spring P1H is not a component layout spring ("NO"), check operation 912 transfers processing to create group trailing component list operation 913 (see Autopadding Generation Guideline S_2.a.).

Create group trailing component list operation 913 generates a new empty group trailing component list and transfers processing to parallel group check operation 914. Parallel group check operation 914 determines whether the current layout spring, e.g., parallel group layout spring P1H, is a parallel group layout spring (see Autopadding Generation Guideline S_2.b.). As group layout spring P1H is a parallel group layout spring ("YES"), processing transfers to set parallel spring pointer operation 951 (FIG. 9A) in parallel group autopadding generation process 975. The new trailing component list and the null autopadding layout spring are passed to operation 951.

In this example, set parallel spring pointer operation 951 initializes a second pointer that is used in tracking the preorder traversal of the parallel group layout spring hierarchy of parallel group layout spring P1H and sets the current pointer to the second pointer. Again, the use of a pointer is illustrative only and is not intended to limit the invention to this particular embodiment. In view of this disclosure, one of skill in the art can implement a process for monitoring the preorder traversal the hierarchy of a parallel group layout spring using an appropriate process. Operation 951 initializes the second pointer to access component layout spring A and transfers processing to component check operation 952 (see Autopadding Generation Guideline P_1.a.).

Component check operation 952 determines whether the current layout spring, e.g., layout spring A, is a component. As component layout spring A is a component layout spring ("YES"), component check operation 952 transfers processing to autopad not equal to null check operation 953 (see Autopadding Generation Guideline P_1.a.).

In autopad not equal to null check operation 953, a determination is made whether the current autopadding layout spring is not equal to null, e.g., is non-null. As the autopadding layout spring passed to the parallel group autopadding process is set to null ("NO"), check operation 953 transfers processing to update trailing component list operation 955.

In update trailing component list operation 955, component layout spring A is added as a trailing component layout spring to the new group trailing component list that was supplied to parallel group autopadding process 975, e.g., to the group trailing component list of parallel layout group P1H (see Autopadding Generation Guideline P_1.b.). Operation 955 transfers processing to last parallel spring check operation 956.

Last parallel layout parallel spring check operation 956 determines whether the current layout spring, e.g., component layout spring A, is the last layout spring. Since component layout spring A is not the last spring in parallel group layout spring P1H ("NO"), check operation 956 transfers processing to update parallel spring pointer operation 959. Operation 959 udpates the second pointer to access the next layout spring in pre-order traversal of parallel group layout spring P1H, which is sequential group layout spring S2H in parallel group layout spring P1H. Operation 959 (see Autopadding Generation Guideline P_2) transfers processing to component check operation 952.

As earlier described, in component check operation 952 a determination is made whether the current layout spring, e.g., S2H, is a component layout spring. Since sequential group layout spring S2H is not a component layout spring ("NO"), check operation 952 transfers processing to parallel group check operation 960.

In parallel group check operation 960 a determination is made whether the current layout spring, S2H is a parallel group layout spring. Since sequential group layout spring S2H is not a parallel group layout spring ("NO"), check operation 960 transfers processing to sequential group check operation 961.

In sequential group check operation 961, a determination is made whether the current layout spring is a sequential group layout spring. Since sequential group layout spring S2H is a sequential group layout spring ("YES"), check operation 961 transfers processing to set sequential spring pointer operation 911 (FIG. 9B). Set sequential spring pointer 911 initializes a third pointer that is used in tracking the preorder traversal of the hierarchy of sequential group layout spring S2H. The third pointer is initialized to access child component layout spring C. Operation 911 also is passed the new group trailing component list and the null autopadding spring.

Upon completion, operation 911 transfers processing to component check operation 912 (see Autopadding Generation Guideline S_1). As earlier described, in component check operation 912 a determination is made whether the current layout spring, e.g., component layout spring. C, is a component layout spring. Since component layout spring C, is a component ("YES"), component check operation 912 transfers processing to pad check operation 920 (see Autopadding Generation Guideline S_1.a.).

In pad check operation 920, a determination is made whether the current autopadding spring is non-null. Since the current autopadding spring is null ("NO"), pad check operation 920 transfers processing to last sequential spring check operation 922 (see Autopadding Generation Guideline S_1.a.).

In last sequential spring check operation 922 a determination is made whether the current spring, e.g., component layout spring C, is the last spring in the sequential group, e.g., in S2H. As component layout spring C is not the last layout spring of sequential group layout spring S2H ("NO"), check operation 922 transfers processing to add new pad operation 923 (see Autopadding Generation Guideline S_1.b.).

Add new pad operation 923 generates a new autopadding layout spring, which is illustrated in FIG. 10 as autopadding layout spring AP1, and adds the current layout spring, e.g., component layout spring C, as a source. Thus, autopadding layout spring AP1 has as a source, component layout spring C. Autopadding layout spring AP1 is inserted, e.g., added, as an autopadding layout spring, after layout spring C in the horizontal layout spring hierarchy 1000. Upon completion, AP1 becomes the current autopadding layout spring, and add new pad operation 923 transfers processing to update source list operation 924.

Update source list operation 924 adds a entry in the source list of autopadding layout spring AP1 indicating that component layout spring C is a source. Operation 924 transfers processing to update sequential spring pointer operation 925.

Update sequential spring pointer operation 925 updates the third pointer, which is the current spring pointer, to access component layout spring D and transfers processing to component check operation 912. In component check operation 912 a determination is made whether the current layout spring, e.g., component layout spring D, is a component layout spring. As component layout spring D is a component layout spring ("YES"), component check operation 912 transfers processing to pad check operation 920 (see Autopadding Generation Guideline S_1.a.).

In pad check operation 920 a determination is made whether the passed autopadding spring is non-null. As the current autopadding spring is not null ("YES"), pad check operation 920 transfers processing to update target list operation 921 (see Autopadding Generation Guideline S_1.a.).

Update target list operation 921 adds component layout spring D to the target list for autopadding layout spring AP1. Updated target list operation 921 transfers processing to last sequential spring check operation 922.

In last sequential spring check operation 922, a determination is made whether the current layout spring, e.g., component layout spring D, is the last layout spring in the sequential group, e.g., S2H. AS component layout spring D is the last layout spring of sequential group layout spring S2H ("YES"), check operation 922 transfers processing to update trailing component list operation 925.

In update trailing component list operation 925, layout spring D is added as a trailing component layout spring to the new trailing component list of sequential group layout spring S2H. Operation 925 also changes the current pointer from the third pointer to the second pointer, which was for parallel group layout spring P1H and pointed to sequential group layout spring S2H, which is the last spring in parallel group layout spring P1H. Operation 925 transfers processing to parallel group check operation 926

In parallel group check operation 926 a determination is made whether the current pointer, e.g., now the second pointer, is to a parallel group layout spring. As the current pointer, the second pointer, is for a parallel group layout spring ("YES"), check operation 926 transfers processing to last parallel spring check operation 956 (FIG. 9A).

In last parallel spring check operation 956, a determination is made whether the current layout spring, e.g., sequential group layout spring S2H, is the last layout spring in the parallel group layout spring, e.g., P1H. Since sequential group layout spring S2H is the last spring in parallel group layout spring P1H ("YES"), check operation 956, changes the current pointer from the second pointer to the first pointer, which was for sequential group layout spring S1H and pointed to parallel layout spring P1H and transfers processing to transfer from parallel group check operation 957.

In transfer from parallel group check operation 957, a determination is made whether the current pointer is to a parallel group. As the current pointer is to a sequential group layout spring S1H ("NO"), check operation 957 transfers processing to transfer from sequential group check operation 958.

In transfer from sequential group check operation 958, a determination is made whether the current pointer is to a sequential group. As the current pointer is to sequential group layout spring S1H ("YES"), processing transfer to last sequential spring check operation 931 (see Autopadding Generation Guideline S_2.c.).

In last sequential spring check operation 931, a determination is made whether the current pointer is to a layout spring that is the last layout spring in the sequential group. As the current pointer is to parallel group layout spring P1H, which is not the last spring in sequential group layout spring S1H ("NO"), check operation 931 transfers processing to new trailing component list empty check operation 932 (see Autopadding Generation Guideline S_2.d.).

In new trailing component list empty check operation 932, a determination is made whether the new trailing component list is empty. As the new trailing component list, in this example, is not empty ("NO"), check operation 932 transfers processing to add new pad operation 934.

In operation 934, a new autopadding layout spring AP2 is created. Autopadding layout spring AP2 becomes the current autopadding spring for S1H and is added after parallel group layout spring P1H in horizontal hierarchical layout spring structure 1000. (FIG. 10) Processing transfers from operation 934 to update source list operation 935.

In update source list operation 935, component layout spring D, and component layout spring A are added to the source list of autopadding layout spring AP2. Update source list operation 935 transfers processing to update sequential spring pointer operation 925 that in turns updates the current pointer to access component spring layout B. Update source list operation 935 transfers processing to component check operation 912 (see Autopadding Generation Guideline S_1).

In component check operation 912 a determination is made whether the current layout spring, e.g., component layout spring B, is a component layout spring. Since layout spring B is a component layout spring ("YES"), component check operation 912 transfers processing to pad check operation 920.

In pad check operation 920 a determination is made whether the current autopadding layout spring is non-null. As autopadding layout spring AP2 is non-null ("YES"), pad check operation 920 transfers processing to update target list operation 921.

In update target list operation 921, component layout spring B is added as a target to autopadding layout spring AP2. Operation 921 transfers processing to last sequential spring check operation 922.

In last sequential spring check operation 922, a determination is made whether the current layout spring, e.g., component layout spring D is the last layout spring in sequential group layout spring S1H ("YES"), last sequential spring check operation 922 transfers processing to update trailing component list operation 925. In operation 925, component layout spring D is added to the trailing component list for sequential group layout spring S1H and then determines whether there is another pointer defined. Since there is no other pointer defined, operation 925 sets the current pointer to null, and transfers processing to parallel group check operation 926.

In parallel group check operation 926, a determination is made whether the current pointer is to a parallel group layout spring. Since the current pointer is set to null, the current pointer is not set to a parallel group layout spring ("NO"), and check operation 926 transfers processing to sequential group check operation 927.

In sequential group check operation 927, a determination is made whether the current pointer is to a sequential group layout spring. As the current pointer is set to null, the current pointer is not set to a sequential group layout spring ("NO"), and check operation 927 transfers processing to an end operation with processing of the horizontal layout spring hierarchy 800H complete. The resulting horizontal hierarchical layout spring structure 1000 becomes as illustrated in FIG. 10 with the sizes of autopadding layout spring AP1 and autopadding layout spring AP2 initially set to zero (0).

Figure 11:
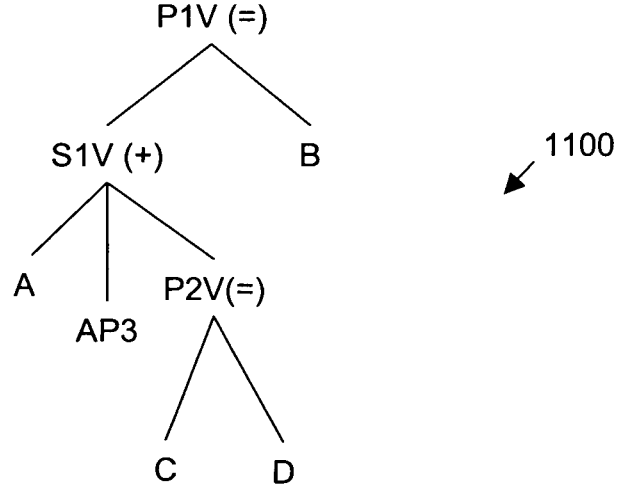
FIG. 11 illustrates a vertical layout spring hierarchy including autopadding generated in accordance with one embodiment of the invention.

FIG. 11 illustrates a vertical layout spring hierarchy 1100 including autopadding generated in accordance with one embodiment of the invention. In particular, vertical layout spring hierarchy 1100 illustrates vertical layout spring hierarchy 800V (FIG. 8B) including autopadding layout springs generated and inserted in accordance with the autopadding generation guidelines.

In one embodiment, in accordance with the autopadding generation guidelines, the highest order parent spring in vertical layout spring hierarchy 800V, parallel group layout spring P1V, is visited. Parallel group layout spring P1V is supplied an empty trailing component list and an autopadding layout spring set to null in initialization operation 901.

Processing transfers from initialization operation 901 to group check operation 903. Group check operation 903 determines whether parallel group layout spring P1V is a sequential group layout spring or a parallel group layout spring and transfers processing to the appropriate group autopadding process. In this example, parallel group layout spring P1V is a parallel group layout spring and group check operation 903 transfers processing to the parallel group autopadding process 975 (FIG. 9A) that implements the above embodiment of the autopadding generation guidelines. Specifically, group check operation 903 transfers processing to set parallel spring pointer operation 951 and passes the empty trailing component list and the autopadding layout spring set to null to the parallel group autopadding process.

In this example, set parallel pointer operation 951 initializes a first pointer that is used in tracking the preorder traversal of parallel group layout spring hierarchy 800V. Again, the use of a pointer is illustrative only and is not intended to limit the invention to this particular embodiment. In view of this disclosure, one of skill in the art can implement a process for monitoring the preorder traversal of parallel group layout spring hierarchy 800V using an appropriate process.

Set parallel spring pointer operation 951, initializes the first pointer to access a first child spring, sequential group layout spring S1V, and sets the current pointer to the first pointer. Operation 951 transfers processing to component check operation 952.

In component check operation 952, a determination is made whether the current layout spring, e.g., S1V, is a component layout spring. As sequential group layout spring S1V is not a component layout spring ("NO"), check operation 952 transfers processing to parallel group check operation 960.

In parallel group check operation 960, a determination is made whether the current layout spring, e.g., S1V, is a parallel group layout spring. Since sequential group layout spring S1V is not a parallel group layout spring ("NO"), check operation 960 transfers processing to sequential group spring check operation 961.

In sequential group spring check operation 961, a determination is made whether the current layout spring, e.g., S1V, is a sequential group layout spring. As group layout spring S1V is a sequential group layout spring ("YES"), check operation 961 transfers processing to set sequential spring pointer operation 911 (FIG. 9B). Set sequential spring pointer operation 911 initializes a second pointer that is used in tracking the preorder traversal of the hierarchy of sequential group layout spring S1V. The second pointer is initialized to access component layout spring A. Operation 911 also is passed the new group trailing component list and the null autopadding spring.

Upon completion, operation 911 transfers processing to component check operation 912 (see Autopadding Generation Guideline S_1). In component check operation 912, a determination is made whether the current layout spring, e.g., layout spring A, is a component layout spring. Since layout spring A is a component layout spring ("YES"), component check operation 912 transfers processing to pad check operation 920 (see Autopadding Generation Guideline S_1.a.).

In pad check operation 920, a determination is made whether the current autopadding layout spring is non-null. As the passed autopadding spring is null ("NO"), pad check operation 920 transfers processing to last sequential spring check operation 922 (see Autopadding Generation Guideline S_1.a.).

In last sequential spring check operation 922, a determination is made whether the current layout spring, e.g., layout spring A, is the last layout spring. As component layout spring A is not the last layout spring of sequential group layout spring S1V ("NO"), check operation 922 transfers processing to add new pad operation 923 (see Autopadding Generation Guideline S_1.b.).

Add new pad operation 923 generates a new autopadding layout spring illustrated in FIG. 10 as autopadding layout spring AP3. Autopadding layout spring AP3 becomes the current autopadding layout spring and has as a source, component layout spring A. Autopadding layout spring AP3 is inserted, e.g., added, as an autopadding layout spring after component layout spring A in vertical layout spring hierarchy 1100. Upon completion, add new pad operation 923 transfers processing to update source list operation 924.

Update source list operation 924 adds a entry in the source list of autopadding layout spring AP3 indicating that component layout spring A is the source. Operation 924 transfers processing to update sequential spring pointer operation 925.

Update sequential spring pointer operation 925 updates the second pointer, which is the current pointer, to access parallel group layout spring P2V and transfers processing to component check operation 912.

In component check operation 912, a determination is made whether the current layout spring, e.g., P2V, is a component layout spring. As parallel group layout spring P2V is not a component layout spring ("NO"), check operation 912 transfers processing to create group trailing component list operation 913 (see Autopadding Generation Guideline S_2.a.).

Create group trailing component list operation 913 generates a new empty group trailing component list and transfers processing to parallel group check operation 914. Parallel group check operation 914 determines whether the current layout spring, e.g., P2V, is a parallel group layout spring. Since parallel group layout spring P2V is a parallel group layout spring ("YES"), processing transfers to set parallel spring pointer operation 951 (FIG. 9A) in parallel group autopadding process 975. The new trailing component list and autopadding layout spring AP3 are passed to operation 951.

In this example, set parallel spring pointer operation 951 initializes a third pointer that is used in tracking the preorder traversal of the parallel group layout spring hierarchy of parallel group layout spring P2V and sets the current pointer to the third pointer. Again, the use of a pointer is illustrative only and is not intended to limit the invention to this particular embodiment. Operation 951 initializes the third pointer to access component layout spring C, and transfers processing to component check operation 952 (see Autopadding Generation Guideline P__1).

In component check operation 952, a determination is made whether the current layout spring, e.g., layout spring C, is a component layout spring. As layout spring C is a component layout spring ("YES"), component check operation 952 transfers processing to autopad not equal to null check operation 953 (See Autopadding Generation Guideline P__1 a).

In autopad not equal to null check operation 953, a determination is made whether the current autopadding layout spring is not equal to null. As the autopadding spring passed to the parallel group autopadding process is not null ("YES"), check operation 953 transfers processing to update target list operation 954.

In update target list operation 954, layout spring C is added as a target of autopadding layout spring AP3. Operation 954 transfers processing to update trailing component list operation 955.

In update trailing component list operation 955, layout spring C is added as a trailing component layout spring to the new group trailing component list that was supplied to parallel group autopadding process 975. Operation 955 transfers processing to last parallel spring check operation 956.

In last parallel spring check operation 956, a determination is made whether the current layout spring, e.g., layout spring C, is the last spring. As component layout spring C is not the last spring in parallel group layout spring P2V ("NO"), check operation 956 transfers processing to update parallel spring pointer operation 959. Operation 959 udpates the third pointer to access component layout spring D and transfers processing to component check operation 952.

In component check operation 952, a determination is made whether the current layout spring, e.g., layout spring D, is a component layout spring. As layout spring D is a component layout spring ("YES"), component check operation 952 transfers processing to autopad not equal to null check operation 953 (see Autopadding Generation Guideline P__1.a.). In autopad not equal to null check operation 953, a determination is made whether the autopadding layout spring is not equal to null. As the autopadding layout spring passed to parallel group autopadding process 975 is not null ("YES"), check operation 953 transfers processing to update target list operation 954.

In update target list operation 954, layout spring D is added as a target of autopadding layout spring AP3. Operation 954 transfers processing to update trailing component list operation 955.

In update trailing component list operation 955, layout spring D is added as a trailing component layout spring to the new group trailing component list that was supplied to parallel group autopadding process 975. Operation 955 transfers processing to last parallel spring check operation 956.

In last parallel spring check operation 956, a determination is made whether the current layout spring, e.g., D, is the last layout spring. As component layout spring D is the last spring in parallel group layout spring P2V ("YES"), check operation 956 changes the current pointer from the third pointer to the second pointer, which was for sequential group layout spring S1V and pointed to parallel layout spring P2V and transfers processing to parallel group check operation 957.

In parallel group check operation 957 a determination is made whether the current pointer is for a parallel group layout spring. As the current pointer is for sequential group layout spring S1V ("NO"), check operation 957 transfers processing to sequential group check operation 958.

In sequential group check operation 958, a determination is made whether the current pointer is for a sequential group layout spring. As the current pointer is for sequential group layout spring S1V ("YES"), sequential group check operation transfers processing to last sequential spring check operation 931 (see Autopadding Generation Guidelines S__2.c.).

In last sequential spring check operation 931, a determination is made whether the current layout spring is the last layout spring. As the current layout spring is parallel group layout spring P2V in sequential group layout spring S1V, which is the last spring in sequential group layout spring S1V ("YES"), check operation 931 transfers processing to update trailing component list operation 936. Update trailing component list operation 936 takes the information from the new trailing component list and places the information in the trailing component list for sequential group layout spring S1V. Operation 936 also changes the current pointer to the first pointer, which is the pointer to sequential group layout spring S1V in parallel group layout spring P1V. Operation 936 transfers processing to parallel group check operation 926.

In parallel group check operation 926, a determination is made whether the current pointer is for a parallel group layout spring. As the current pointer, the first pointer, is for parallel group layout spring P1V ("YES"), check operation 926 transfers processing to last parallel spring check operation 956 (FIG. 9A). In last parallel spring check operation 956, a determination is made whether the current layout spring is the last layout spring in a parallel group layout spring. As sequential group layout spring S1V is not the last spring in parallel group layout spring P1H ("NO"), check operation 956 transfers processing to update parallel spring pointer check operation 959.

Operation 959 updates the first pointer to access component layout spring B and transfers processing to component check operation 952.

In component check operation 952, a determination is made whether the current layout spring, e.g., layout spring B, is a component layout spring. As layout spring B is a component layout spring ("YES"), component check operation 952 transfers processing to autopad not equal to null check operation 953 (see Autopadding Generation Guideline P__1.a.). In autopad not equal to null check operation 953, a determination is made whether the autopadding layout spring is not equal to null. As the autopadding layout spring passed to the parallel group autopadding process is null ("NO"), check operation 953 transfers processing to update trailing component list operation 955.

In update trailing component list operation 955, layout spring B is added as a trailing component layout spring to the group trailing component list that was supplied to parallel group autopadding process 975. Operation 955 transfers processing to last parallel spring check operation 956.

In last parallel spring check operation 956, a determination is made whether the current layout spring is the last layout spring in the parallel group layout spring. As component layout spring B is the last layout spring in parallel group layout spring P1V ("YES"), check operation 956 determines whether there is another pointer is defined. Since there is no other pointer defined, operation 956 sets the current pointer to null, and transfers processing to parallel group check operation 957.

In parallel group check operation 957, a determination is made whether the current pointer is to a parallel group layout spring. As the current pointer is set to null, the current pointer is not to a parallel group layout spring ("NO"), and parallel group check operation 957 transfers processing to sequential group check operation 958.

In sequential group check operation 958, a determination is made whether the current pointer is to a sequential group layout spring. As the current pointer is set to null, the current pointer is not to a sequential group layout spring ("NO"), and sequential group check operation 958 transfers processing to an end operation with processing of the vertical layout spring hierarchy 800V complete. The resulting vertical layout spring hierarchy 1100 becomes as illustrated in FIG. 11 with the size of autopadding layout spring AP3 initially set to zero (0).

Thus, in this operation, a new layout of the components in the container component is generated including autopadding as described above. The new layout can be executed on the same software platform or executed on a different software platform.

When the new layout is executed, the size of the autopadding is determined in accordance with the visual guidelines of the underlying software platform as further described. Referring again to FIG. 2, from GENERATE AUTOPADDING LAYOUT SPRINGS WITH INITIAL SIZE EQUAL ZERO operation 210, processing transitions to a DETERMINE SIZE OF HORIZONTAL COMPOSITE LAYOUT SPRING AND SIZE OF VERTICAL COMPOSITE LAYOUT SPRING operation 212.

In DETERMINE SIZE OF HORIZONTAL COMPOSITE LAYOUT SPRING AND SIZE VERTICAL COMPOSITE LAYOUT SPRING operation 212, the size of the horizontal composite layout spring and the size of the vertical composite layout spring are determined and set. More particularly, the horizontal composite layout spring and the vertical composite layout spring are each separately built up of the sizes of the constituent layout springs, e.g., FIGS. 10 AND 11 respectively.

The size of each of the constituent component layout spring is determined and set based on the size, i.e., vertical size and horizontal size, of the container component. Where a specified size of the container component was not input, in one embodiment, a user is queried for a vertical size and horizontal size input for the container component. In a yet another embodiment, rather than querying the user, the minimum, preferred, or maximum sizes of each of the constituent layout springs are used to determine a default sizing of each of the component layout springs, and thus a size of each of the horizontal composite layout spring and the vertical composite layout spring.

As earlier described, each of the autopadding layout springs generated in operation 210 are initially set to a size of zero (0), thus the current operation determines and sets the size of the horizontal composite layout spring and the size of the vertical composite layout spring to the container component size with effectively no horizontal spacing or vertical spacing, respectively. From DETERMINE SIZE OF HORIZONTAL COMPOSITE LAYOUT SPRING AND SIZE OF VERTICAL COMPOSITE LAYOUT SPRING operation 212, processing transitions to a DETERMINE SIZE OF AUTOPADDING LAYOUT SPRING(S) IN ACCORDANCE WITH VISUAL GUIDELINES operation 212.

In DETERMINE SIZE OF AUTOPADDING LAYOUT SPRING(S) IN ACCORDANCE WITH VISUAL GUIDELINES operation 214, the size of each autopadding layout spring generated in operation 210 is determined in accordance with a visual guideline. In particular, in one embodiment, when executed on an underlying software platform the visual guidelines utilized by the underlying software platform are referenced and each autopadding layout spring, as well as each component layout spring is sized in accordance with the visual guidelines of the underlying software platform. In one embodiment, each autopadding layout spring as well as each component layout spring is sized such that the layout of the one or more components in the container component is arranged in accordance with the visual guidelines of the underlying software platform.

As earlier described, initially, all of the autopadding layout springs have a minimum, preferred, and maximum size of zero (0). To determine the size of each autopadding layout spring, the size and location of the component layout springs in the layout are taken into consideration. Once each component layout spring is sized in operation 212, the size of each autopadding layout spring is determined.

As earlier described, an autopadding spring is created with one or more source layout springs and one or more target layout springs. When a target layout spring is added to the autopadding layout spring, each of the source layout springs is compared to each target layout spring. When the source layout spring and the target layout spring share a common parallel group layout spring ancestor along the opposite axis, the source layout spring and the target layout spring are considered to match.

In one embodiment, the distance between each pair of matching component layout springs associated with an autopadding layout spring, e.g., sources and targets, is determined. For example, in FIG. 10, autopadding layout spring AP1 includes the matching component layout springs C and D in the horizontal dimension. The distance between layout spring C and layout spring D is defined as the origin, i.e., position in the layout along the horizontal x axis, of layout spring D minus (−) the origin, i.e., position in the layout along the horizontal x axis, of layout spring C minus (−) the size of layout spring C, i.e., the width of component C along the horizontal x axis.

Next, the preferred spacing between components is obtained from visual guidelines. In one embodiment, the preferred spacing in the visual guidelines specifies a specific spacing size or range of spacing sizes used to separate components in a layout and/or components within a container component from the container component.

In one embodiment, the preferred spacing obtained from the visual guidelines is compared to the distance between each pair of matching component layout springs associated with an autopadding layout spring. If the preferred spacing as defined by the visual guidelines is larger than the difference of the distance between the two matching component layout springs, the preferred size of the autopadding layout spring is determined and set as the maximum of: the current preferred spacing defined in the visual guidelines, and the difference of the preferred spacing, and the difference of the distance between the two component layout springs.

For example, assume the current preferred spacing defined by visual guidelines is p, the difference of the distance between the matching component layout springs is d, and the preferred size of an autopadding layout spring is G. The new preferred size of the autopadding layout spring is Max (p, G-d). From DETERMINE SIZE OF AUTOPADDING LAYOUT SPRING(S) IN ACCORDANCE WITH VISUAL GUIDELINES operation 214, processing transitions to a RE-DETERMINE SIZE OF HORIZONTAL COMPOSITE LAYOUT SPRING AND SIZE OF VERTICAL COMPOSITE LAYOUT SPRING operation 216.

In RE-DETERMINE SIZE OF HORIZONTAL COMPOSITE LAYOUT SPRING AND SIZE OF VERTICAL COMPOSITE LAYOUT SPRING operation 216, the size of each of the horizontal composite layout spring and the vertical composite layout spring is re-determined and reset. More particularly, as the sizes of the autopadding layout spring(s) were determined and set in accordance with the visual guidelines in operation 214, the constituent component layout springs are readjusted to accommodate the resized autopadding layout springs. Thus, in the present embodiment, the layout of the components is determined in accordance with the look and feel of the visual guidelines of an underlying software platform without the developer having to be familiar with the underlying software platform on which the cross layout is executed. From RE-DETERMINE SIZE OF HORIZONTAL COMPOSITE LAYOUT SPRING AND VERTICAL COMPOSITE LAYOUT SPRING operation 216, processing transitions to an EXIT operation 218 with processing exiting method 200.

Container Autopadding

In some embodiments, the above operations referencing autopadding include generation of container autopadding. In one embodiment, the container autopadding is automatically generated in accordance with the visual guidelines.

In one embodiment, a container component is defined by a boundary that is characterized by the size and type of the container component. Constituent components, constituent autopadding, and constituent container autopadding, if any, are within the boundary of a container component.

In one embodiment, container autopadding is generated by wrapping the root layout spring in each of the horizontal layout spring hierarchy and the vertical layout spring hierarchy in a sequential layout spring. And, in each of the above hierarchies, a container autopadding layout spring is added before the root layout spring and a container autopadding layout spring is added after the root layout spring, thus spacing the root layout spring from the boundary of the container as further described with reference to FIGS. 12 and 13.

Figure 12:
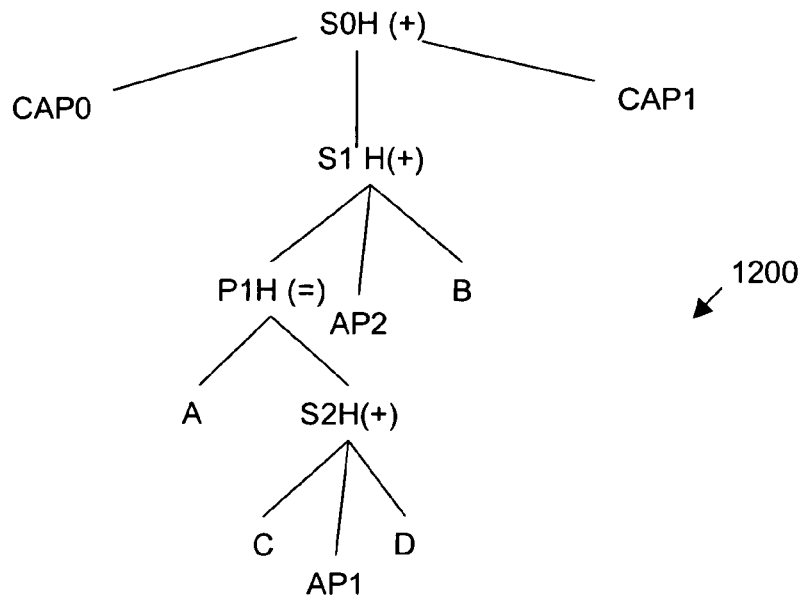
FIG. 12 illustrates an example of a horizontal layout spring hierarchy including container autopadding generated in accordance with one embodiment of the invention.

FIG. 12 illustrates an example of a horizontal layout spring hierarchy including container autopadding in accordance with one embodiment of the invention. In particular, in one embodiment, horizontal layout spring hierarchy 1200 illustrates horizontal layout spring hierarchy 1000 including container autopadding layout springs generated and inserted as explained more completely below.

In FIG. 12, sequential group layout spring S1H is wrapped in a sequential group layout spring S0H. Container autopadding layout spring CAP0H and container autopadding layout spring CAP1H are inserted to separate sequential group layout spring S0H from the container component boundary, e.g., container component 302H (FIG. 4).

Figure 13:
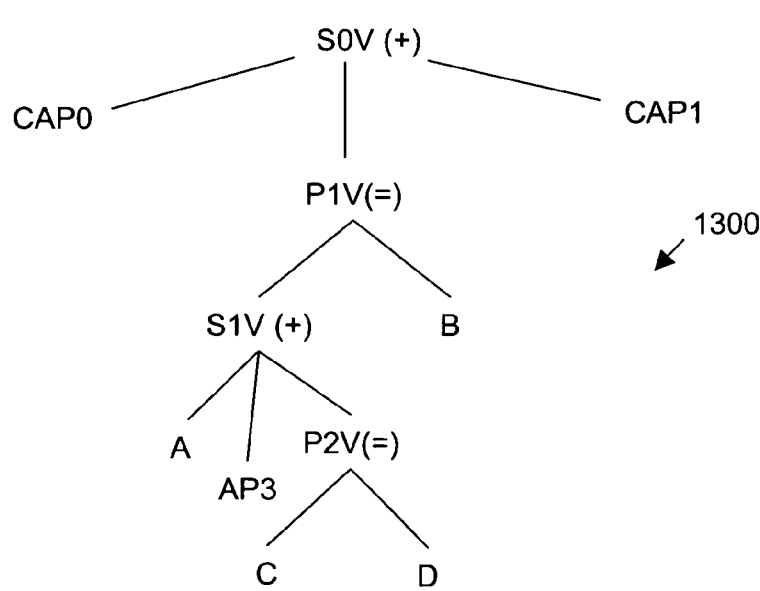
FIG. 13 illustrates an example of a vertical layout spring hierarchy including container autopadding generated in accordance with one embodiment of the invention.

FIG. 13 illustrates an example of the vertical hierarchical spring hierarchy of FIG. 11 including container autopadding generated in accordance with one embodiment of the invention. In particular, vertical layout spring hierarchy 1300 illustrates vertical layout spring hierarchy 1100 including container autopadding layout springs generated and inserted as explained more completely below.

In FIG. 13, parallel group layout spring P1V is wrapped in a sequential group layout spring S0V. Container autopadding layout spring CAP0V and container autopadding layout spring CAP1V are inserted to separate parallel group layout spring P1V from the container component boundary, e.g., container component 302V (FIG. 7).

Container autopadding layout springs can be viewed as a specific case of user specified autopadding layout springs. That is, method 200 is modified such that if the next autopadding layout spring is a container autopadding layout spring, the source or target of the autopadding layout spring is updated appropriately. Container autopadding layout springs differ from autopadding layout springs in that container autopadding layout springs only have a source or a target, but not both.

For example, referring to FIG. 12, container autopadding layout spring CAP0H has targets of layout spring A and layout spring C. Container autopadding layout spring CAP1H has a source of layout spring B. Referring to FIG. 13, container autopadding layout spring CAP0V has targets of layout spring A and layout spring B. Container autopadding layout spring CAP1V has sources of layout spring C, layout spring D, and layout spring B.

As described above, a user can input a layout of one or more components in a container component and request the generation of autopadding, as well as container autopadding, if so desired. Cross platform layout application 106 automatically generates a cross platform layout, such as cross platform layout 300 including autopadding, and any container autopadding. When the cross platform layout is executed on a software platform utilized by an underlying computer system, the autopadding is automatically sized in accordance with the visual guidelines of the software platform. In particular, in one embodiment, the location, the source components, and the target components associated with each autopad are automatically determined, and the size of each autopad is determined in accordance with preferred spacing referenced in a visual guidelines of the underlying software platform. In other embodiments, the visual guidelines are user specified, and can differ from the visual guidelines of the underlying software platform.

In a second embodiment, a user can input the location of padding in the layout input and request cross platform layout application 106 to automatically determine the source(s) and target(s) associated with the padding layout springs. Thus, in this second embodiment, padding layout springs are not removed from the layout input, i.e., operation 208 is not performed, and associated padding layout springs are placed in the horizontal layout spring hierarchy and/or the vertical layout spring hierarchy, as appropriate, at the locations input by the user, however each padding layout spring has an empty source list and an empty target list.

In this second embodiment, when evaluating sequential group layout springs as described with reference to operation 210 of method 200 (FIG. 2), where a determination would be made to add a new autopadding layout spring, rather than adding a new autopadding layout spring, a determination is made whether the next layout spring is a padding layout spring. If the next layout spring is a padding layout spring, a determination is made whether the source is set correctly, e.g., the source is determined and if not present, is added as a source to the padding layout spring. If the next layout spring is not a padding layout spring, any padding layout spring and the trailing component list are cleared.

In a third embodiment, a user can input padding in the layout input specifying the source components and the target components of each padding layout spring. Thus, in this third embodiment, padding layout springs are not removed from the layout input, i.e., operation 208 is not performed, and associated padding layout springs are placed in the horizontal layout spring hierarchy and/or the vertical layout spring hierarchy, as appropriate, at the locations input by the user, with the target and sources as specified by the user.

In this third embodiment, cross platform layout application 106 references the preferred spacing in the visual guidelines, and sets the sizes of the padding layout springs in accordance with the visual guidelines.

As earlier described, components can be defined in a layout such that the components or the contents of the components are aligned along a baseline. In one embodiment, a baseline is an imaginary line along which the components or contents of the components are positioned. Frequently, components in a layout have different baselines.

To produce a visually appealing layout, in one embodiment, a user can create a special type of parallel group, termed a parallel baseline group, in which the components of the parallel baseline group are positioned such that the baselines of the individual components have the same location along the y axis. In particular, in the present embodiment, each component in a parallel baseline group is aligned automatically in a container component such that the baseline of the individual components have the same location on the vertical axis, i.e., y axis, of the container component.

As earlier described, the size of a parallel group is the maximum of the constituent layout springs. Differently, the minimum, preferred, and maximum size of a parallel baseline group is the sum of the maximum ascent and maximum descent of the constituent layout springs. In one embodiment, an ascent is the distance above the baseline of the component, and a descent is the distance below the baseline of the component. The ascent and descent of a component are explained more completely herein with reference to FIG. 14.

Figure 14:
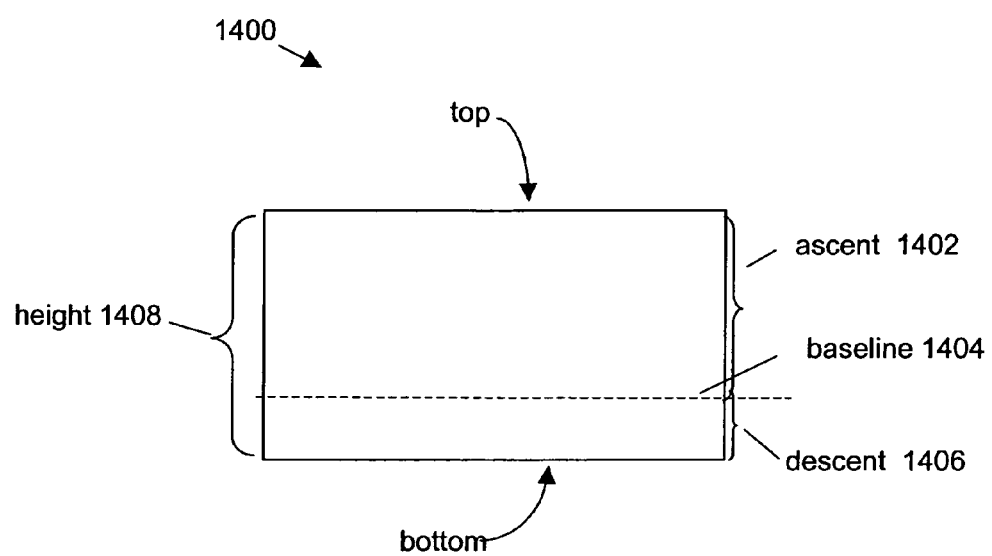
FIG. 14 illustrates an example of an ascent and a descent of a component along a vertical axis from a baseline in accordance with one embodiment of the invention.

FIG. 14 illustrates an example of an ascent and a descent of a component along a vertical axis from a baseline in accordance with one embodiment of the invention. In FIG. 14, a component 1400 is defined having a preferred height of 1408 with a baseline 1404. Ascent 1402 and descent 1406 together vertically align component 1400 on baseline 1404. Thus, in FIG. 14, ascent 1402 is a distance from baseline 1404 to a top of component 1400, and descent 1406 is a distance from baseline 1404 to a bottom of component 1400.

In one embodiment of the invention, a preferred height and baseline of a parallel baseline group is determined based on a maximum ascent and a maximum descent of the components belonging to the parallel baseline group. The components of the parallel baseline group are positioned relative to a baseline location on the y axis such that the components or the contents of the components align along the baseline as explained more completely herein with reference to FIGS. 15 and 16.

Figure 15:
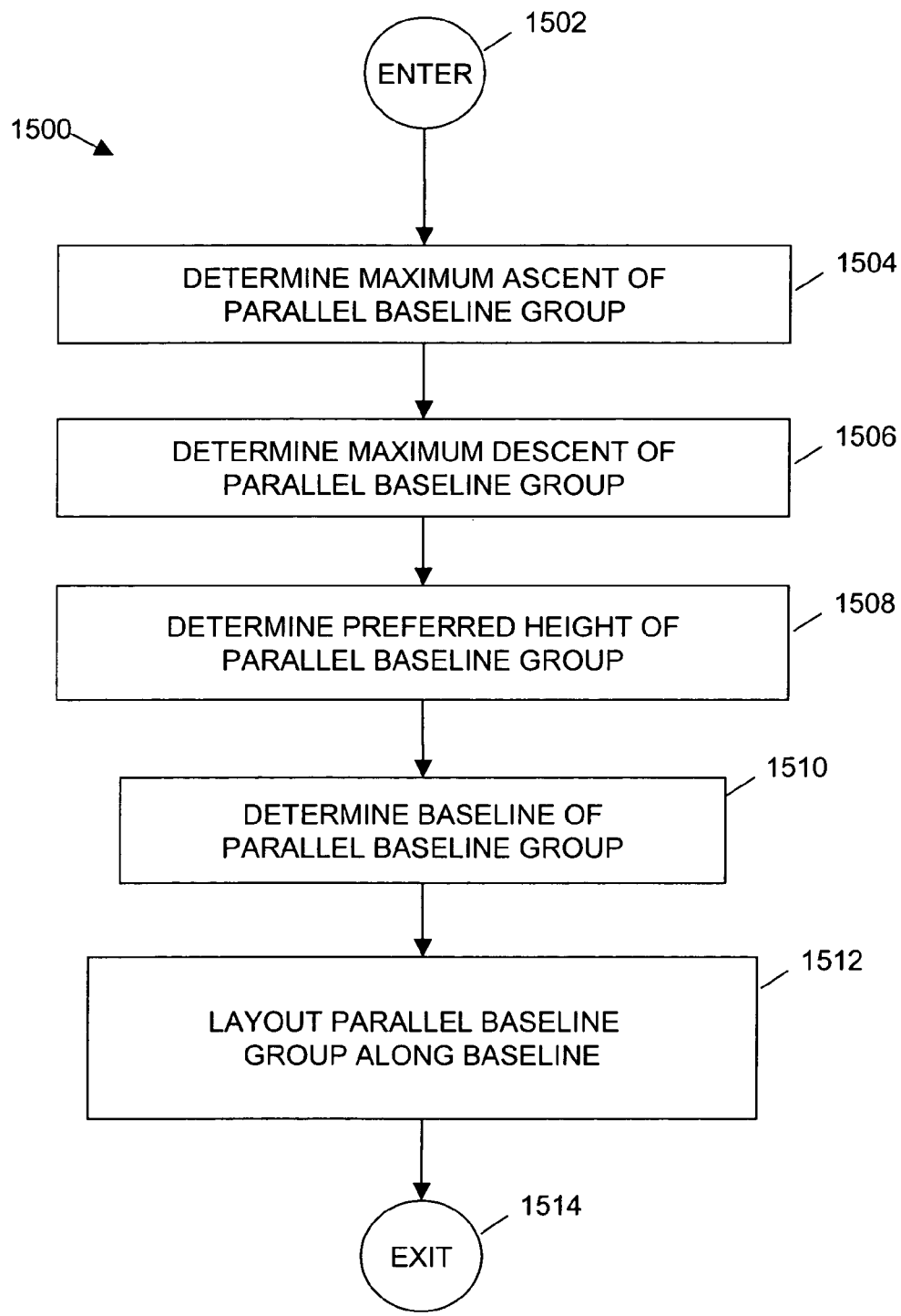
FIG. 15 illustrates a method for positioning components of a parallel baseline group in accordance with one embodiment of the invention.

FIG. 15 illustrates a method 1500 for positioning components of a parallel baseline group in accordance with one embodiment of the invention. FIG. 15 and method 1500 are explained more completely herein with additional reference to FIG. 16.

Figure 16:
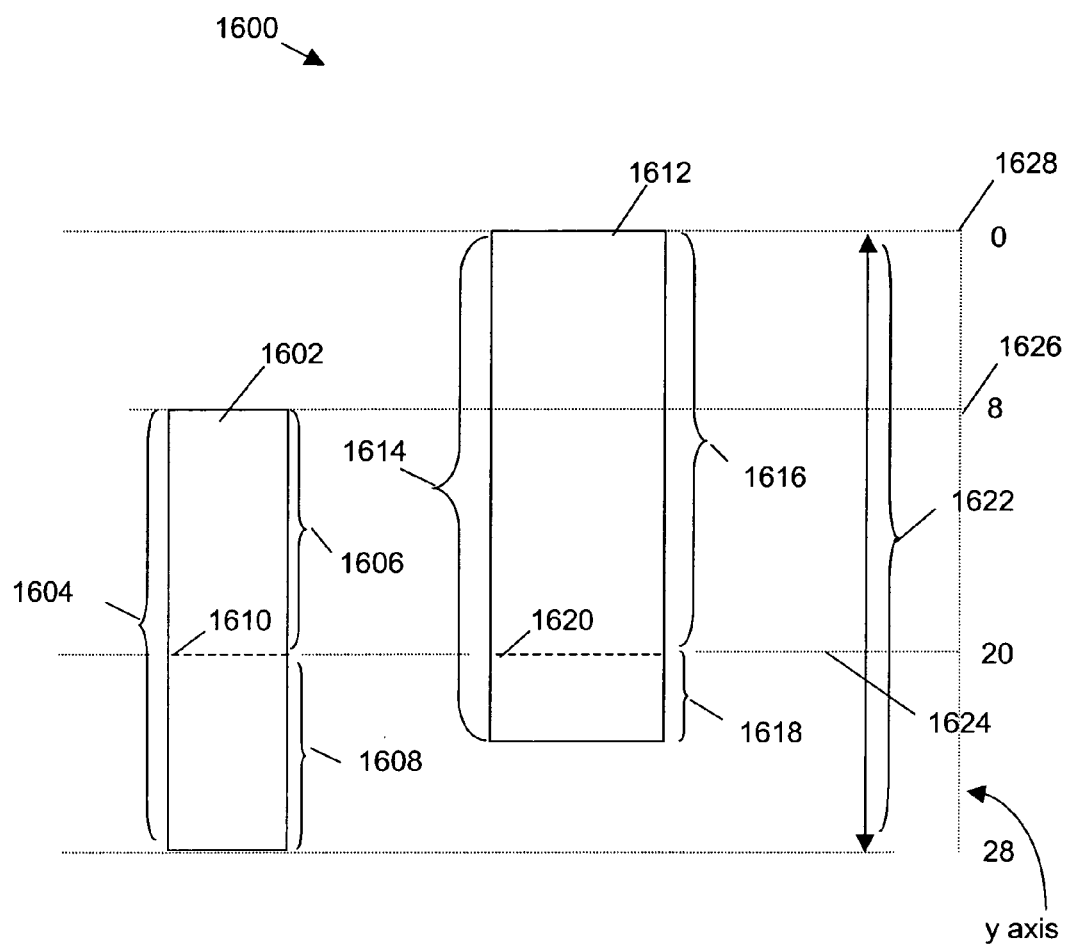
FIG. 16 illustrates an example of components aligned in a parallel baseline group in accordance with one embodiment of the invention.

FIG. 16 illustrates an example of a component 1602 and a component 1612 aligned in a parallel baseline group in accordance with one embodiment of the invention. Referring to FIGS. 15 and 16 together, in one embodiment, method 1500 is entered at an ENTER operation 1502, and processing transitions to a DETERMINE MAXIMUM ASCENT operation 1504.

In DETERMINE MAXIMUM ASCENT OF PARALLEL BASELINE GROUP operation 1504, the maximum ascent of a parallel baseline group is determined. For example, in one embodiment, referring to FIG. 16, assume a parallel baseline group defined by a user includes component 1602 and component 1612.

Component 1602 has a preferred height 1604 of 20 pixels with a preferred ascent 1606 of 12 pixels and a preferred descent 1608 of 8 pixels from a baseline. Component 1612 has a preferred height 1616 of 24 pixels with a preferred ascent 1616 of 20 pixels and a preferred descent 1618 of 4 pixels from a baseline.

In one embodiment, the maximum ascent, also termed the max ascent, of the parallel baseline group is determined as the maximum of the ascents of the components in the parallel baseline group. In the present example, the max ascent of the parallel baseline group including component 1604 and 1612 is the maximum of ascent 1606, e.g., 12 pixels, and ascent 1616, e.g., 20 pixels, i.e., max (12, 20), which is 20 pixels. From DETERMINE MAXIMUM ASCENT OF PARALLEL BASELINE GROUP operation 1504, processing transitions to a DETERMINE MAXIMUM DESCENT OF PARALLEL BASELINE GROUP operation 1506.

In DETERMINE MAXIMUM DESCENT OF PARALLEL BASELINE GROUP operation 1506, the maximum descent of the parallel baseline group is determined. In the present example, the maximum descent, also termed the max descent, of the parallel baseline group is the maximum of descent 1408, e.g., 8 pixels, and descent 1418, e.g., 4 pixels, i.e., max (8, 4) which is 8 pixels. From DETERMINE MAXIMUM DESCENT OF PARALLEL BASELINE GROUP operation 1506, processing transitions to a DETERMINE PREFERRED HEIGHT OF PARALLEL BASELINE GROUP operation 1508.

In DETERMINE PREFERRED HEIGHT OF PARALLEL BASELINE GROUP operation 1508, the preferred height of the parallel baseline group along a y axis 1630 is determined based on the sum of the max ascent and the max descent of the parallel baseline group. In the present example, the preferred height of the parallel baseline group is the sum of 20 pixels and 8 pixels, or 28 pixels. From DETERMINE PREFERRED HEIGHT OF PARALLEL BASELINE GROUP operation 1508, processing transitions to a DETERMINE GROUP BASELINE FOR PARALLEL BASELINE GROUP operation 1510.

In DETERMINE GROUP BASELINE FOR PARALLEL BASELINE GROUP operation 1510, the group baseline for the parallel baseline group is determined. In one embodiment, the group baseline for the parallel baseline group is obtained by subtracting the max descent of the parallel baseline group from the preferred height 1622 of the parallel baseline group. Thus, in the present example, the max descent of 8 pixels is subtracted from the preferred height of 28 pixels to provide a group baseline 1624 of 20 pixels for the parallel baseline group. From DETERMINE GROUP BASELINE FOR PARALLEL BASELINE GROUP operation 1510, processing transitions to a LAYOUT PARALLEL BASELINE GROUP ALONG GROUP BASELINE operation 1512.

In LAYOUT PARALLEL BASELINE GROUP ALONG GROUP BASELINE operation 1512, baseline 1610 of component 1602 and baseline 1620 of component 1612 are laid out along group baseline 1624, e.g., at the y location of 20 pixels. Consequently, component 1602 is positioned at a location 1626 on the vertical axis, i.e., the y axis, of 8 pixels, and component 1612 is positioned at a location 1628 on the vertical axis of 0 pixels.

In this way the contents of components 1602 and 1612 are aligned along the same vertical axis location, e.g., are aligned along group baseline 1624. From LAYOUT PARALLEL BASELINE GROUP ALONG GROUP BASELINE OF PARALLEL BASELINE GROUP operation 1512, processing transitions to an EXIT operation 1514 with processing exiting method 1500.

GUI Layout Builder Tool

As earlier described, designing user interfaces for Java using a visual builder tool is very difficult as Java can be used on different underlying software platforms. A layout displayed on one software platform can look very different from the same layout displayed on a different software platform.

In accordance with another embodiment of the invention, a GUI layout builder tool 114, including cross platform layout application 106, is implemented on a host computer system and utilized to generate a cross platform layout without exposing a user to an underlying layout manager used for constructing the user interface (UI). In accordance one embodiment of the invention, a user need not know the underlying layout manager or an underlying software platform to create a layout for a user interface.

In particular, embodiments in accordance with the invention allow a user to create a cross platform layout for a user interface in which components are positioned in a way that adapts to changes in the underlying software platform, i.e., adapts to different visual guidelines associated with different underlying software platforms. A user is able to position, e.g., move and resize, user interface components freely using an input device, such as a mouse or a keyboard.

User inputs are tracked and relationships between components are determined in accordance with the user inputs, and translated to a layout mode, or a layout manager so that the relationships between components are dynamically maintained under changed conditions. Examples of changed conditions include running the user interface on a different underlying software platform, translating text labels to different languages, or resizing the UI. Embodiments in accordance with the invention accommodate these changes and maintain the original arrangement in the layout.

In one embodiment, GUI builder tool 114 generates several cross platform layout arrangements and combinations that are transferable to a layout manager-based UI that can dynamically maintain these arrangements. In particular, embodiments of GUI builder tool 114, in accordance with the invention, allow a user to develop cross platform GUI layouts in which:

1. components placed in a sequence by a user maintain a relative distance;
2. components maintain a position relative to other components, or to the container border, in the direction of addition by the user;
3. components aligned to the same position along a certain axis remain aligned together even if the surroundings are modified; and,
4. a component resized by the user over the whole available space between two other components, or the container border, automatically keeps the resizability attribute, i.e., the component's size adjusts according to changes in the available space. In one embodiment, a user is free to change the layout using some or all of the above arrangements.

In one embodiment, GUI builder tool 114 stores the arrangements established by the user, and GUI layout builder tool 114 performs selected additional changes for the user automatically. For example, when placing one component over another in a layout, GUI layout builder tool 114 moves the existing component aside or shrinks it, preventing the components from overlap. This allows a user to modify existing layouts easily by inserting new components.

In one embodiment GUI layout builder tool 114 includes cross platform layout application 106 earlier described in constructing a resulting cross platform layout of a UI. In the present embodiment, GUI layout builder tool 114 uses the principles of hierarchical component grouping earlier described with reference to cross platform layout application 106. Thus, GUI layout builder tool 114 utilizes components, sequential groups, parallel groups, and padding between components, e.g., autopadding, container autopadding, and padding, to express the cross platform layout.

In the present embodiment, GUI layout builder tool 114 automatically suggests suitable groupings of components and optimal spacing allowing for quick and precise layout design.

For example, in one embodiment, a component being moved via a mouse, or other input device, close enough to a suitable position, such as where the component could be aligned in parallel with other components, or placed next to another component at an optimal distance, is snapped, e.g., drawn to that position, and a guiding line is painted, e.g., displayed to the user, showing the arrangement.

The component is stuck to, e.g., associated with, that position until the user moves the mouse some distance away from the position. In particular, the position snapping, and the guiding line visualization which shows the relation of the components, are stored by GUI layout builder tool 114 and kept dynamically, and not only displayed for that moment.

To define a cross platform layout of visual components, GUI layout builder tool 114 defines the positions and sizes of the visual components within a given visual space, and defines how the positions and sizes change when the visual space in which the visual components are placed is changed, e.g., the visual space is enlarged or reduced. In the present embodiment, GUI layout builder tool 114 defines visual component positions within a visual space as a hierarchical model of layout elements, such as components, container components, padding, autopadding, and container autopadding.

In particular, in one embodiment, a horizontal layout spring hierarchy represents a layout in a horizontal dimension, and a vertical layout spring hierarchy represents the layout in a vertical dimension. Together, the horizontal layout spring hierarchy and the vertical layout spring hierarchy represent the hierarchical model of the cross platform layout of a visual user interface.

The layout elements in the hierarchical model of the layout are termed layout springs, earlier described with reference to cross platform layout application 106. In one embodiment, a layout spring is a one-dimensional unit representing a certain amount of space in a display area. For example, in one embodiment, a layout spring is a number of pixels corresponding to a width or a height of a component, or a number of pixels corresponding to a space, such as autopadding, between components.

To define a cross platform layout of visual components inside a two-dimensional container component in a visual space, such as a panel component having horizontal and vertical axes, GUI layout builder tool 114 utilizes a horizontal layout spring hierarchy, i.e., a first hierarchy, and a vertical layout spring hierarchy, i.e., a second hierarchy.

In one embodiment, the horizontal layout spring hierarchy represents layout springs of layout elements along a horizontal axis, i.e., a first axis, extending in a horizontal direction, i.e., a first direction. The vertical layout spring hierarchy represents layout springs of layout elements along the vertical axis, i.e., a second axis, extending in a vertical direction, i.e., a second direction, where the second axis and the second direction are orthogonal to first axis and the first direction, respectively.

In one embodiment, a horizontal composite layout spring represents the total horizontal size of the layout along the horizontal dimension. In one embodiment, a vertical composite layout spring represents the total vertical size of the layout along the vertical dimension.

Together, the horizontal composite layout spring and the vertical composite layout spring represent the container component. Where the container component is a component in a larger container component, the horizontal composite layout spring and the vertical composite layout spring represent the container component as a component in the larger container component using the same principles of hierarchical composition described herein.

Starting at each composite layout spring of a hierarchy, i.e., the vertical composite layout spring and the horizontal layout spring, and traversing down the hierarchy, distributing space back to the individual layout springs, each layout spring is given an exact position within the entire layout. Each layout spring's size and position and the size of the entire layout define a particular layout.

Herein examples are discussed in the horizontal dimension for clarity of description, however those of skill in the art can understand that the examples are applicable to the vertical direction as well with appropriate modifications.

For each layout spring in a cross platform layout, a minimum size, a preferred size, and a maximum size are specified. In one embodiment, the preferred size of a layout spring is used in determining the initial size of the layout. The minimum size and maximum size define how the layout spring can change dynamically, e.g., resize.

The minimum size determines how a layout spring can shrink, e.g., reduce, from a preferred size, and the maximum size determines how a layout spring can grow, e.g., enlarge from a preferred size. Thus, generally viewed, a layout spring is viewable much like a spring that has a continuum of sizes from a minimum size when compressed to a maximum size when fully stretched, with a preferred size where the spring is neither compressed nor stretched.

In one embodiment, the valid relations between the minimum size, the preferred size, and the maximum sizes are: 0<=minimum size<=preferred size<=maximum size.

In one embodiment, considering the meaningful size of displays, i.e., the resolution of displays, a specified number is used as a working value for "infinity". In one embodiment, if the maximum size is equal to or greater than the specified number, the layout spring is allowed to grow unlimitedly. In one embodiment, this number is Short.MAX VALUE (32767).

In one embodiment, an actual size of the layout spring must be within the limits defined by the layout spring as: minimum size<=actual size<=maximum size.

If the minimum size and maximum size both equal the preferred size, the layout spring is a fixed size, and the layout spring cannot be resized.

In one embodiment, a specified constant, termed the default size, is used to express that there is no explicit size set for a layout spring. In this instance, the layout spring does not define a particular size, and a layout manager should take the corresponding size from the component. In particular, in one embodiment, the layout manager asks for the minimum size, the preferred size, and the maximum size of the layout spring, such as from visual guidelines. This allows the layout to be defined in accordance with the "look and feel" of the underlying software platform.

In one embodiment, when the default size is indicated, the size of the layout spring is determined by cross platform layout application 106 when the layout is executed according the actual underlying software platform "look and feel", i.e., in accordance with the visual guidelines of the underlying software platform. For example, in one embodiment the size of the layout spring is determined in accordance with method 200 earlier described. In one embodiment, the default size is used not only for components, but also for the spaces between components, e.g., autopadding and container autopadding.

As earlier described, GUI layout builder tool 114 defines a layout in terms of a hierarchical model defined by a horizontal layout spring hierarchy and a vertical layout spring hierarchy. Further, layout springs representing components and/or spaces, e.g., padding, autopadding and container autopadding, are placed in sequential groups or parallel groups in the vertical layout spring hierarchy and the horizontal layout spring hierarchy.

A sequential group layout spring defines a chain of layout springs arranged next to each other along a particular axis. The position of a layout spring in the sequential group layout spring is a sum of the sizes of any preceding layout springs plus the position of the entire sequential group layout spring. The sequence is the arranging principle inside a sequential group layout spring—the layout springs within a sequential group layout spring are not individually aligned with other layout springs outside the sequential group layout spring. Combining entire sequential group layout springs in parallel maintains the individual layout springs' positions in distinct sequences independent.

A parallel group layout spring defines a set of layout springs arranged in parallel to each other orthogonal to a particular axis. A parallel group layout spring positions the constituent layout springs within the parallel group layout spring at a common alignment position within the parallel group layout spring.

In the simplest case, default alignment, the common alignment position is the position of the entire parallel group layout spring. If a layout spring of the parallel group layout spring allows resizing, the layout spring occupies the entire space of the parallel group layout spring. Otherwise, each layout spring in the parallel group layout spring is positioned within the parallel group layout spring space at a specified alignment point.

In one embodiment, an alignment point for a parallel group layout spring is specified as a leading alignment point, a trailing alignment point, a center alignment point, or a baseline alignment point. As parallel group layout springs can be defined in the vertical dimension and the horizontal dimension, an alignment point is also defined in the respective horizontal dimension and vertical dimension.

In one embodiment, in a horizontal dimension, a leading alignment point for a parallel group layout spring is an alignment position at the left edge of the parallel group layout spring at which a left edge of each the constituent layout springs is aligned. In one embodiment, a trailing alignment point for a parallel group layout spring is an alignment position at the right edge of the parallel group layout spring at which a right edge of each of the constituent layout springs is aligned. In one embodiment, a center alignment point for a parallel group layout spring is an alignment position at an internal central point of the parallel group layout spring at which an internal central point of each of the constituent layout springs is aligned.

In one embodiment, in a vertical dimension, a leading alignment point for a parallel group layout spring is an alignment position at the top edge of the parallel group layout spring at which a top edge of each of the constituent layout springs is aligned. In one embodiment, a trailing alignment point for a parallel group layout spring is an alignment position at the bottom edge of the parallel group layout spring at which a bottom edge of each of the constituent layout springs is aligned. In one embodiment, a center alignment point for a parallel group layout spring is an alignment position at an internal central point of the parallel group layout spring at which an internal central point of each of the constituent layout springs is aligned.

Figure 17:
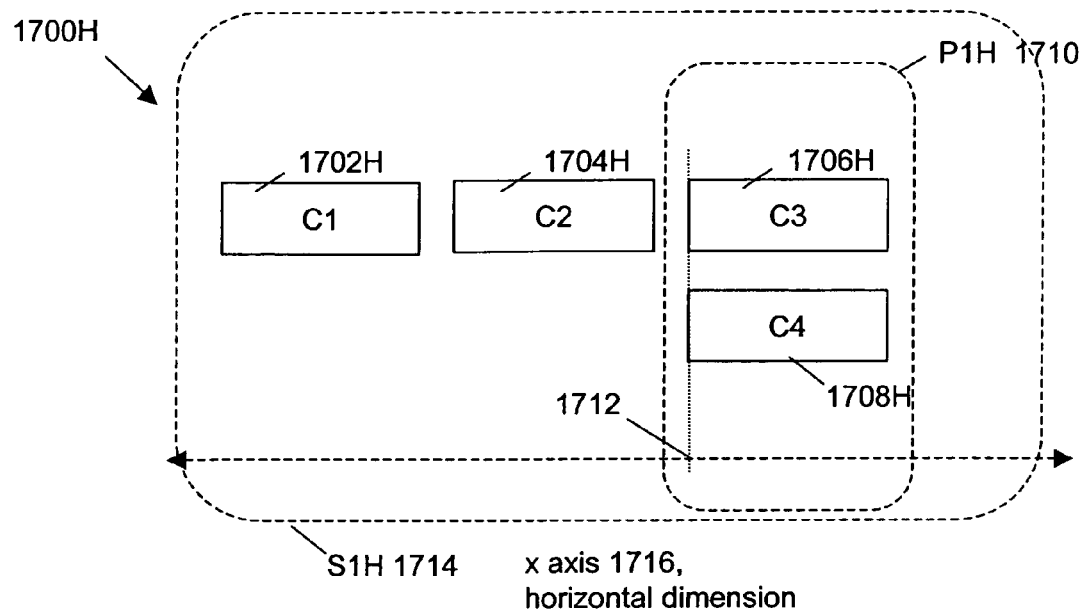
FIG. 17 illustrates a layout defined along a horizontal x axis including a parallel group having child components aligned at a leading edge in accordance with one embodiment of the invention.

FIG. 17 illustrates a layout 1700H defined along a horizontal x axis including a parallel group P1H having child components aligned at a leading edge in accordance with one embodiment of the invention. As shown, a sequential group S1H 1714 is composed of a component C1 1702H, a component C2 1704H, and a parallel group P1H 1710. Parallel group P1H 1710 is composed of a component C3 1706H and a component C4 1708H. In the present example, parallel group P1H 1710 is defined to have a leading alignment point 1712 along an x axis 1716 such that the left edge of each component C3 1706H and component C4 1708H are aligned with leading alignment point 1712, i.e., a leading edge.

Figure 18:
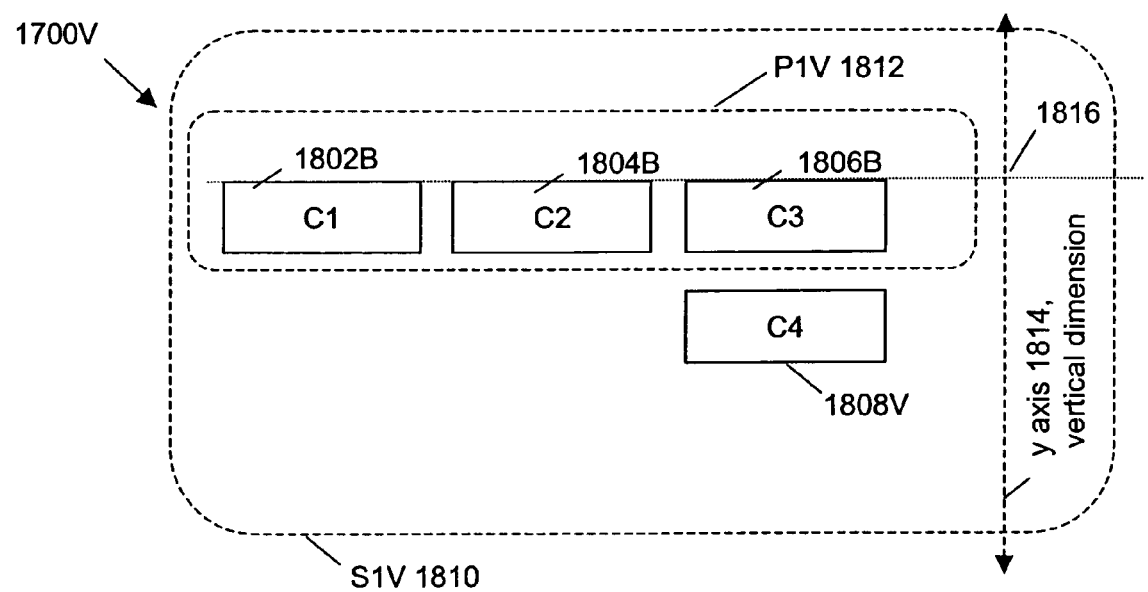
FIG. 18 illustrates a layout defined along a vertical y axis including a parallel group having child components aligned at a leading edge in accordance with one embodiment of the invention.

FIG. 18 illustrates a layout 1700V defined along a vertical y axis and including a parallel group P1V 1812 having child components aligned at a leading edge in accordance with one embodiment of the invention. As shown, a sequential group S1V 1810 is composed of a parallel group P1V 1812 and a component C4 1808V. Parallel group P1V 1812 is composed of three components, a component C1 1802B, component C2 1804B, and a component C3 1806B. In the present example, parallel group P1V 1812 is defined to have a leading alignment point 1816 along a y axis 1814 such that the top edge of each of components C1 1802B, component C2 1804B, and component C3 1806B are aligned with leading alignment point 1816, i.e., a leading edge.

In the present illustration, for clarity of description, the spaces between components are omitted. In practice, the spaces between components are represented with corresponding layout springs in the groups, i.e., autopadding layout springs and/or container autopadding layout springs.

In the present embodiment, GUI layout builder tool 114 manages a hierarchical model of the cross platform layout of the visual display that uses the earlier described hierarchical structures of layout springs and associates particular layout springs to visual components used in a UI design. Each specific implementation of GUI layout builder tool 114 provides concrete components, e.g., a toolkit.

In the present embodiment, a visual user interface (UI) is displayed to a user as a working layout in a design area generated by GUI layout builder tool 114, and constructed using cross platform layout application 106 earlier described. GUI layout builder tool 114 utilizes the actual visual positions in the design area to determine positions of all layout springs in the hierarchical model. This allows GUI layout builder tool 114 to display additional information about the layout structure, for example, to show common alignment of components in parallel groups, or relative positions of components in sequential groups. Thus in one embodiment, GUI layout builder tool 114 displays layout structure information, such as alignment and position information, to a user. In one embodiment, the layout structure information is displayed in the design area.

Figure 19:
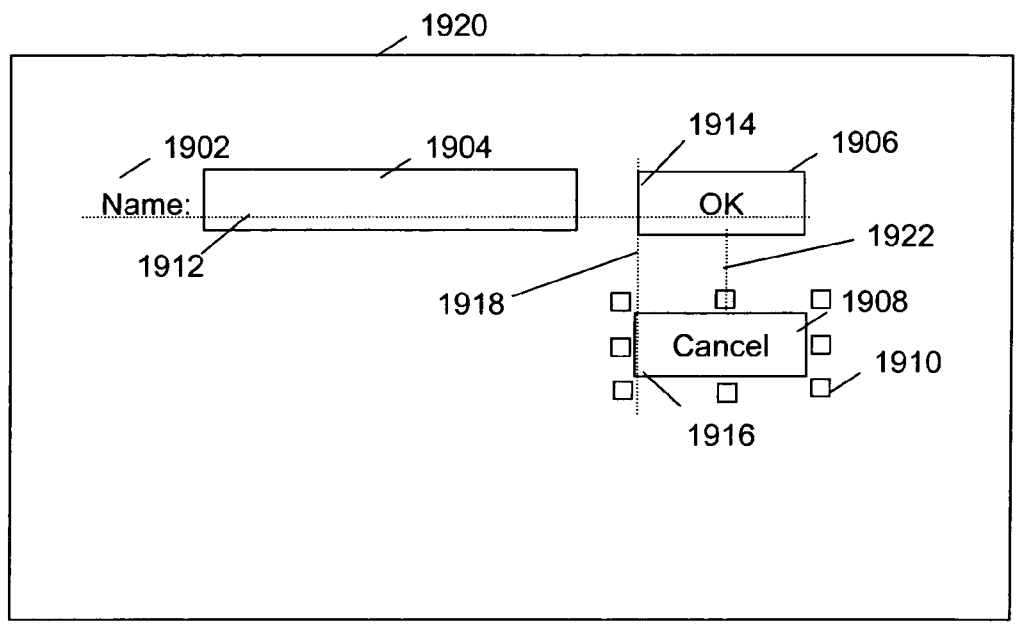
FIG. 19 illustrates an example of a visualization of a hierarchical model of a cross platform layout for a user interface (UI) in a design area generated by the GUI layout builder tool of FIG. 1 in accordance with one embodiment of the invention.

FIG. 19 illustrates an example of a visualization of a hierarchical model of a cross platform layout for a UI in a design area generated by GUI layout builder tool 114 in accordance with one embodiment of the invention. In one embodiment, components input to a layout are generated by GUI layout builder tool 114 and displayed to a user in a design area 1920. In the present illustration, a vertical line 1918 at the left of a button component OK 1906 and a button component Cancel 1908 indicates that button component OK 1906 and button component Cancel 1908 are aligned at edge 1914 and edge 1916, respectively.

A horizontal line 1912 crossing a label component Name 1902, a text field component 1904, and button component OK 1906 indicates the components are aligned on a baseline along the vertical axis. In particular, a horizontal line 1912 represents the group baseline on which the contents of label component Name 1902, text field component 1904, and button component OK 1906 are aligned. The knobs, such as knob 1910, together with a dotted line 1922 show the anchoring of button component OK 1906 and button component Cancel 1908.

Embodiments in accordance with the invention allow a user to interactively create a cross platform layout of components. Viewing the components in a displayed design area generated by GUI layout builder tool 114, a user manipulates the components directly by mouse, or by keyboard, or by other input device. In one embodiment, a user is able to perform at least some or all of the following operations:
1. adding new components;
2. removing components;
3. moving existing components;
4. resizing components; and,
5. copying components.

In one embodiment, the operations of moving existing components, resizing components, and, copying components, in terms of the resulting layout, are handled as a combination of the operations of adding and removing components.

Adding New Components

In adding new components, in one embodiment, GUI layout builder tool 114 creates the hierarchical model in accordance with the user actions. For example, in one embodiment, GUI layout builder tool 114 creates the hierarchical model so that the layout structure corresponds to where the user drops a component in the design area and corresponds to how the component is snapped to the other components in the design area.

In one embodiment, GUI layout builder tool 114 displays a palette of component icons selectable by a user. For example, in one embodiment, a user positions a mouse over a desired component icon in the palette, such as panel container component, and drags and drops the component icon at a desired location in the design area. In one embodiment, GUI layout builder tool 114 generates a cross platform layout in a consistent way in which:
1. user defined relations are preserved;
2. component overlap is prevented;
3. visual stability of the layout when designed is preserved; and,
4. implicit or hidden dependencies are avoided, as further described herein.

User Defined Relations Are Preserved

In the present embodiment, GUI layout builder tool 114 preserves user defined relations. In particular, components positioned in a sequence maintain the relative positions, e.g., distances. For example, components aligned in parallel by the user maintain the same position of the aligned edges.

Further, components positioned at a border of a container maintain a distance from the border. These relations are preserved even when the layout is changed in other aspects, e.g., size of the container, size of components, and positions of components. The relations are visualized in the design area generated by GUI layout builder tool 144 so that the user is aware of the relations. For example, referring back again to FIG. 19, the sequential positioning relationship between button component OK 1906 and button component Cancel 1908 is visually displayed to the user using dotted line 1922.

Component Overlap is Prevented

Additionally, in the present embodiment, GUI layout builder tool 114 prevents overlap of components. GUI layout builder tool 114 prevents immediate overlap of components in the layout and prevents component overlap when a user moves a component over another.

In particular, components that do not overlap in the design area are structured by GUI layout builder tool 114 so that the components do not overlap when the UI is executed, e.g., when changed due to localization, different software platform, container resizing or other changes. In particular, in one embodiment, GUI layout builder tool 114 structures the cross platform layout such that each two components have a sequential group as the first common parent layout spring in at least one dimension.

Visual Stability of the Layout when Designed is Preserved

Further, in the present embodiment, GUI layout builder tool 114 preserves visual stability of the layout when designed. A component dropped at a certain position in the design area appears on that location. A change of a component, such as adding, moving, resizing, or removing, in the design area does not affect the position or size of the other components unless the adding component overlaps the existing components in the layout or extends out of the design area boundaries. In such instances, either the adding component's position or the existing layout are adjusted to avoid the overlap and to preserve the user-defined relations.

Further, in one embodiment, the modifying operations in the layout are reversible. In the present embodiment, adding a component and then removing the same component, brings the layout to the same state as the layout was before adding the component.

Implicit or Hidden Dependencies are Avoided

In the present embodiment, GUI layout builder tool 114 generates the cross platform layout so that implicit or hidden dependencies are avoided. In particular, in one embodiment, if not aligned explicitly by the user, an adding component is positioned independently by GUI layout builder tool 114 within the largest free space possible. That is, in one embodiment, the adding component is added to the highest parallel group that covers the given design space and that does not include any other constituent layout springs that might cause overlap with the layout spring of the adding component.

The adding component is not influenced by any parallel component, and does not influence the other components. The current size of a component does not imply any sequential or parallel relation in positions. The components are not placed automatically in a common sequential group unless the positions overlap in the other dimension, i.e., the sequence is required to avoid potential overlap. Further, no parallel relation that would affect the component position is created automatically. In one embodiment, the user sets alignment between parallel components. This provides visual stability as creation of unwanted dependences in the layout are avoided.

Additionally, nonintersecting components are not placed in one sequential group but are instead placed independently in parallel groups so as not to influence the positions. Thus, the actual visual state of the layout is not used to infer unforced alignment dependencies. This prevents the user from creating an incorrect layout, e.g., in terms of localization.

As earlier described, creation of a cross platform layout using GUI layout builder tool 114 involves a user manipulating components utilizing an input device, such as a mouse, keyboard, or other input device. GUI layout builder tool 114 utilizes the user inputs in generating a layout in accordance with the embodiments described herein. In the present descriptions, a mouse is referred to as the input device for clarity of description.

In one embodiment, to place a component in a layout using GUI layout builder tool 114, the user selects a component icon, for example from a palette, moves the component over the displayed design area generated by GUI layout builder tool 114 and drops the component icon on a position. During the move, when the component icon is close enough to a suitable position, the component snaps, i.e., is drawn, to this position. To release the component icon from the snapped position, the user moves the mouse a distance way from the position, for example, several pixels away from the position.

In the present embodiment, suitable positions are recognized at places where a moving component's edge, e.g., leading, trailing, center, or baseline, is to be either:

1. at a same position as a same edge of another component already placed in the layout;

2. at a preferred distance from an opposite edge of another component, while the component's positions overlap in the other dimension;

3. at a container boundary, directly; or 4. at a preferred distance from a container boundary.

In one embodiment, a preferred distance is defined in accordance with cross platform layout method 200 earlier described and corresponds to a default size of a space between components, e.g., autopadding, or space between components and a container component, and to a default size of components.

In instances where a moving component's edge is at a preferred distance from an opposite edge of another component or from the container boundary, the position next to another component at a preferred distance adds the corresponding component's layout spring into a sequential group with the related layout spring.

In instances where a moving component's edge is at the same position as the same edge of another component already placed in the layout or at the preferred distance from the container boundary, snapping to the same position creates a parallel group with the component layout spring aligned with the related one.

If there are more positions available within a certain distance from the moving component, in the horizontal dimension, the closest position creating a sequential group is suggested preferentially, while in the vertical dimension the closest position creating a parallel group takes precedence. This places the visual arrangement in rows for visual form layouts.

Figure 20:
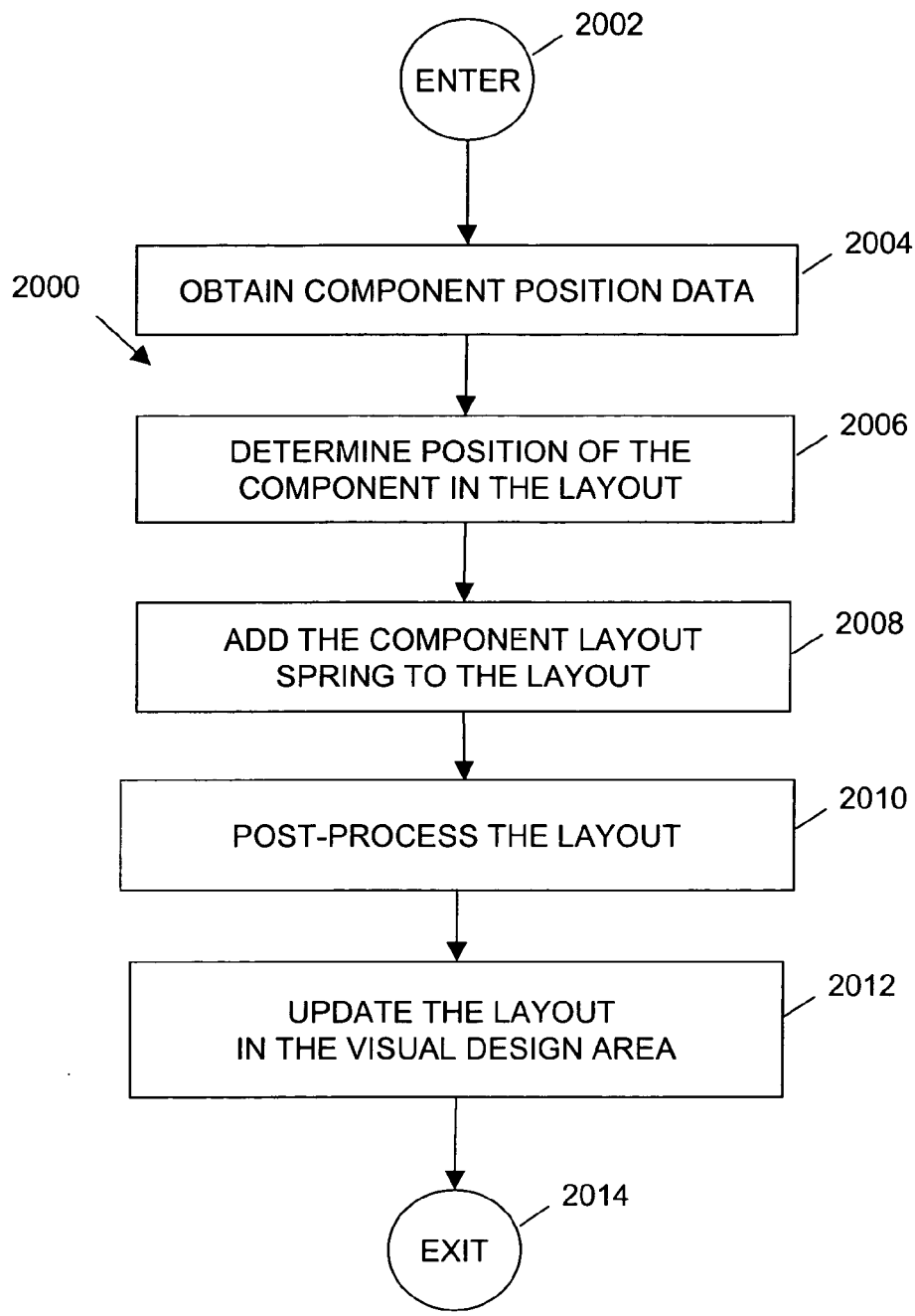
FIG. 20 illustrates a process flow diagram of a method for adding a component to a layout in accordance with one embodiment of the invention.

When the user drops a component on a certain position, the layout springs representing the component needs to be added to corresponding dimensions of the cross platform layout, creating or adjusting the hierarchical model representing the cross platform layout as described herein by GUI layout builder tool 114. In one embodiment, adding a component to a layout includes:

1. getting position data, e.g., input from the user;

2. determining the right place for the component in the layout;

3. adding the corresponding layout springs to the layout;

4. post-processing the layout, e.g., structure optimization; and, 5. updating the layout in the design area as further explained more completely with reference to FIG. 20.

FIG. 20. illustrates a process flow diagram of a method 2000 for adding a component to a layout in accordance with one embodiment of the invention. Referring now to FIGS. 1 and 20 together, in one embodiment, execution of GUI layout builder tool 114 including cross platform layout application 106 on host computer system 102 results in the operations of method 2000 as described below in one embodiment. In one embodiment, method 2000 is entered at an ENTER operation 2002, and from ENTER operation 2002, processing transitions to an OBTAIN COMPONENT POSITION DATA operation 2004.

In OBTAIN COMPONENT POSITION DATA operation 2004, in one embodiment, when the user drops a component in the design area, GUI layout builder tool 114 obtains the following information:

1. the actual visual position of the component; and,
2. whether the component was attached, e.g., snapped, to other components in the layout. If the component was attached to other components, how the component is snapped is also obtained, e.g., whether the component is next to a component in a sequence, or whether the component is aligned with a component in parallel.

In the present embodiment, a determination is made as to which edges of the component are to be considered when placing the component in the layout. In one embodiment, this edge is termed the significant edge. In one example, the significant edge is the edge by which a component is "snapped" to a suggested position. In one embodiment, a snapped edge is visually highlighted in the design area so the user perceives the significant edge as the significant point by which the component position is defined.

If there is no snapped edge in a dimension, the center point of the component is considered significant. In instances of resizing, the static edge, i.e., the edge not resized from, is always significant, and the resizing edge, i.e., the edge that can be moved to enlarge or shrink a component, is significant if the component is snapped, in which instance there are two significant edges for one dimension of the component. From OBTAIN COMPONENT POSITION DATA operation 2004, processing transitions to a DETERMINE POSITION OF THE COMPONENT IN THE LAYOUT operation 2006.

In DETERMINE POSITION OF THE COMPONENT IN THE LAYOUT operation 2006, a position in the hierarchical model of the cross platform layout is determined for the component. Theoretically, there can be more than one place in the hierarchical model where a component layout spring can be added so that the component appears at the given place in the resulting layout. For example, a component layout spring can be placed in a root parallel group layout spring, with a corresponding leading or trailing space added. In one embodiment, a potential position for a component layout spring is determined by:

1. determining possible positions, termed target groups, and
2. evaluating and selecting the best target group.

Determining Potential Target Groups

In determining potential target groups, potential positions for the component in the layout are collected for each horizontal and vertical dimension of the layout model, separately. Initially, positions are located where the adding component does not overlap other components in the hierarchical model of the layout. In one embodiment, in avoiding overlap, GUI layout builder tool 114 rejects potential positions in both dimensions where the visual coordinates occupied by the components intersect. When two components have overlapping layout springs in one dimension, the layout structure in the other dimension cannot have an intersection.

In one embodiment, the hierarchical layout structure of one dimension is traversed from the composite layout spring down and each related group layout spring is examined. A related parallel group layout spring is a group layout spring for which a significant edge of the adding layout spring is located within the actual visual boundaries of the group layout spring in the examined dimension. Any constituent sequential group layout spring of the related parallel group layout spring is considered related as well, and is also examined.

In each examined group, each layout spring representing a component is evaluated to determine whether the component's visual coordinates overlap with the adding component in the other, i.e., orthogonal, dimension. Further, constituent parallel groups are evaluated by iterating recursively through all the constituent component layout springs and evaluating each to determine whether the component's visual coordinates overlap with the adding component in the other, i.e., orthogonal, dimension.

If some constituent component layout springs overlap, the entire group is considered overlapping. If there is a visual overlap in the orthogonal dimension, the overlapping layout spring and the layout spring of the adding component are placed in a sequential group in the examined dimension to avoid complete overlap. The examined group is saved as a potential target group.

Additionally, if the adding component is required to be aligned in parallel with another component, e.g., because the component is snapped that way by the user, a determination is made whether placing the adding layout spring in the potential target group would allow the required parallel alignment with the given layout spring. In instances in which the layout springs have a common first parallel group parent, a common parallel group is created for the two layout springs along the given edge. After determining the potential positions, i.e., the potential target groups, which prevent overlapping, the potential target groups are evaluated and the best position determined.

Determining the Best Position

The above determination of possible target groups results in a set of target groups that prevent overlapping, or no target groups are found.

No Target Groups Found

Where no target groups are found, it is assumed there is no non-overlapping layout springs or overlap cannot be avoided in combination with parallel aligning. In these instances, in one embodiment, the composite layout spring is selected as the best position, or a highest order group layout spring that still allows possible parallel aligning is selected as the best position. In these instances, the preference for non-overlap is relinquished in favor of parallel aligning required by the user.

Multiple Target Groups Found

Multiple target groups can be collected when there are two significant edges considered for an adding component or when the component layout spring is big enough in the orthogonal dimension and overlaps more parallel components. In one embodiment, initially the positions are combined together to bring the overlapping layout springs into a same group layout spring. Where this is not possible, just one target group is selected and the other target groups are removed as potential positions. In one embodiment, the target group containing the closest layout spring is selected. In one embodiment, the closest layout spring is a layout spring that has a least distance from the selected position of the adding component in the visual layout. From DETERMINE POSITION OF THE COMPONENT IN THE LAYOUT operation 2006, processing transitions to an ADD THE COMPONENT LAYOUT SPRING TO THE LAYOUT operation 2008.

In ADD THE COMPONENT LAYOUT SPRING TO THE LAYOUT operation 2008, the layout spring corresponding to the component is added to the selected position place, e.g., the group, in the layout structure, i.e., the layout model, maintained by GUI layout builder tool 114, and additional modifications described below are performed as needed in adding the component to the layout. In one embodiment, these additional modifications include as needed: adding spaces; modifying an existing space; creating parallel groups; and/or aligning of parallel groups.

In the present embodiment, spaces, i.e., autopadding, are added to ensure the position of the adding component layout spring within a group, relative to the other layout springs or to borders of the group, or to fill the available space within the group to define the size of the group. In some embodiments, when adding the component layout spring into a sequential group between existing components, or between a component and group boundary, an existing autopad or pad is divided or reduced in size. If there is enough available space within a sequential group layout spring, the autopadding or padding is reduced accordingly. If there is not enough available space with a group, which means the adding component overlaps an existing component of the group, a preferred autopad is inserted around the adding component. As a result, the surrounding components can move or the whole container resize when the design view is updated according to the layout model.

In one embodiment, a parallel group is created for part of a sequence if the adding layout spring belongs to the sequence but is in parallel with part of the sequence. In one embodiment, when parallel aligning is needed, a parallel group is created for the added layout spring and for the layout spring the added layout spring should be aligned with.

Figure 21:
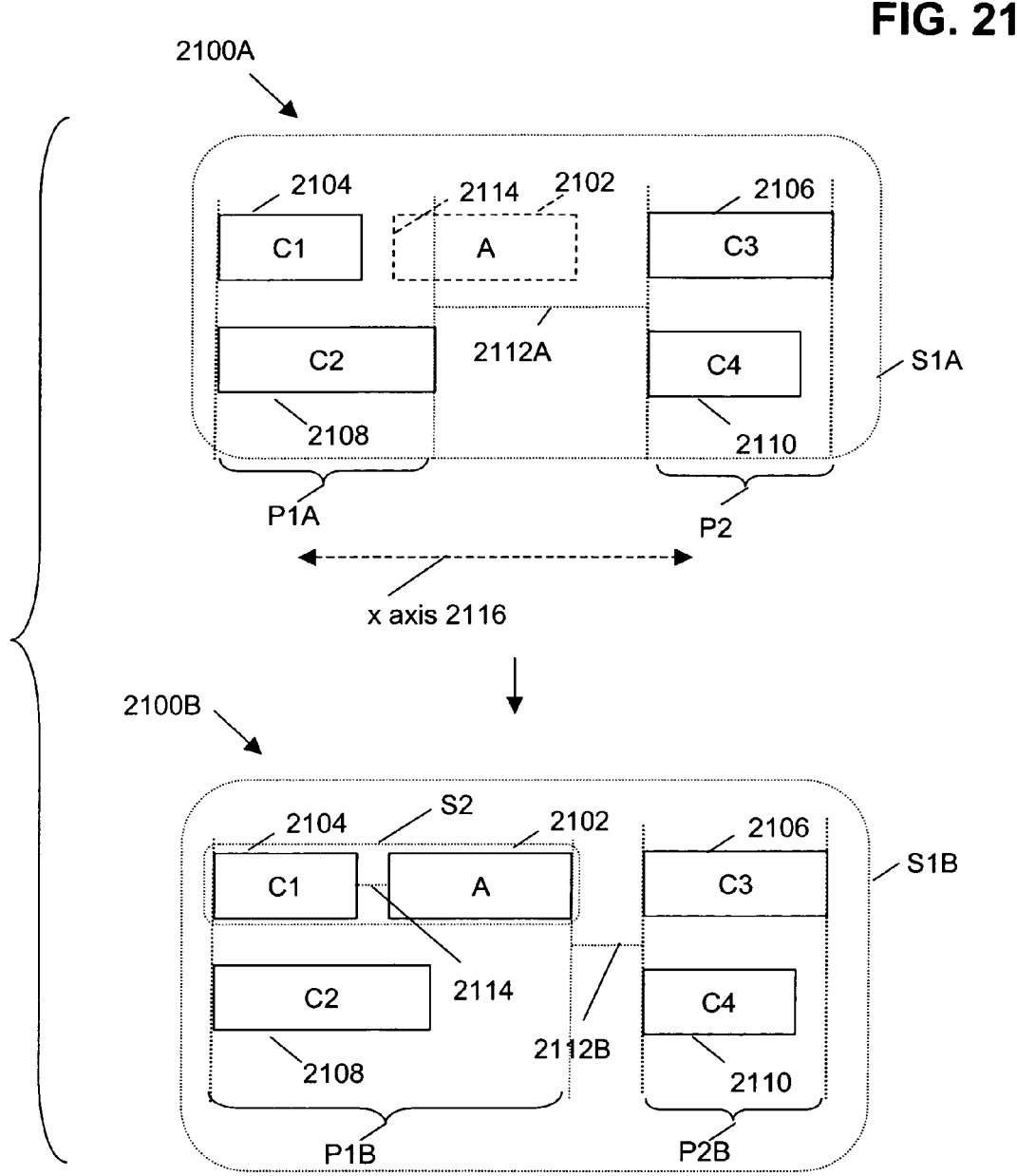
FIG. 21 illustrates an example of adding a component to a layout in accordance with one embodiment of the invention.

FIG. 21 illustrates an example of adding a component to a layout in accordance with one embodiment of the invention. For clarity of description, only a layout in the horizontal dimension along an x axis 2116 is illustrated. In FIG. 21, the dotted vertical lines denote parallel groups and the dotted horizontal lines represent spacing, such as autopadding. In the present example, component A 2102 is snapped by the left edge 2114, e.g., a significant edge, at a preferred distance from component C1 2104.

In FIG. 21, an initial layout state is represented by layout state 2100A, and a subsequent layout state is represented by layout state 2100B in which the component A 2102 is added to the layout. In layout state 2100A, the structure of the layout springs before adding component A 2102 is:

$$S1A=P1A+\text{space }2112A+P2A, P1A=C1|C2, P2=C3|C4,$$

where,
S1A represents a sequential group,
+ links layout springs grouped sequentially,
P1A, P2A represent parallel groups,
| links layout springs grouped in parallel,
C1, C2 represent component layout springs, and
"space" represents space, such as autopadding.

In particular, a root sequential group S1A including two parallel groups, parallel group P1A and parallel group P2, separated by a space 2112A, e.g., autopadding. Parallel group P1A includes component C1 2104 and component C2 2108, and parallel group P2A includes component C3 2106 and component C4 2110.

In this example, GUI layout builder tool 114 begins with the composite group layout spring in the horizontal dimension, sequential group layout spring S1A. At this level, the orthogonally overlapping layout springs with adding component A 2102 are both parallel group P1A and parallel group P2A, so the adding component A 2102 layout spring would be positioned between parallel group P1A and parallel group P2A.

However, parallel group P1A visually contains the position of significant edge 2114 of component A 2102, so the adding layout spring for component A 2102 is potentially inside parallel group P1A. In examining parallel group P1A, there is an orthogonally overlapping layout spring for component C1 2104. Thus the resulting target group is parallel group P1B where a sequential group S2 (FIG. 2100B) is created with component C1 2104 and component A 2102. Further component A 2102 is snapped by the left edge 2114 at a preferred distance 2114 from component C1 2104, and space 2112B has been reduced, as the overall size of parallel group P1B is now larger to accommodate sequential group S2.

In layout state 2100B, the resulting layout structure with addition of component A 2102 is:

$$S1B=P1B+\text{space }2112B+P2B, P1B=S2|C2, S2=C1+\text{space }2114+A, P2B=C3|C4,$$

where,
S1B, S2 represent sequential groups,
+ links layout springs grouped sequentially,
P1B, P2B represent parallel groups,
| links layout springs grouped in parallel,
C1, C2 represent component layout springs, and
"space" represents space, such as autopadding.

Figure 22:
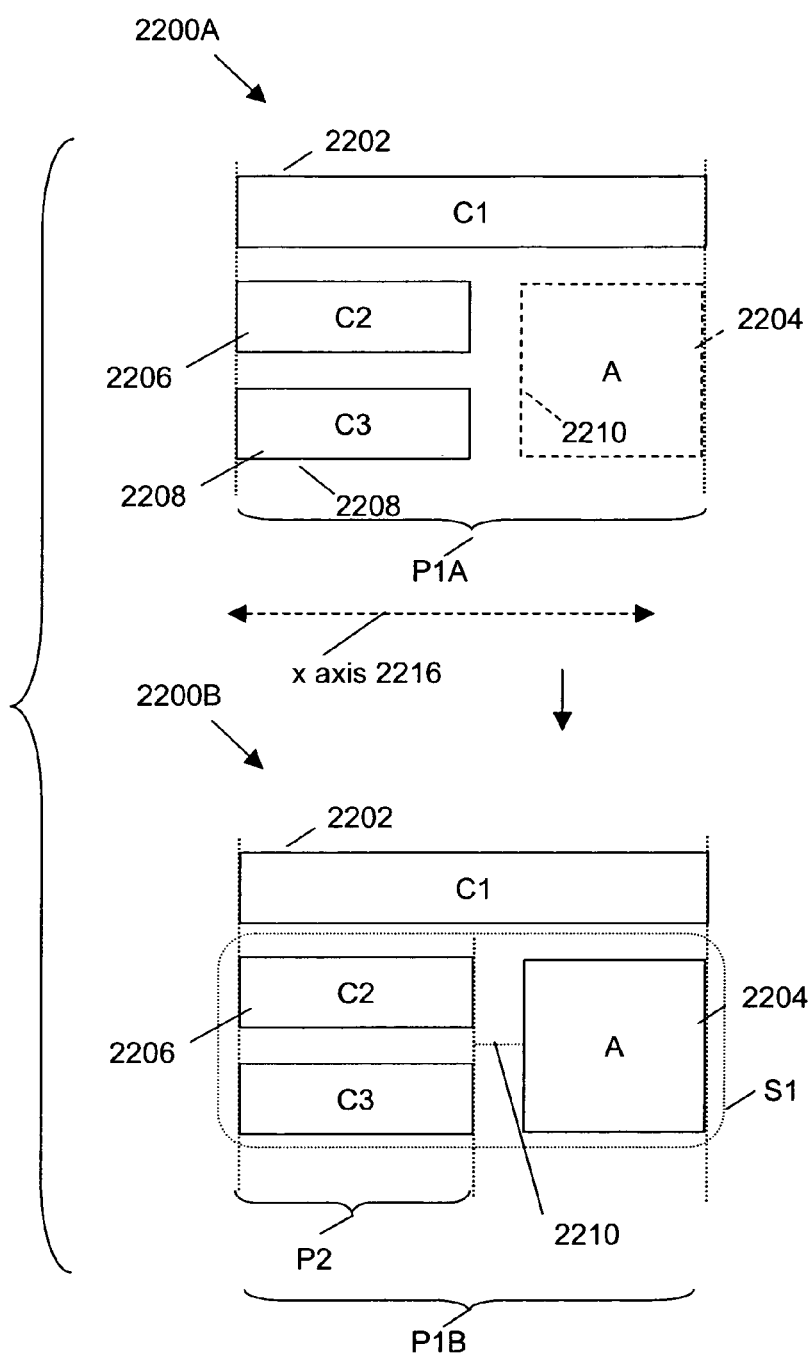
FIG. 22 illustrates another example of adding a component to a layout in accordance with one embodiment of the invention.

FIG. 22 illustrates another example of adding a component to a layout in accordance with one embodiment of the invention. In particular, FIG. 22 illustrates addition of a component A 2204 next to component C2 2206 and component C3 2208.

For clarity of description, only a layout in the horizontal dimension along an x axis 2216 is illustrated. In FIG. 22, the dotted vertical lines denote parallel groups and the dotted horizontal lines represent spacing, such as autopadding.

In FIG. 22, an initial layout state is represented by layout state 2200A, and a subsequent layout state is represented by layout state 2200B in which the component A 2204 is added to the layout. Referring to layout state 2200A, in one embodiment, a parallel group P1A includes a component C1 2202, a component C2 2206, and component C3 2208. A component A 2204 is to be added next to component C2 2206 and component C3 2208. The structure of the layout in the horizontal dimension before adding component A 2204 is:

$$P1A=C1|C2|C3.$$

In layout state 2200B, a sequential group S1 is created including component A 2204, and a parallel group P2 including component C2 2206 and component C3 2208. Further a space 2210, e.g., autopadding, is generated separating parallel group P2 from component A 2204. The parallel group P1B now includes the component C1 2202 and the sequential group S1.

In layout state 2200B, after component A 2204 is added, the layout structure is:

$$P1B=C1|S1, S1=P2+\text{space }2210+A, P2=C2|C3.$$

Figure 23:
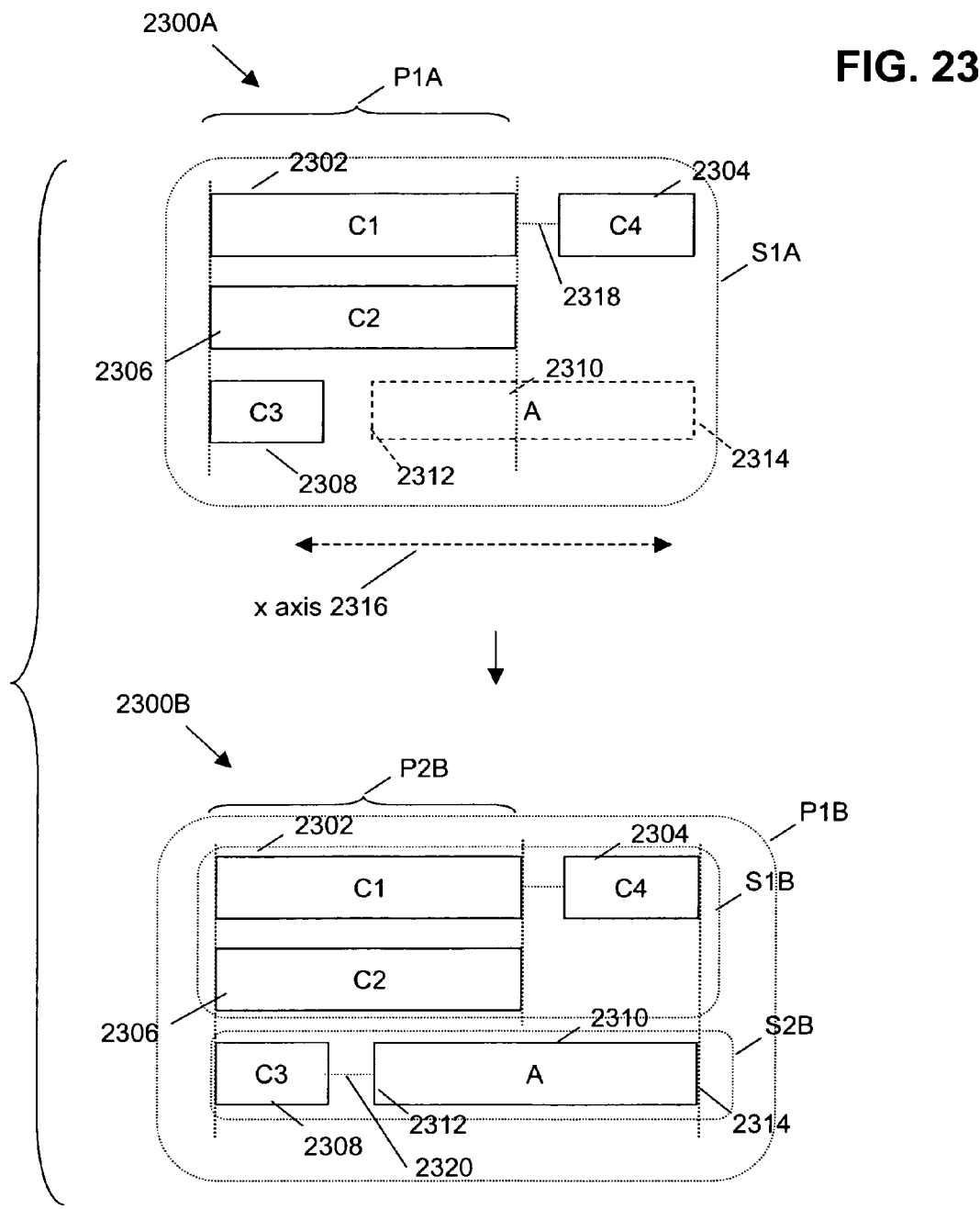
FIG. 23 illustrates another example of adding a component to a layout in accordance with one embodiment of the invention.

FIG. 23 illustrates another example of adding a component to a layout in accordance with one embodiment of the invention, where parallel group P1A includes component C1 2302, component C2 2306, and component C3 2308. In particular, FIG. 23 illustrates an example in which a component A 2310 has been increased in size out of a parallel group P1A, where component A 2310 was in sequence with a component C3 2308 and was snapped to component C4 2304 at the right.

For clarity of description, only a layout in the horizontal dimension along an x axis 2316 is illustrated. In FIG. 23, the dotted vertical lines denote parallel groups and the dotted horizontal lines represent spacing, such as autopadding.

In FIG. 23, an initial layout state is represented by layout state 2300A, and a subsequent layout state is represented by layout state 2300B in which a component A 2310 is added to the layout. In layout state 2300A, both leading edge 2312 and trailing edge 2314 of component A 2310 are significant edges as the leading edge 2112 targets the parallel group P1A, and the trailing edge 2314 points out of parallel group P1A.

In FIG. 23, in layout state 2300A, the structure of the layout in the horizontal dimension before adding component A 2310 is:

$$S1A=P1A+\text{space } 2318+C4, P1A=C1|C2|C3.$$

In layout state 2300B, component C3 2308 is moved out of the parallel group P1A, one hierarchical level up, so both leading edge 2312 and trailing edge 2314 point to the same target, i.e., the outer parallel group P1B. Note in one embodiment if the edge of component A 2310 did not snap at the right, component A 2310 would remain within the parallel group P1A as the right trailing edge 2314 would not be considered significant. As a result the entire parallel group becomes larger, pushing component C4 2304 to the right.

In layout state 2300B, after component A 2310 is added, the layout structure is:

$$P1B=S1B|S2, S1B=P2+\text{space } 2318+C4, P2B=C1|C2,$$
$$S2=C3+\text{space } 2320+A.$$

Figure 24:
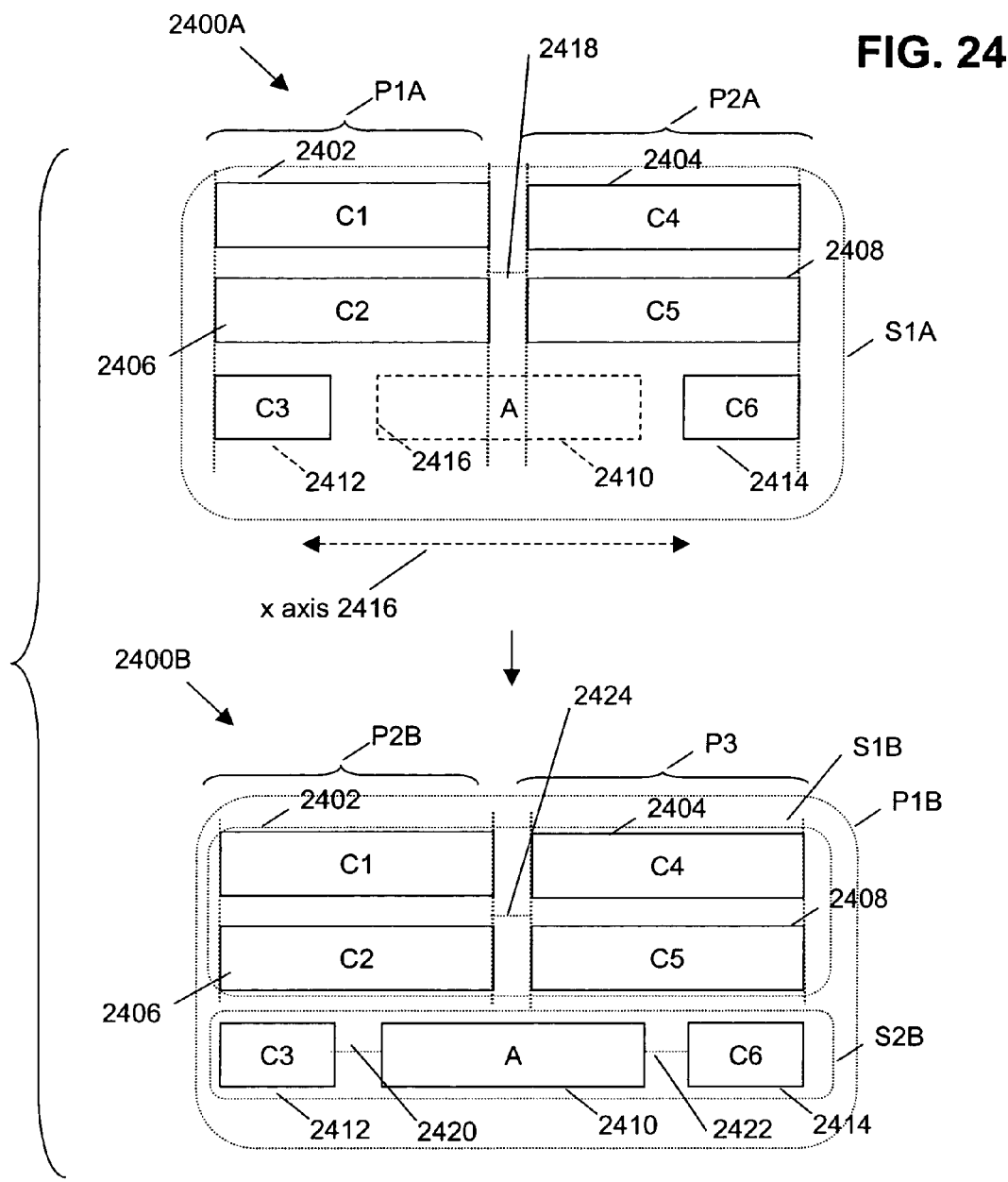
FIG. 24 illustrates another example of adding a component to a layout in accordance with one embodiment of the invention.

FIG. 24 illustrates another example of adding a component to a layout in accordance with one embodiment of the invention. In particular, FIG. 24 illustrates adding a component A 2410 to snap next to a component C6 2414. For clarity of description, only a layout in the horizontal dimension along an x axis 2416 is illustrated. In FIG. 24 the dotted vertical lines denote parallel groups and the dotted horizontal lines represent spacing, such as autopadding. In particular, parallel group P1A includes component C1 2402, component C2 2406, and component C3 2412, while parallel group P2A includes component 2404, component 2408 and component 2414.

In FIG. 24, an initial adding state is represented by state 2400A, and a subsequent state 2400B in which the component is added to the layout.

The structure of the layout in layout state 2400A in the horizontal dimension before adding component A 2410 is:

$$S1A=P1A+\text{space } 2418+P2A, P1A=C1|C2|C3,$$
$$P2A=C4|C5|C6.$$

In layout state 2400B, as component A 2410 is attached to component C3 2412 at leading edge 2416, both component C3 2412 and component C6 2414 are brought into the same group, e.g., sequential group S2B. Further space 2420, e.g., autopadding, is generated between component C3 2412 and component A 2410. Also space 2422, e.g., autopadding, is generated between component A 2410 and component C6 2414.

In layout state 2400B, after component A 2410 is added the layout structure is:

$$P1B=S1B|S2B, S1B=P2B+\text{space } 2424+P3,$$
$$P2B=C1|C2, P3=C4|C5, S2B=C3+\text{space } 2420+$$
$$A+\text{space } 2422+C6.$$

Referring back again to FIG. 20, from ADD THE COMPONENT LAYOUT SPRING TO THE LAYOUT operation 2008, processing transitions to a POST-PROCESS THE LAYOUT operation 2010.

In POST-PROCESS THE LAYOUT operation 2010, in one embodiment, after the added layout spring is positioned in the layout structure, post processing operations, are performed as needed to optimize and or simplify the layout structure. In the present embodiment, post processing operations include but are not limited to:
1. eliminating superfluous spaces;
2. eliminating redundant parallel groups; and
3. moving layout springs from a sequence into a nearby open parallel group.

Eliminating Superfluous Spaces

In one embodiment, superfluous spaces are eliminated. For example, in some instances when a component is added to a layout, the layout tool simply positions the component layout spring in a given group within the available space. Further, spaces can be added around the adding component to fill the space.

In one embodiment, these spaces, such as ending spaces in sequential groups, are eliminated, or compensated for using a common space in a parent group, merging ending spaces of more parallel sequences, while preserving the same resulting layout.

Eliminating the spaces lowers the redundancy in the layout definition and makes the layout definition less sensitive to external, i.e. cross-platform changes. In one embodiment, spaces are eliminated only if all layout springs of a given parallel group have the same alignment within the group, and are not resizable, except the ending spaces.

At the aligned edge of a parallel group, the spaces are eliminated if the spaces are all the same, i.e., all sequences begin with the same space. A common space is placed before the whole group at the other open edge of the parallel group, all spaces are eliminated, no matter the size, and a common space determined for the largest layout spring is placed out of the group.

Figure 25:
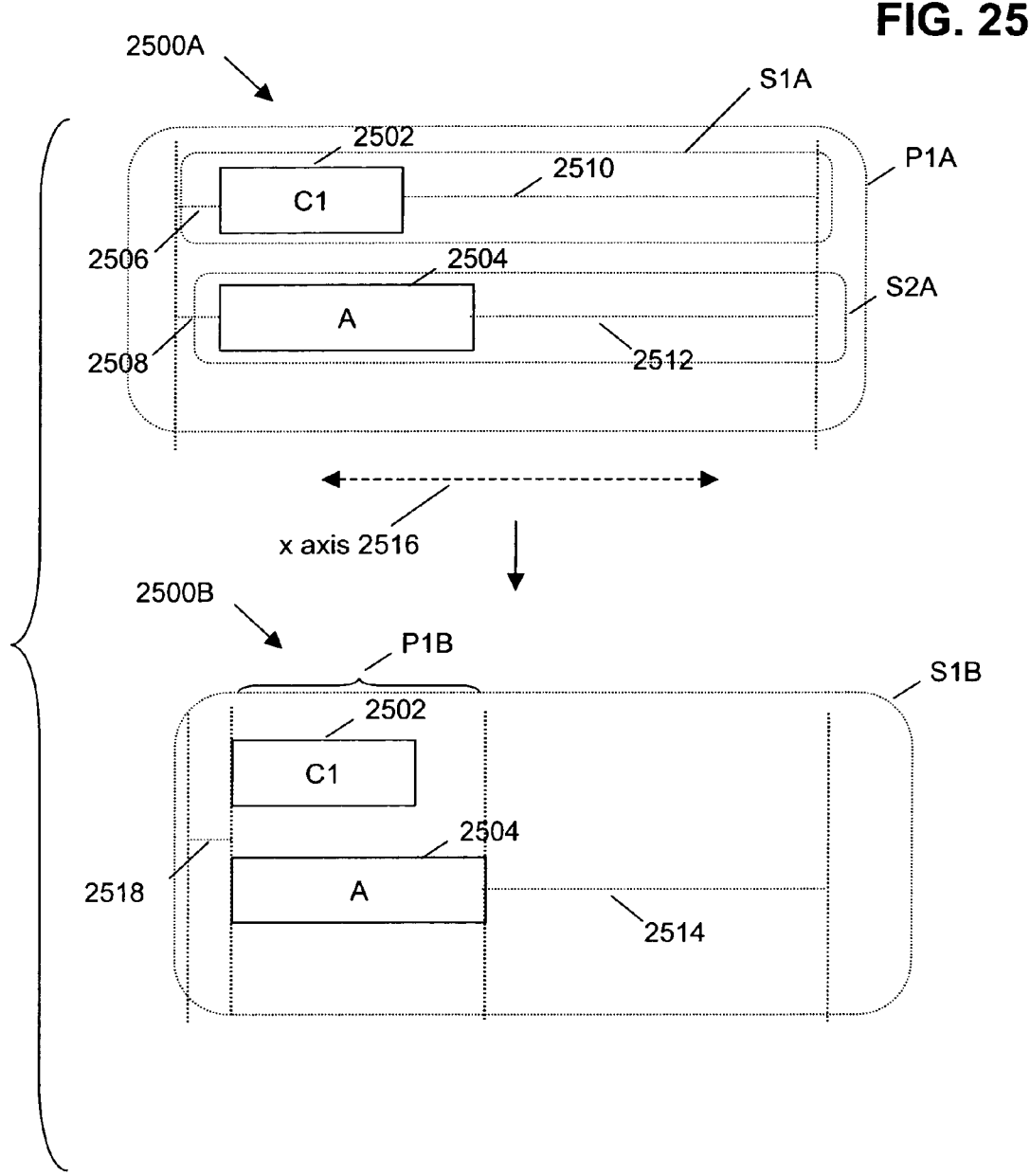
FIG. 25 illustrates an example of eliminating spaces in a layout by creating a new sequence in a parallel group in accordance with one embodiment of the invention.

FIG. 25 illustrates an example of eliminating spaces in a layout by creating a new sequence in a parallel group in accordance with one embodiment of the invention. For clarity of description, only a layout in the horizontal dimension along an x axis 2516 is illustrated. In FIG. 25 the dotted vertical lines denote parallel groups and the dotted horizontal lines represent spacing, such as autopadding. In FIG. 25, an initial layout state is represented by layout state 2500A and a subsequent layout state is represented by layout state 2500B in which spaces are eliminated in the layout.

In FIG. 25, a component A 2504 is added to a container component (not shown) at a preferred distance from the left border in the horizontal dimension. Component C1 2502 is already present in the container component (not shown).

Both components A 2504 and component C1 2502 are accompanied by spaces, e.g., autopadding, on the left and right sides. In particular, component C1 2502 has a space 2506 on the left side and a space 2510 on the right side. Component A 2504 has a space 2508 on the left side and a space 2512 on the right side.

The left spaces, space 2506 and space 2508, ensure the position of component C1 2502 and component A 2504, respectively a distance from the aligned edge of the parallel group P1. The left spaces are fixed. The right spaces, space 2510 and space 2512, support the required container size, and are resizable.

In layout state 2500A, the structure of the layout in the horizontal dimension before eliminating the spaces is:

$$P1A=S1A|S2, S1A=\text{space } 2506+C1+\text{space } 2510,$$
$$S2=\text{space } 2508+A+\text{space } 2512.$$

In layout state 2500B, the spaces are merged together in accordance with one embodiment of the invention, and after the spaces are eliminated/merged, the resulting structure is:

$$S1B=\text{space } 2518+P1B+\text{space } 2514, P1B=C1|A.$$

Thus in FIG. 25, a sequential group S1B is created including a parallel group P1B composed of component C1 2502 and component A 2504. This allows the use of space 2518 in place of space 2506 and space 2508, and of space 2514 in place of space 2510 and space 2512.

Redundant Parallel Groups are Eliminated

In one embodiment, redundant parallel groups are eliminated. In one embodiment, as GUI layout builder tool 114 searches for the most independent position, GUI layout builder tool 114 tries to add the layout spring into a top-most parallel group. But within this group, there can already be a parallel subgroup containing layout springs aligned the same way as the newly added layout spring.

If nothing follows this constituent group in a sequence, the new layout spring can be equally moved into this constituent group. Put another way, the constituent group can be dissolved into the parent group. This way unnecessary nesting of groups is avoided.

Figure 26:
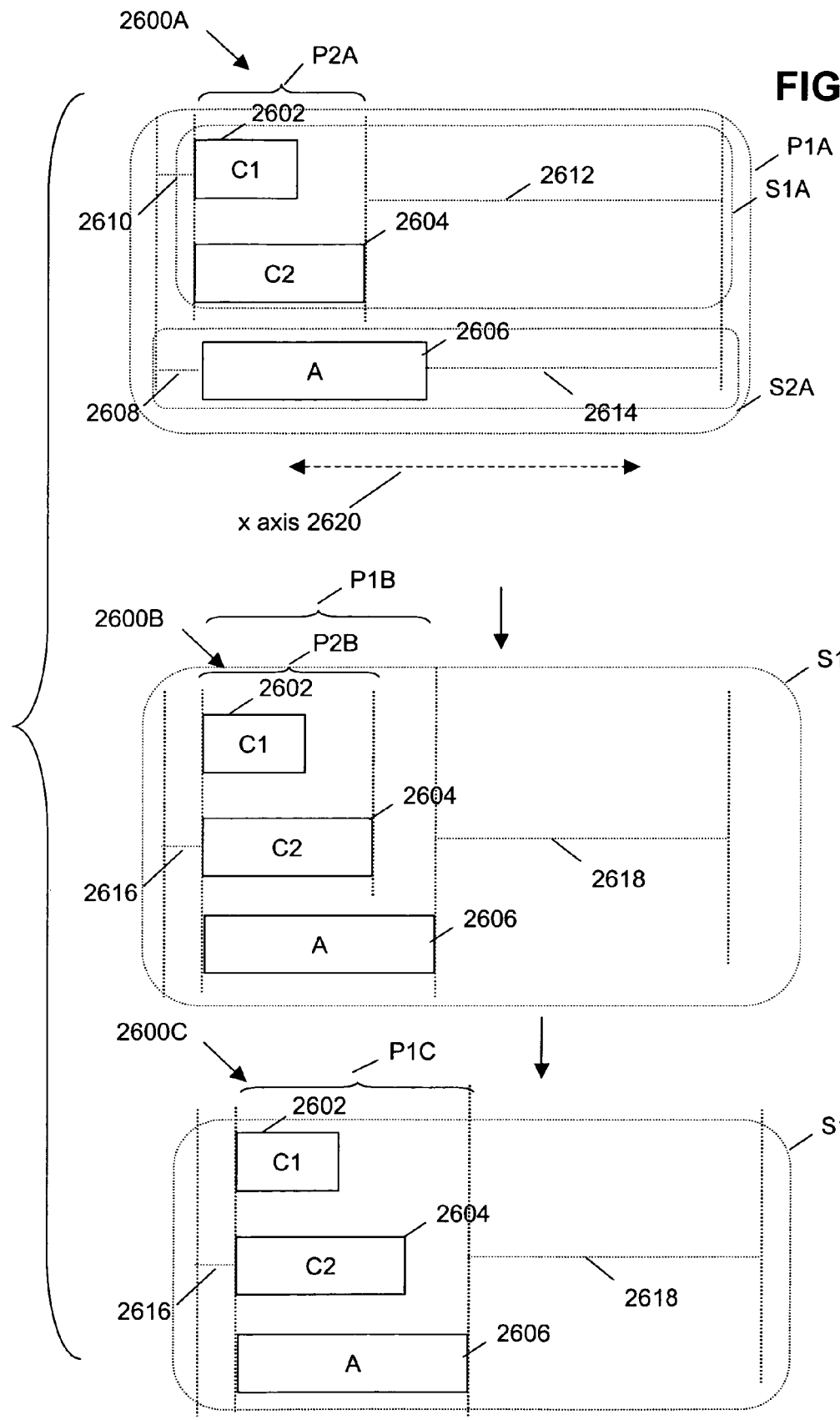
FIG. 26 illustrates an example of elimination of redundant parallel groups in a layout in accordance with one embodiment of the invention.

FIG. 26 illustrates an example of elimination of redundant parallel groups in a layout in accordance with one embodiment of the invention. For clarity of description, only a layout in the horizontal dimension along an x axis 2620 is illustrated. In FIG. 26 the dotted vertical lines denote parallel groups and the dotted horizontal lines represent spacing, such as autopadding.

In FIG. 26 an initial layout state is represented by layout state 2600A, an intermediate layout state is represented by layout state 2600B, and a subsequent layout state is represented by layout state 2600C. In layout state 2600A, a new component A 2606 is added at the preferred distance from a container border (not shown).

The corresponding structure of the layout in the horizontal dimension in layout state 2600A following adding of component A 2606 is:

$P1A=S1A+S2A$, $S1A$=space $2610+P2A$+space $2612$,
  $P2A=C1|C2$, $S2A$=space $2608+A$+space $2614$.

In intermediate layout state 2600B, the redundant spaces are eliminated, and component A 2606 is in a parallel group P1B with the parallel group P2B including component C1 2602 and component C2 2604. The corresponding structure of the layout in the horizontal direction in layout state 2600B after superfluous spaces are eliminated is:

$S1B$=space $2616+P1B$+space $2618$, $P1B=P2B|A$,
  $P2B=C1|C2$.

The two parallel groups, P1B and P2B, now have equal alignment and can be merged together as shown in layout state 2600C. The corresponding structure of the layout in the horizontal dimension in layout state 2600C after parallel groups are merged into one is:

$S1C$=space $2616+P1C$+space $2618$, $P1C=C1|C2|A$.

Moving Layout Springs from a Sequence into a Nearby Open Parallel Group

In one embodiment, a layout spring is moved from a sequence into a nearby open parallel group. In one embodiment, an open parallel group is a group in which all constituent layout springs are aligned at the same edge and are non-resizable. The opposite edge from the same edge is called the open edge. The open edge has no direct influence on the position or size of the constituent layout springs of the group. The size of the parallel group is simply determined from the maximum size of the constituent layout springs. In one embodiment, the open edge is invisible to the user in the design area, e.g., edges having something attached are visualized in the design area.

For a layout spring added out of the boundaries of an open group, e.g., next to the open edge, in a sequence with the whole group, the layout spring is treated as if the layout spring was inside the group, e.g., in sequence with a particular constituent layout spring. The inside/outside position does not matter for the newly added layout spring, however, the position matters for the group, e.g., the group content.

If the layout spring is placed outside the group, the layout spring affects the entire group, e.g., all constituent layout springs of the group, as the layout spring prevents free expansion of the open edge. In this instance, the layout spring is moved inside the parallel group, e.g., in sequence with the particular constituent layout spring, to affect this constituent layout spring. This arrangement also corresponds to what the user can see in the design area, e.g., the user positions a component next to another component, not next to a group, e.g., the open edge is invisible for the user.

During addition of a component layout spring, the above described inside/outside position is not evaluated. The layout spring is simply added into free space in the sequence. Neighboring layout springs in the sequence are not considered related if the neighboring layout springs do not reach the added layout spring. Thus the present embodiment evaluates nearby open parallel groups, and moves an added layout spring from a sequence into a nearby open parallel group if needed.

Figure 27:
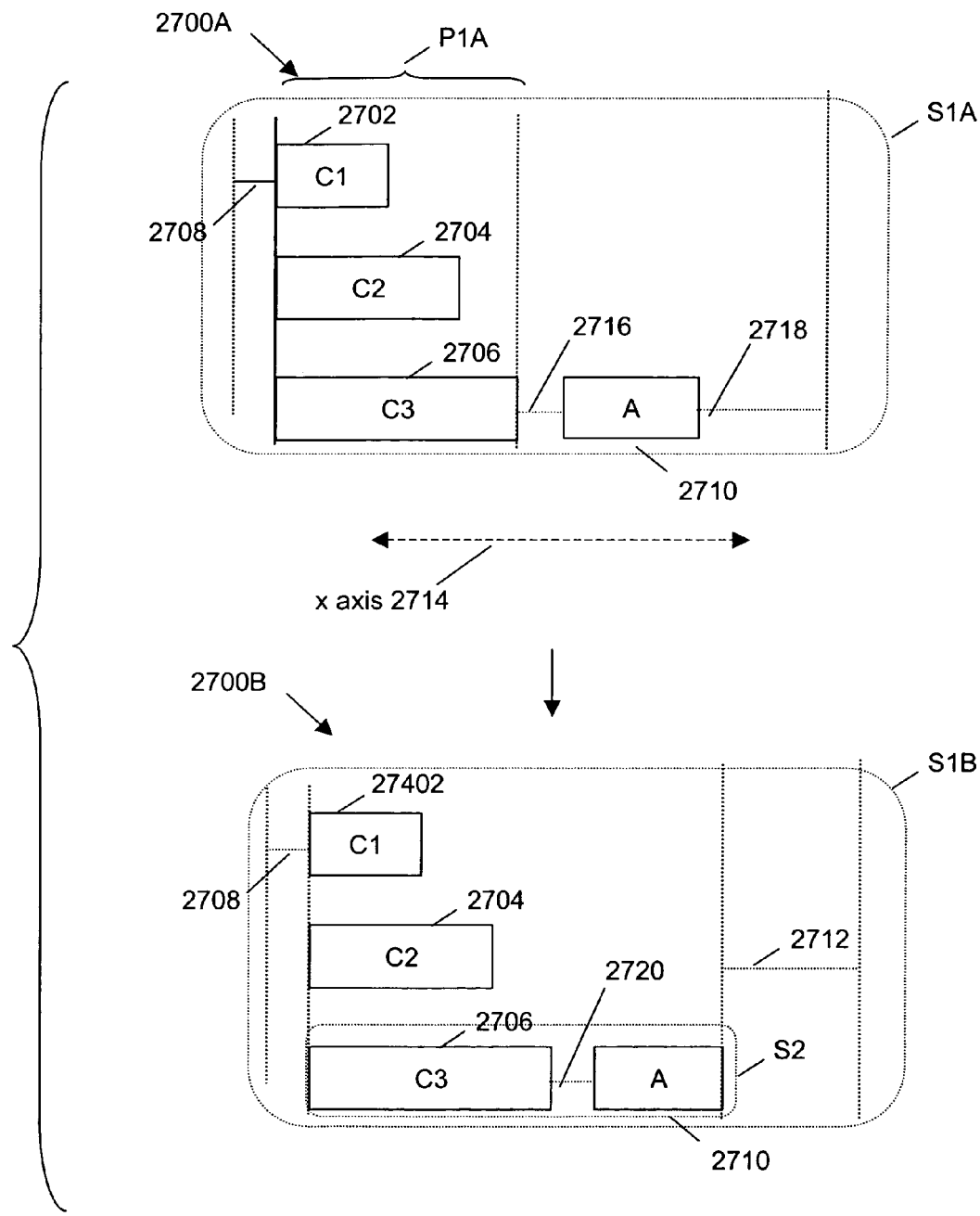
FIG. 27 illustrates another example of adding a component to a layout in accordance with one embodiment of the invention.

FIG. 27 illustrates another example of adding a component to a layout in accordance with one embodiment of the invention. In particular, FIG. 27 illustrates a new component A 2710 added to a layout and placed by the user next to component C3 2706.

For clarity of description, only a layout in the horizontal dimension along an x axis 2714 is illustrated. In FIG. 27 the dotted vertical lines denote parallel groups and the dotted horizontal lines represent spacing, such as autopadding. In FIG. 27, an initial layout state is represented by a layout state 2700A, and a subsequent layout state is represented by a layout state 2700B.

In one embodiment, component A 2710 is added in sequence with the parallel group P1A containing a component C1 2702, a component C2 2704, and a component C3 2706. This arrangement is not optimal as component C1 2702 and component C2 2704 are now restricted by adding component A 2710. Component C1 2702 and component C2 2704 cannot grow to the right freely, which is expected as component C1 2702 and component C2 2704 are left aligned, and the parallel group P1A is open at the right edge. In one embodiment, adding component A 2710 is moved inside parallel group P1A as shown in layout state 2700B.

In FIG. 27, the layout structure in the horizontal dimension in layout state 2700A before moving component A 2710 to the parallel group is:

$S1A$=space $2708+P1A$+space $2716+A$+space $2718$,
  $P1A=C1|C2|C3$.

The layout structure in the horizontal dimension in layout state 2700B after moving component A to the parallel group is:

$S1B$=space $2708+P1B$+space $2712$, $P1B=C1|C2|S2$,
  $S2=C3$+space $2720+A$.

In the above example, the space elimination described is also based on open groups, e.g., it does not matter if the empty space is defined inside or outside the group, e.g., at the open edge. In the above example, outside is preferred as the empty space can be described by one space. Referring again to FIG. 20, from POST PROCESS LAYOUT operation 2010, processing transitions to a UPDATE THE LAYOUT IN THE VISUAL DESIGN AREA operation 2012.

In UPDATE THE LAYOUT IN THE VISUAL DESIGN AREA operation 2012, in one embodiment, after the layout model has been changed according to the user's action, the view of the design area is updated, e.g., the layout is recreated, using the actual set of components, to reflect the current state of the model. When the design view is updated, the layout builder tool grabs the actual visual positions of the components and infers positions of all layout springs and groups in the layout model to have an up-to-date visual image of the model. This information is used for visualizing the layout structure in the design area and for processing the user input interaction, e.g., mouse inputs.

From UPDATE THE LAYOUT IN THE VISUAL DESIGN AREA operation 2012, processing transitions to an EXIT operation 2014, with processing exiting method 2000.

Removing Components

When removing a component, the corresponding layout spring of the component are removed from the layout model, separately for each dimension. The size of the removed layout spring is compensated for in the layout model if the removed layout spring contributed to the entire layout size or position of other components, for example, using autopadding.

If the removed layout spring was placed in a sequential group, and if the removed layout spring was not at the end of the sequence, an appropriate space is inserted to preserve the current visual state. If the removed layout spring was placed in a sequential group, and if the removed layout spring was at the end of the sequence, and if the sequence was the largest layout spring in the parent parallel group, the size decrease is compensated by adding a space to the first parent sequential group.

If the removed layout spring was placed in a parallel group, and if the removed layout spring was the largest layout spring of the group, the group size decrease is compensated by adding a space to the first parent sequential group. If just one layout spring remains in the group layout spring after removing the layout spring, the group layout spring is cancelled and the last layout spring is added instead of the group layout spring to the parent group layout spring. If no more layout springs remain in the group layout spring, the group layout spring is cancelled, and removed as described above.

Moving Components

When moving components, in one embodiment, GUI layout builder tool 114 allows the user to move the existing components in the layout from one location to another using an input device, such as mouse, or a keyboard. When the user begins dragging a component, the component is removed from the layout structure as earlier described, and from this point the operation is handled the same way as when adding a new component, earlier described.

Resizing Components

In resizing components, in one embodiment, a user can resize a single component using a mouse, or other input device, by grabbing an edge of the component, to resize in one dimension only, or a corner to resize in two dimensions simultaneously. Resizing is analogous to moving, i.e., the new position in the layout is found the same way as adding a new component, and reflecting the changed size of the component after each move.

The changed size is set to the component's internal preferred size. If the resizing edge is "snapped" to another component in the layout, the component is automatically made resizable in a given dimension, e.g., the maximum size of the corresponding layout spring is set to "infinity".

As described in the above embodiments, GUI layout builder tool 114 utilizing cross platform layout application 106 generates several basic layout arrangements and combinations that are transferable to a layout manager-based UI that can dynamically maintain these arrangements. More particularly, the layout arrangements generated by GUI layout builder tool 114 are transferable to different underlying software platforms and enable the layout to assume the look and feel of the underlying software platform, i.e., the visual guidelines, without the user having to know the underlying software platform when designing the GUI layout.

As described herein, embodiments of GUI builder tool 114 in accordance with the invention allow a user to develop GUI layouts in which:

1. components placed in a sequence by a user maintain a relative distance;
2. components maintain a position relative to other components, or to the container border, in the direction the components are added by the user;
3. components aligned to the same position along a certain axis remain aligned together even if the surroundings are modified; and,
4. a component resized by the user over the whole available space between two other components, or the container border, automatically keeps the resizability attribute, i.e., the component's size adjusts according to changes in the available space.

Figure 28:
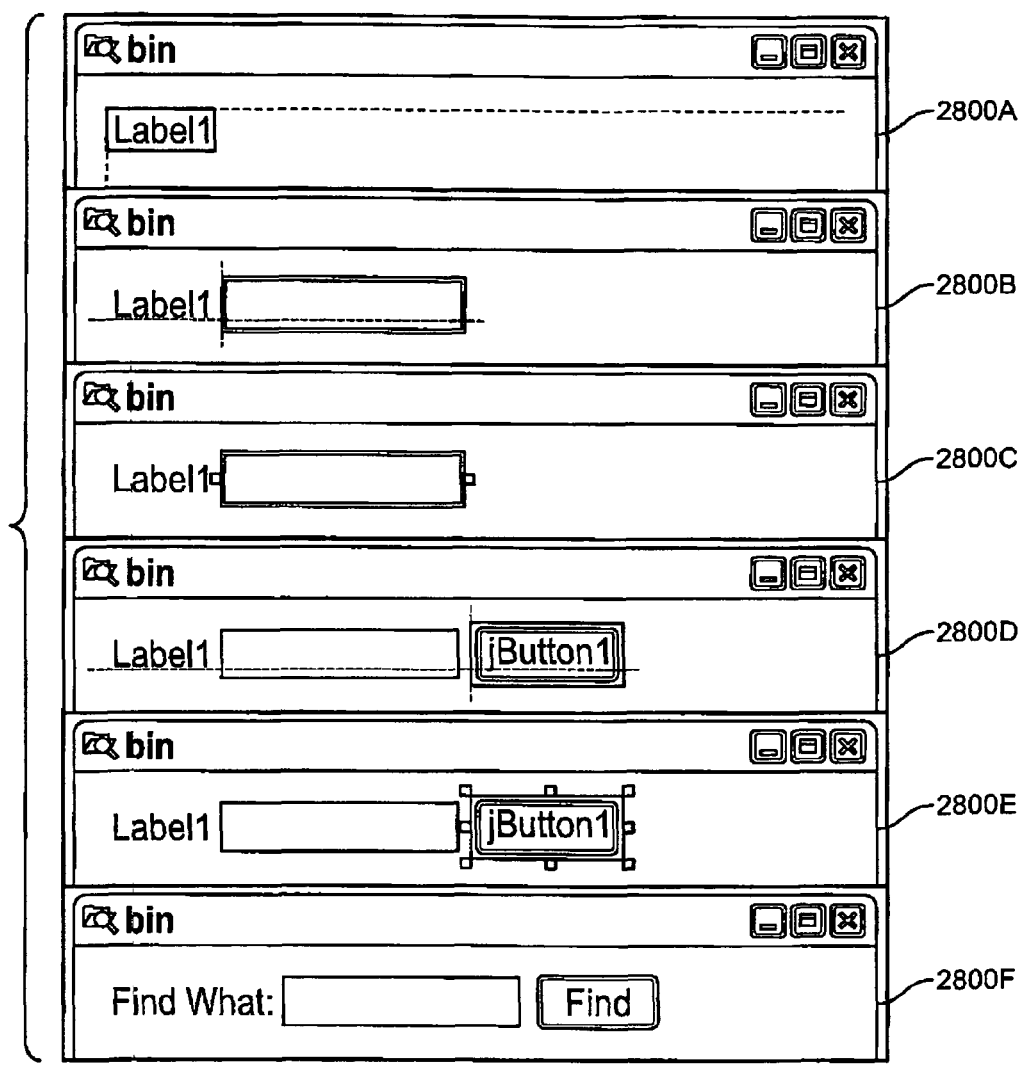
FIG. 28 illustrates an example of the sequential addition of components to a design area in which the sequence is preserved in accordance with one embodiment of the invention.

FIG. 28 illustrates an example of sequential addition of components to a design area in which the sequence is preserved in accordance with one embodiment of the invention. In particular, design areas 2800A-2800F sequentially illustrate the sequential addition of components to a design area of GUI layout builder tool 114 in which the sequence is preserved in the order placed in the sequence by the user. Additionally, other layout information is displayed to the user, such as knobs, alignment bars, and a baseline along which components or the contents of the components are aligned.

In particular, design area 2800F shows that the sequential arrangement of the components along the horizontal axis is preserved even when a component is changed. For example, the texts of label "Label1" and button "Jbutton1" in design area 2800E are changed in design area 2800F to read "Find What":" and "Find", respectively. In FIG. 28 the layout additionally maintains the relative distance between the components.

Figure 29:
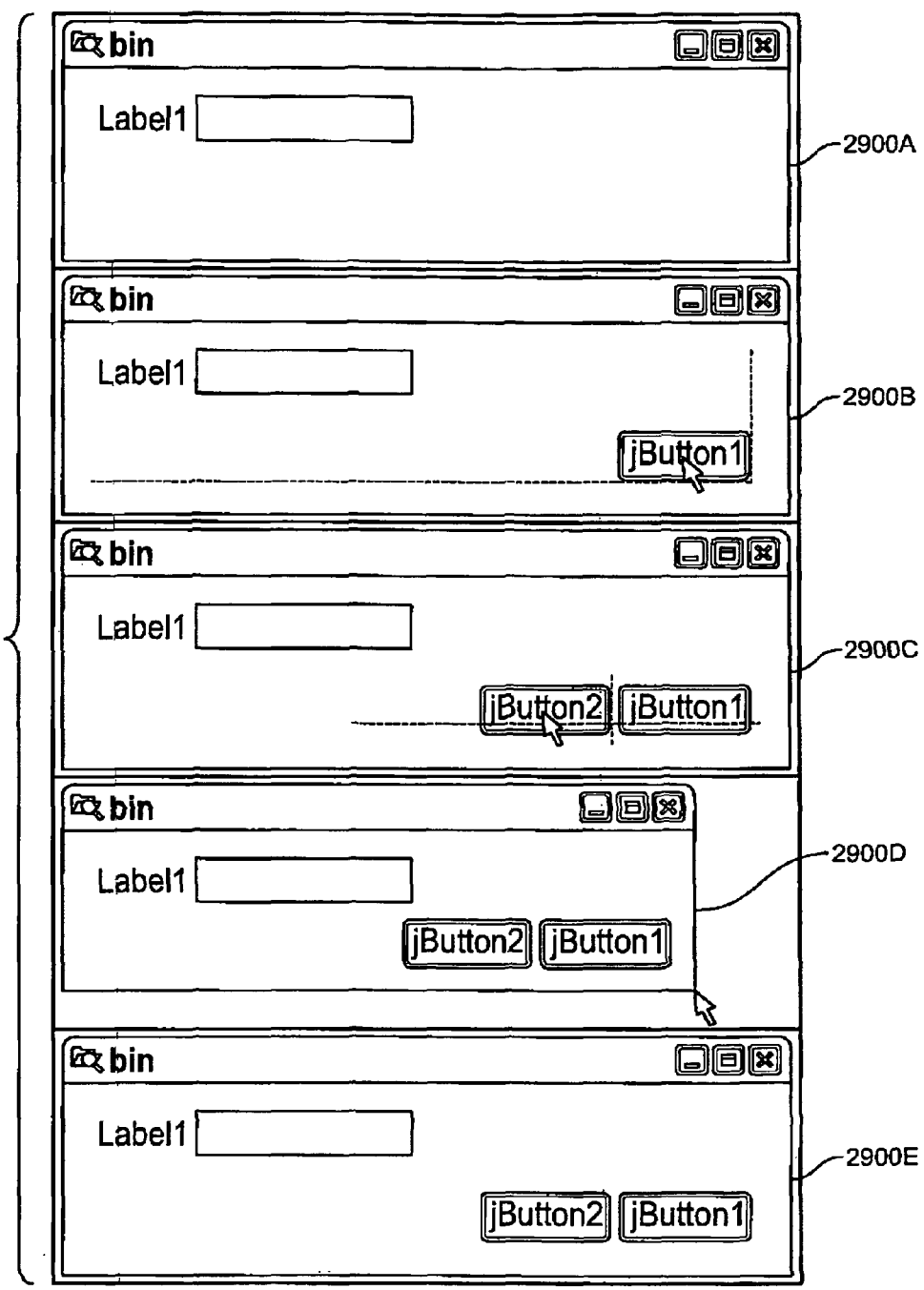
FIG. 29 illustrates an example of addition of components to a design area in which the components maintain a position to other components or to the container border in the direction of addition by the user in accordance with one embodiment of the invention.

FIG. 29 illustrates an example of addition of components to a design area in which the components maintain a position to other components or to the container border in the direction of addition by the user in accordance with one embodiment of the invention. In particular, design areas 2900A-2900E sequentially illustrate addition of components to a design area of GUI layout builder tool 114 in which components maintain a position to other components or to the container border in the direction of addition by the user.

In FIG. 29, design areas 2900A-2900E sequentially illustrate that a component placed in a design area at the bottom-right corner of the design area maintains a distance from the corner, even if the entire UI is resized, or if the component itself is changed. Additionally, other layout information is displayed to the user, such as alignment bars and a baseline along which components or the contents of the components are aligned.

In particular, design areas 2900D and 2900E illustrate that the buttons, "jButton2" and "Jbutton1", oriented to the window borders maintain a relative distance from the container border even when the window is resized.

Figure 30:
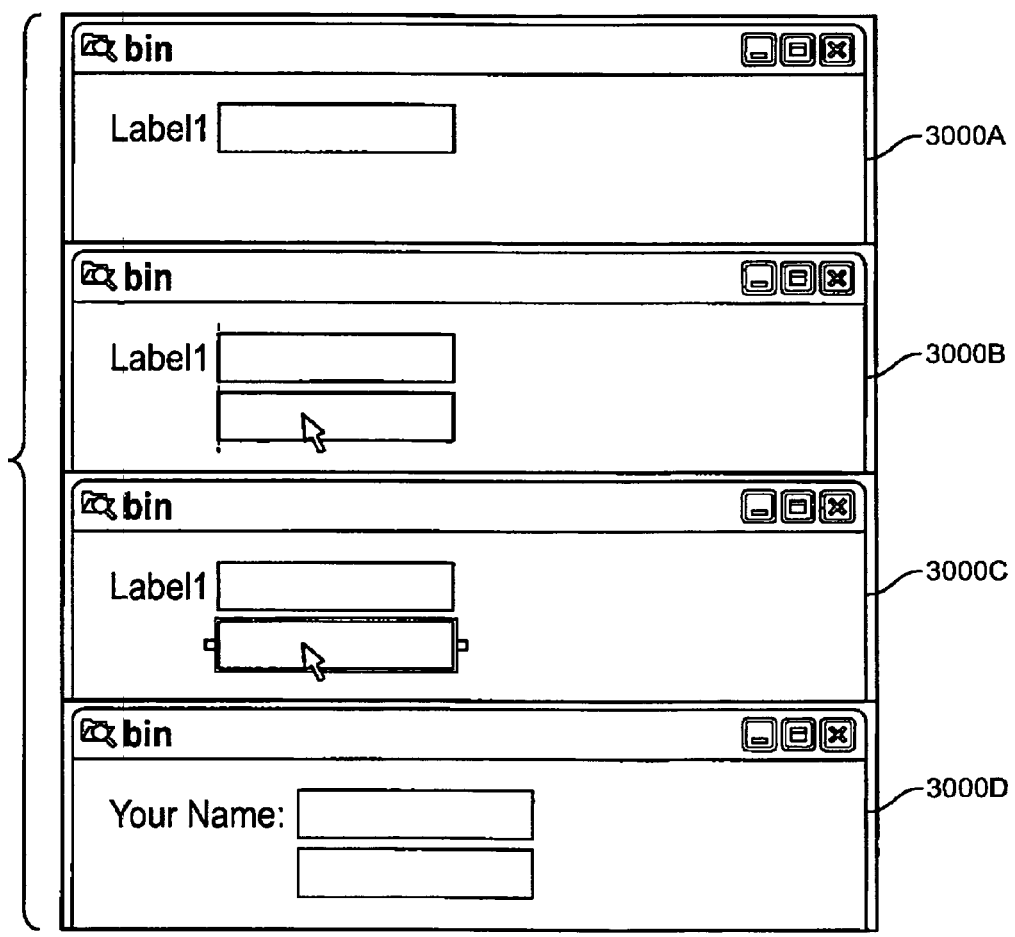
FIG. 30 illustrates an example of components in a design area in which components aligned to the same position along an axis in a design area remain aligned together when the surroundings are changed in accordance with one embodiment of the invention.

FIG. 30 illustrates an example of components in a design area in which components aligned to the same position along an axis remain aligned together when the surroundings are changed in accordance with one embodiment of the invention. In particular, design areas 3000A-3000D sequentially illustrate that components aligned to the same position along an axis in a design area of GUI layout builder tool 114 remain aligned together when the surroundings are changed.

In FIG. 30, design areas 3000A-3000D sequentially illustrate that two text fields left aligned in parallel remain aligned even when other components are changed. In design area 3000D, the text of the label component has changed from "Label1" to "Your Name", but the two text field components left-aligned in parallel remain aligned.

Figure 31:
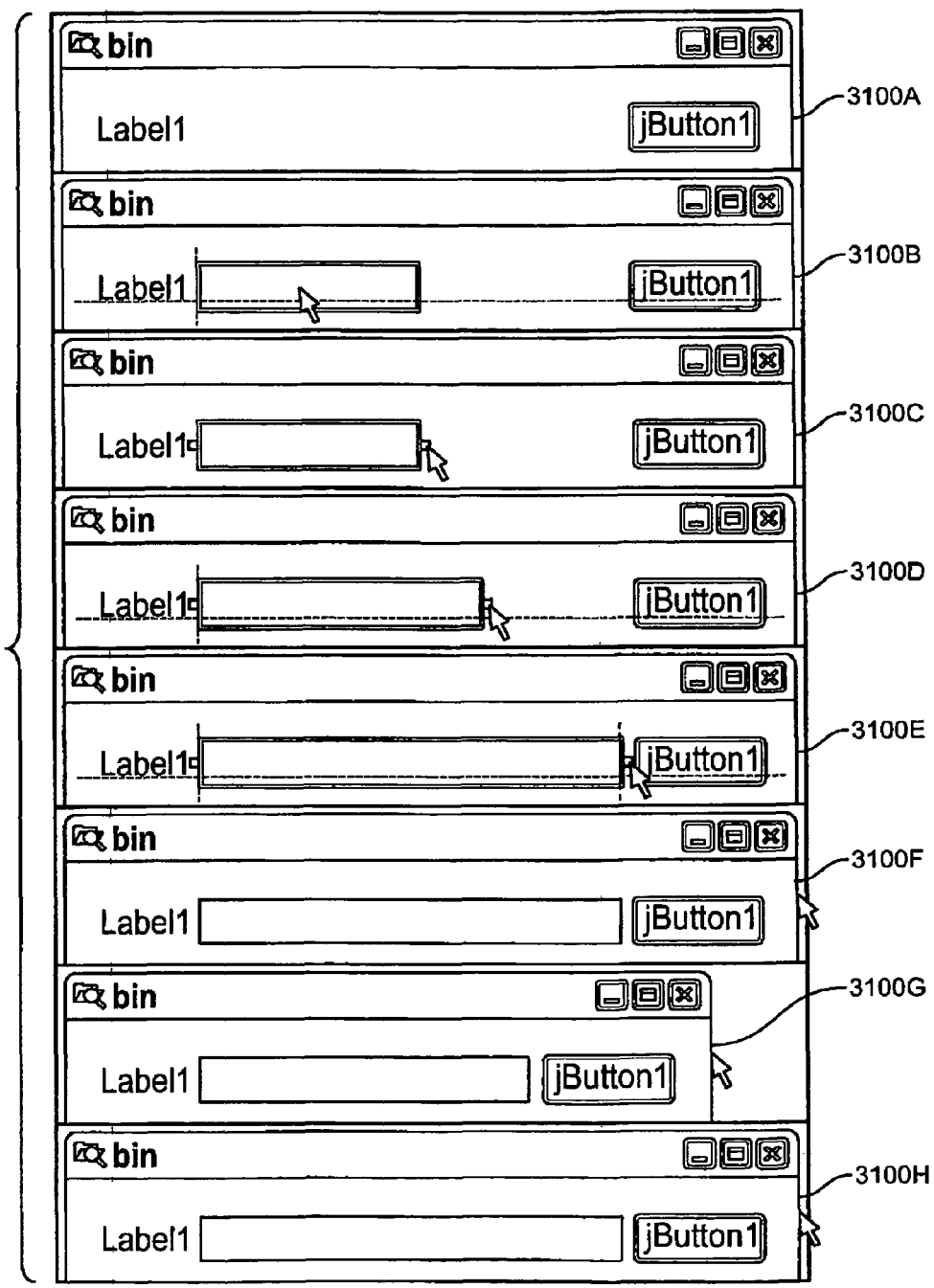
FIG. 31 illustrates an example of a component in a design area in which the component is automatically resized if the entire container is resized in accordance with one embodiment of the invention.

FIG. 31 illustrates an example of a component in a design area in which the component automatically resized if the entire container is resized in accordance with one embodiment of the invention. In particular, design areas 3100A-3100H sequentially illustrate that a text field component once resized over the entire available space between two other components by the user in a design area of GUI layout builder tool 114, is resized automatically if the entire container is resized.

In particular, design areas 3100A-3100F show the resizing of the text field component over the available space between the label and button components. In design area 3100G the size of the container component is reduced and the text field is resized, maintaining a relative distance to the label and button components. In design area 3100H, the size of the container component is enlarged, and the text field component is resized, again maintaining a relative distance to the label and button components.

Referring again to FIG. 1, GUI layout builder tool 114 and cross platform layout application 106 are in computer memory 112. As used herein, a computer memory refers to a volatile memory, a non-volatile memory, or a combination of the two.

Although GUI layout builder tool 114 and cross platform layout application 106 are referred to as applications, this is illustrative only. GUI layout builder tool 114 and cross platform layout application 106 should be capable of being called from an application or the operating system, e.g., operating system 104.

In one embodiment, an application is generally defined to be any executable code. Moreover, those of skill in the art can understand that when it is said that an application or an operation takes some action, the action is the result of executing one or more instructions by a processor.

While embodiments in accordance with the invention have been described for host computer and client-server configurations, embodiments of the invention can be carried out using any suitable means and/or hardware configuration involving a personal computer, a workstation, a portable device, or a network of computer devices. Other network configurations other than client-server configurations, e.g., peer-to-peer, web-based, intranet, Internet network configurations, are used in other embodiments.

Herein, a computer program product comprises a medium configured to store or transport computer readable code in accordance with an embodiment of the invention. Some examples of computer program products are CD-ROM discs, DVDs, ROM cards, floppy discs, magnetic tapes, computer hard drives, servers on a network and signals transmitted over a network representing computer readable code. Further herein, a means for performing a particular function is accomplished using the appropriate computer-readable code and the related hardware necessary to performing the function.

As illustrated in FIG. 1, this medium can belong to the computer system itself. However, the medium also can be removed from the computer system. For example, GUI layout builder tool 114 and/or cross platform layout application 106 can be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that can execute the dynamic security policy functionality in accordance with at least one of the embodiments as described herein.

Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the processes as described herein.

In view of this disclosure, the embodiments of the invention can be implemented in a wide variety of computer system configurations. In addition, the embodiments of the invention can be stored as different modules in memories of different devices.

For example, GUI layout builder tool 114 and/or cross platform layout application 106 could initially be stored in server computer system 130, and as necessary, a portion of GUI layout builder tool 114 and/or cross platform layout application 106 could be transferred to host computer system 102 and executed on host computer system 102. Consequently, part of GUI layout builder tool 114 and/or cross platform layout application 106 would be executed on processor 134 of server computer system 130, and another part would be executed on processor 108 of host computer system 102.

In yet another embodiment, GUI layout builder tool 114 and/or cross platform layout application 106 is stored in memory 136 of server computer system 130. GUI layout builder tool 114 and/or cross platform layout application 106 are transferred over network 126 to memory 112 in host computer system 102. In this embodiment, network interface 138 and I/O interface 110 would include analog modems, digital modems, or a network interface card. If modems are used, network 126 includes a communications network, and GUI layout builder tool 114 and/or cross platform layout application 106 is downloaded via the communications network. In view of this disclosure, those of skill in the art can implement various embodiments of the invention in a wide-variety of physical hardware configurations using an operating system and computer programming language of interest to the user.

This disclosure provides exemplary embodiments of the invention. The scope of the invention is not limited by these exemplary embodiments. Numerous variations, whether explicitly provided for by the specification or implied by the specification or not, can be implemented by one of skill in the art in view of this disclosure.

What is claimed is:
1. A computer implemented method comprising:
   executing on a processor, a cross platform layout application, the executing comprising:
   receiving an input of a layout of one or more components within a container component;
   determining a horizontal layout spring hierarchy that represents the one or more components of the layout in a horizontal dimension of the container component, and a vertical layout spring hierarchy that represents the one or more components of the layout in a vertical dimension of the container component, wherein each component in the layout is represented with one or more of a vertical layout spring and a horizontal layout spring; and generating a new cross platform layout of said one or more components within said container component, including a component autopadding layout spring for each of said one or more components, wherein each autopadding layout spring is directional along one of a vertical axis or a horizontal axis, and wherein said generating the new cross platform layout includes generating automatically, for said one or more components, at least one automatically sized autopad, including generating automatically an autopadding layout spring representing a spacing along one or more of the vertical axis or horizontal axis to properly position said one or more components within said container component along those one or more axis, wherein a size of said autopadding layout spring is determined upon execution of said new cross platform layout on a computer system using a visual guideline for a software platform utilized by said computer system, wherein different software platforms utilize different visual guidelines, and wherein, for each particular software platform, its visual guidelines specify for that platform how components in a graphical user interface should be spaced apart from other components.

2. The computer implemented method of claim 1, wherein said generating automatically the autopadding layout spring further comprises:

generating automatically the autopadding layout spring so that it represents a spacing between a component of said one or more components and another component of said one or more components.

3. The method of claim 2, wherein the autopadding layout spring expands and reduces in size along a single axis of the new cross platform layout.

4. The method of claim 3 wherein the generating automatically an autopadding layout spring further comprises:

inserting the autopadding layout spring between a source layout spring associated with the input layout of one or more components and a target layout spring associated with the new cross platform layout, wherein the source layout spring is a component layout spring representing a spacing for the another component, and the target layout spring is a component layout spring representing a spacing for the component in the new cross platform layout.

5. The method of claim 3 wherein the generating automatically an autopadding layout spring further comprises:

initializing the autopadding layout spring to a null value.

6. The method of claim 3 wherein the generating automatically an autopadding layout spring further comprises:

determining a value of the autopadding layout spring based on autopadding generation guidelines for a component layout spring.

7. The method of claim 3 wherein the generating automatically an autopadding layout spring further comprises:

determining a value of the autopadding layout spring based on autopadding generation guidelines for a group layout spring.

8. The method of claim 3 wherein the generating automatically an autopadding layout spring further comprises:

setting a value of the autopadding layout spring based on autopadding generation guidelines when a layout spring is not a component layout spring and is not a group layout spring.

9. The method of claim 8, wherein the value is null.

10. The method of claim 3 wherein generating automatically an autopadding layout spring further comprises:

updating target list of layout springs, associated with the new cross platform layout, to include a component layout spring for the component.

11. The method of claim 3 wherein generating automatically an autopadding layout spring further comprises:

updating source list of layout springs, associated with the input layout of one or more components, to include a component layout spring for the another component.

12. The computer implemented method of claim 1, wherein said generating automatically at least one automatically sized autopad further comprises:

generating at least one automatically sized container autopad including a container autopadding layout spring representing a space between a component of said one or more components and said container component, wherein a size of said container autopad is determined upon execution of said new cross platform layout on said computer system using said visual guideline for said software platform utilized by said computer system.

13. The method of claim 12 wherein the generating at least one automatically sized container autopad further comprises:

inserting the container autopadding layout spring between one of a source layout spring, associated with the input layout of one or more components, and a target layout spring, associated with the new cross platform layout.

14. The computer implemented method of claim 1, further comprising:

removing all pre-existing padding from said layout.

15. The computer implemented method of claim 1, wherein a contents of one or more components of said one or more components is aligned along a same baseline.

16. A computer system comprising:

a processor; and a memory coupled to the processor, and having stored therein computer code for a method, wherein upon execution of the computer code on the processor the method comprises:

receiving an input of a layout of one or more components within a container component;

determining a horizontal layout spring hierarchy that represents the one or more components of the layout in a horizontal dimension of the container component, and a vertical layout spring hierarchy that represents the one or more components of the layout in a vertical dimension of the container component, wherein each component in the layout is represented with one or more of a vertical layout spring and a horizontal layout spring; and generating a new cross platform layout of said one or more components within said container component, including a component autopadding layout spring for each of said one or more components, wherein each autopadding layout spring is directional along one of a vertical axis or a horizontal axis, and wherein said generating the new cross platform layout includes generating automatically, for said one or more components, at least one automatically sized autopad, including generating automatically an autopadding layout spring representing a spacing along one or more of the vertical axis or horizontal axis to properly position said one or more components within said container component along those one or more axis, wherein a size of said autopadding layout spring is determined upon execution of said new cross platform layout on said computer system using a visual guideline for a software platform utilized by said computer system, wherein different software platforms utilize different visual guidelines, and wherein, for each particular software platform, its visual guidelines specify for that platform how components in a graphical user interface should be spaced apart from other components.

17. The computer system of claim 16, wherein said generating automatically at least one automatically sized autopad further comprises:

generating at least one automatically sized container autopad including a container autopadding layout spring representing a spacing between a component of said one or more components and said container component, wherein a size of said container autopad is automatically determined upon execution of said new cross platform on said software platform using said visual guideline.

18. A non transitory computer readable medium storing computer readable instructions which when read and executed by a computer cause the computer to perform the steps comprising:

receiving an input of a layout of one or more components within a container component;

determining a horizontal layout spring hierarchy that represents the one or more components of the layout in a horizontal dimension of the container component, and a vertical layout spring hierarchy that represents the one or more components of the layout in a vertical dimension of the container component, wherein each component in the layout is represented with one or more of a vertical layout spring and a horizontal layout spring; and generating a new cross platform layout of said one or more components within said container component, including a component autopadding layout spring for each of said one or more components, wherein each autopadding layout spring is directional along one of a vertical axis or a horizontal axis, and wherein said generating the new cross platform layout includes generating automatically, for said one or more components at least one automatically sized autopad, including generating automatically an autopadding layout spring representing a spacing along one or more of the vertical axis or horizontal axis to properly position said one or more components within said container component along those one or more axis, wherein a size of said autopadding layout spring is determined upon execution of said new cross platform layout on a computer system using a visual guideline for a software platform utilized by said computer system, wherein different software platforms utilize different visual guidelines, and wherein, for each particular software platform, its visual guidelines specify for that platform how components in a graphical user interface should be spaced apart from other components.

\* \* \* \* \*